US012777149B2

(12) United States Patent
Andersson et al.

(10) Patent No.: US 12,777,149 B2
(45) Date of Patent: Oct. 27, 2026

(54) ENHANCED INTERPOLATION FILTERING

(71) Applicant: Telefonaktiebolaget LM Ericsson (publ), Stockholm (SE)

(72) Inventors: Kenneth Andersson, Gävle (SE); Ruoyang Yu, Täby (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 18/855,939

(22) PCT Filed: Mar. 30, 2023

(86) PCT No.: PCT/SE2023/050286
§ 371 (c)(1),
(2) Date: Oct. 10, 2024

(87) PCT Pub. No.: WO2023/200381
PCT Pub. Date: Oct. 19, 2023

(65) Prior Publication Data

US 2025/0254297 A1 Aug. 7, 2025

Related U.S. Application Data

(60) Provisional application No. 63/350,653, filed on Jun. 9, 2022, provisional application No. 63/330,132, filed on Apr. 12, 2022.

(51) Int. Cl.
*H01L 29/94* (2006.01)
*H04N 19/117* (2014.01)
(Continued)

(52) U.S. Cl.
CPC ......... *H04N 19/117* (2014.11); *H04N 19/124* (2014.11); *H04N 19/159* (2014.11); *H04N 19/523* (2014.11); *H04N 19/91* (2014.11)

(58) Field of Classification Search
CPC .. H04N 19/117; H04N 19/124; H04N 19/159; H04N 19/523; H04N 19/91
See application file for complete search history.

(56) References Cited

U.S. PATENT DOCUMENTS 11,277,644 B2 3/2022 Van der Auwera et al.
12,238,338 B2 * 2/2025 Wang .................. H04N 19/176
(Continued)

FOREIGN PATENT DOCUMENTS

WO 2019/135419 A1 7/2019
WO 2020/262286 A1 12/2020

OTHER PUBLICATIONS

International Search Report and Written Opinion issued in International Application No. PCT/SE2023/050286 dated May 19, 2023 (14 pages).
(Continued)

*Primary Examiner* — Joseph Suh
(74) *Attorney, Agent, or Firm* — Rothwell, Figg, Ernst & Manbeck, P.C.

(57) ABSTRACT

There is provided a method for encoding or decoding a video, the video comprising a sequence of pictures which includes a first picture and a second picture. The method comprises obtaining a first group of values of samples included in a first block, wherein the first block is included in the first picture. The method further comprises selecting, from a set of filters, a filter to use for generating a second group of values included in a second block, wherein the second block is included in the first picture or the second picture. The method comprises, using the selected filter and the first group of values, generating the second group of values, wherein the filter comprises a set of 6, 8, 10, or 12 coefficient values, and the set of coefficient values is selected from given groups of coefficient values.

14 Claims, 41 Drawing Sheets

(51) Int. Cl.

| | |
|---|---|
| ***H04N 19/124*** | (2014.01) |
| ***H04N 19/159*** | (2014.01) |
| ***H04N 19/523*** | (2014.01) |
| ***H04N 19/91*** | (2014.01) |

(56) References Cited

U.S. PATENT DOCUMENTS

| | | | | |
|---|---|---|---|---|
| 2003/0108099 | A1 * | 6/2003 | Nagumo | G06T 9/20 375/E7.199 |
| 2014/0185680 | A1 * | 7/2014 | Li | H04N 19/59 375/240.16 |
| 2016/0316215 | A1 * | 10/2016 | Minoo | H04N 19/176 |
| 2018/0098066 | A1 | 4/2018 | Lee et al. | |
| 2021/0014478 | A1 * | 1/2021 | Seregin | H04N 19/105 |
| 2021/0092458 | A1 * | 3/2021 | Seregin | H04N 19/82 |
| 2021/0274172 | A1 | 9/2021 | Lim et al. | |
| 2021/0360239 | A1 * | 11/2021 | Li | H04N 19/159 |
| 2022/0078409 | A1 * | 3/2022 | Jeong | H04N 19/119 |
| 2022/0224925 | A1 * | 7/2022 | Sun | H04N 19/59 |
| 2024/0364879 | A1 * | 10/2024 | Zhang | H04N 19/176 |

OTHER PUBLICATIONS

Yu, R. et al., "AHG12: RPR luma filter modifications and RPR enabling fixes in ECM", Joint Video Experts Team (JVET) of ITU-T SG 16 WP 3 and ISO/IEC JTC 1/SC 29, 26th Meeting, by teleconference, Apr. 20-29, 2022, Document: JVET-Z0062-v0 (7 pages).

Andersson, K.. et al., "EE2-2.6 related: Longer chroma interpolation filters", Joint Video Experts Team (JVET) of ITU-T SG 16 WP 3 and ISO/IEC JTC 1/SC 29, 26th Meeting, by teleconference, Apr. 20-29, 2022, Document: JVET-Z0068-v1 (9 pages).

Andersson, K.. et al., "AHG12: Longer chroma filters for RPR in ECM", Joint Video Experts Team (JVET) of ITU-T SG 16 WP 3 and ISO/IEC JTC 1/SC 29, 26th Meeting, by teleconference, Apr. 20-29, 2022, Document: JVET-Z0069-v2 (13 pages).

Xie, X. et al., "Non-EE2: Long tap interpolation filtering on chroma components", Joint Video Experts Team (JVET) of ITU-T SG 16 WP 3 and ISO/IEC JTC 1/SC 29, 25th Meeting, by teleconference, Jan. 12-21, 2022, Document: JVET-Y0172 (3 pages).

Seregin, V. et al., "Exploration Experiment on Enhanced Compression beyond VVC capability (EE2)", Joint Video Experts Team (JVET) of ITU-T SG 16 WP 3 and ISO/IEC JTC 1/SC 29, 25th Meeting, by teleconference, Jan. 12-21, 2022, Document: JVET-Y2024 (15 pages).

Yu, R. et al., "AHG12: RPR luma filter modifications and RPR enabling fixes in ECM", Joint Video Experts Team (JVET) of ITU-T SG 16 WP 3 and ISO/IEC JTC 1/SC 29, 26th Meeting, by teleconference, Apr. 20-29, 2022, Document: JVET-Z0062-v2 (10 pages).

* cited by examiner

Non-ideal
Ideal phase delay
0.5
0
6/16
4/16
0
1 magnitude
1
0.5
0
Non-ideal
0
0.5
1

Non-ideal
Ideal
phase delay
0.5
0
6/16
4/16
0
1 magnitude
1
0.5
0
Non-ideal
0
0.5
1

ENHANCED INTERPOLATION FILTERING

CROSS REFERENCE TO RELATED APPLICATIONS

This application is a 35 U.S.C. § 371 National Stage of International Patent Application No. PCT/SE2023/050286, filed 2023 Mar. 30, which claims priority to: i) U.S. provisional patent application No. 63/330,132, filed 2022 Apr. 12 and ii) U.S. provisional patent application No. 63/350,653, filed 2022 Jun. 9. The above-identified applications are incorporated by this reference.

TECHNICAL FIELD

This disclosure relates to methods and apparatus for enhanced interpolation filtering.

BACKGROUND

In Versatile Video Coding (VVC), the length of the chroma interpolation filters is 4-tap. However, in the Joint Video Exploratory Team (JVET)-Y0172, it was shown that by increasing filter length to 12-tap, significant gains can be achieved. Therefore, in JVET-Y02024, it is studied in exploration experiments impact of increasing the filter length to 6-tap, 8-tap, and 12-tap.

Video and Picture

A video sequence consists of a series of pictures. In VVC, each picture is identified with a picture order count (POC) value. The POC value represents the display order of the picture. A picture with a smaller POC value is displayed before another picture with a larger POC value.

Components

Each component can be described as a two-dimensional rectangular array of sample values. It is common that each picture consists of three components; one luma component Y, where the sample values are luma values and two chroma components Cb and Cr, where the sample values are chroma values.

It is also common that the dimensions of the chroma components are smaller than the luma components by a factor of two in each dimension. For example, the size of the luma component of a High Definition (HD) picture is 1920×1080 while the size of each of the chroma components is 960×540. Components are sometimes referred to as color components.

Coding Unit and Coding Block

A block is one two-dimensional array of samples. In video coding, each component is split into blocks and the coded video bitstream consists of a series of coded blocks. It is common in video coding that pictures are split into units that cover a specific area of the picture.

Each unit consists of all blocks from all components that make up that specific area and each block belongs fully to one unit. The Coding Unit (CU) in VVC is an example of units. In VVC, the CUs may be split recursively to smaller CUs. The CU at the top level is referred to as the Coding Tree Unit (CTU).

A CU usually contains three coding blocks, i.e., one coding block for luma and two coding blocks for chroma. The size of luma coding block is the same as the size of a CU. In the current VVC (i.e., version 1), the CUs can have size of 4×4 up to 128×128.

Parameter Sets, Slice Headers and Picture Headers

VVC specifies three types of parameter sets: the picture parameter set (PPS), the sequence parameter set (SPS), and the video parameter set (VPS). The PPS contains data that is common for a whole picture, the SPS contains data that is common for a coded layer video sequence (CLVS), and the VPS contains data that is common for multiple CLVSs, e.g. data for multiple layers in the bitstream.

In the concept of slices, a picture is divided into independently coded slices, where decoding of one slice in a picture is independent of other slices of the same picture. Each slice has a slice header comprising syntax elements. Decoded slice header values from these syntax elements are used when decoding the slice.

In VVC, a coded picture contains a picture header. The picture header contains parameters that are common for all slices of the coded picture.

Intra Prediction

In intra prediction (a.k.a., spatial prediction), a block is predicted using previous decoded blocks within the same picture. The samples from the previously decoded blocks within the same picture are used to predict the samples inside the current block. A picture consisting of only intra-predicted blocks is referred to as an intra picture.

Inter Prediction

In inter prediction (a.k.a., temporal prediction), blocks of the current picture are predicted using blocks from previously decoded pictures. The samples from the blocks in the previously decoded pictures are used to predict the samples inside the current block.

A picture that allows inter-predicted blocks is referred to as an inter picture. The previous decoded pictures used for inter prediction are referred to as reference pictures.

The location of a referenced block inside a reference picture is indicated using a motion vector (MV). Each MV consists of x and y components which represent the displacements between the current block and the referenced block in x or y dimension. The amount of displacement may be finer than the distance between samples. When that is the case, a filtering (typically interpolation) is performed to calculate values used for prediction. FIG. 15 shows an example of a MV for the current block C.

An inter picture may depend on several reference pictures. The reference pictures are usually put into two reference picture lists, L0 and L1. The reference pictures that are output before the current picture are typically the first pictures in L0. The reference pictures that are output after the current picture are typically the first pictures in L1.

Inter predicted blocks can use one of two prediction types: uni- and bi-prediction. Uni-predicted block is predicted from one reference picture, either using L0 or L1. B1-prediction predicts from two reference pictures, one from L0 and the other from L1. FIG. 16 shows an example of the prediction types.

Low Delay Picture and Non-Low Delay Picture

A low delay picture is a picture that has all its reference pictures displayed before the picture. In other words, for a low delay picture, all its reference pictures have smaller POC values than the current POC.

A non-low delay picture is a picture that has at least one of its reference pictures displayed after the picture. In other words, a non-low delay picture has at least one reference picture with a larger POC value than the current POC.

Fractional MVs, Interpolation Filter and MV Rounding

The value of the MV's x or y component may correspond to a sample position which has finer granularity than integer (sample) position. Those positions are also referred to as fractional (sample) positions.

In VVC, the MV can be at 1/16 sample position (given in luma samples, so for 4:2:0 corresponding MV for chroma is in 1/32 sample positions). FIG. 17 depicts several fractional positions in the horizontal (x−) dimension. The solid-square blocks represent integer positions. The circles represent 1/16-position. For example, MV=(4, 10) means the x component is at 4/16 position and the y component is at 10/16 position.

In video coding, a MV rounding process is sometimes used to convert a MV at one position to another target position. One example of rounding is to round a fractional MV position to the nearest integer position.

When a MV is at a fractional position, a filtering (typically interpolation) is done to calculate the sample value at the fractional position. In VVC, the length (number of filter taps) of the interpolation filter for luma component is 8, as shown in the table below (here the filter gain is 64 (e.g., the sum of the coefficients is equal to 64), meaning that filter response is normalized by dividing by 64 or right shifting by 6, to have unity gain).

| Fractional sample | interpolation filter coefficients | | | | | | | |
|---|---|---|---|---|---|---|---|---|
| position p | $f_L[p][0]$ | $f_L[p][1]$ | $f_L[p][2]$ | $f_L[p][3]$ | $f_L[p][4]$ | $f_L[p][5]$ | $f_L[p][6]$ | $f_L[p][7]$ |
| 1 | 0 | 1 | −3 | 63 | 4 | −2 | 1 | 0 |
| 2 | −1 | 2 | −5 | 62 | 8 | −3 | 1 | 0 |
| 3 | −1 | 3 | −8 | 60 | 13 | −4 | 1 | 0 |
| 4 | −1 | 4 | −10 | 58 | 17 | −5 | 1 | 0 |
| 5 | −1 | 4 | −11 | 52 | 26 | −8 | 3 | −1 |
| 6 | −1 | 3 | −9 | 47 | 31 | −10 | 4 | −1 |
| 7 | −1 | 4 | −11 | 45 | 34 | −10 | 4 | −1 |
| 8 | −1 | 4 | −11 | 40 | 40 | −11 | 4 | −1 |
| 9 | −1 | 4 | −10 | 34 | 45 | −11 | 4 | −1 |
| 10 | −1 | 4 | −10 | 31 | 47 | −9 | 3 | −1 |
| 11 | −1 | 3 | −8 | 26 | 52 | −11 | 4 | −1 |
| 12 | 0 | 1 | −5 | 17 | 58 | −10 | 4 | −1 |
| 13 | 0 | 1 | −4 | 13 | 60 | −8 | 3 | −1 |
| 14 | 0 | 1 | −3 | 8 | 62 | −5 | 2 | −1 |
| 15 | 0 | 1 | −2 | 4 | 63 | −3 | 1 | 0 |

In VVC, an alternative filter can be used when the fractional sample position is at half-pel position (8/16). Compared to the half-pel filter in the previous table, the alternative half-pel filter has more (stronger) low-pass property. The coefficients of the alternative half-pel filter are shown below.

| Fractional sample | interpolation filter coefficients | | | | | | | |
|---|---|---|---|---|---|---|---|---|
| position p | $f_L[p][0]$ | $f_L[p][1]$ | $f_L[p][2]$ | $f_L[p][3]$ | $f_L[p][4]$ | $f_L[p][5]$ | $f_L[p][6]$ | $f_L[p][7]$ |
| 8 | 0 | 3 | 9 | 20 | 20 | 9 | 3 | 0 |

The procedure for filtering a block of samples is to first apply the filtering in the horizontal direction and then the output of the first filtering is then filtered in the vertical direction. The final output is normalized (R) such the filtering has unity gain. Filtering in the first stage can be down-shifted (P) to reduce the bit-depth of the second filtering.

Residual, Transform and Quantization

The difference between samples of a source block (contains original samples) and samples of a prediction block (a.k.a., residual block) is then typically compressed by a spatial transform to remove further redundancy. The transform coefficients are then quantized by a quantization parameter (QP) to control the fidelity of the residual block and the bitrate required to compress the block. A coded block flag (CBF) is used to indicate if there is any non-zero quantized transform coefficients. All coding parameters are then entropy coded at the encoder and decoded at the decoder. A reconstructed block can then be derived by inverse quantization and inverse transformation of the quantized transform coefficients if the coded block flag is one and then add that to the prediction block.

Hierarchy Picture Coding Structure

In random access configuration, intra coded pictures are positioned with a fixed interval like every second. Pictures between the intra picture are typically coded with a B-GOP structure as shown in FIG. 3. Picture 0 is coded first and then picture 8 are coded using picture 0 as its reference picture. Then picture 8 and picture 0 are used as reference pictures to code picture 4. Then similarly, picture 2 and picture 6 are coded. And finally, picture 1, 3, 5 and 7 pictures are coded.

We refer to pictures 1, 3, 5 and 7 to be on the highest hierarchical level, pictures 2, 4 and 6 to be on the next highest hierarchical level, and picture 4 to be on next lowest level and picture 8 to be on the lowest level. Typically picture 1, 3, 5 and 7 are not used for reference of any other pictures. They are called non-reference pictures. FIG. 18 shows an example of a four-layer B-group of picture (GOP) structure using two reference pictures per picture.

The assigned QP for each picture are usually different and are set according to the hierarchy level. Higher QP is assigned for pictures that at higher hierarchy level Inter Prediction/Motion Information For an inter block inside an inter picture in VVC, the inter prediction information consists of the following three elements:

(1) A reference picture list flag (RefPicListFlag). The flag signals which reference picture list is used for the block. When the value of the flag is equal to 0, it means only L0 is used for predicting the current block. When the value of the flag is equal to 1, it means only L1 is used for predicting the current block. When the value of the flag is equal to 2, it means both L0 and L1 are used for predicting the current block.

(2) A reference picture index (RefPicIdx) per the reference picture list used. The index signals which reference picture inside the reference list to be used for predicting the current block.

(3) A motion vector (MV) per the reference picture used. It signals the position inside the reference picture that is used for predicting the current block.

The inter prediction information is also referred to as motion information. The decoder stores the motion information for each inter block. In other words, an inter block maintains its own motion information.

Encoder Decision and Rate Distortion (RD) Cost

In practice, for an encoder to decide the best prediction mode for a current block, it would evaluate all the possible prediction modes for the current block and select the prediction mode that yields the smallest Rate-Distortion (RD) cost.

The RD cost is calculated as D+λ*R. The D (Distortion) measures the difference between the reconstructed block and the corresponding source block. One commonly used metric for calculating D is the sum of squared difference (SSE), where $SSE=\Sigma_{x,y}(P_A(x, y)-P_B(x, y))^2$, where the $P_A$ and $P_B$ are the sample values in the two blocks A and B respectively. The R (Rate) is usually an estimation of the bits to be spent on encoding the mode. The A is a trade-off parameter between R and D.

Motion Information Signaling

VVC includes several methods of implicit signaling motion information for each block, including the merge method and the subblock merge method. A common motivation behind the implicit methods is to inherit or reuse motion information from neighboring coded blocks.

Merge (Block Merge) Method and Merge Mode

The merge method is similar to the one in the high efficiency video coding (HEVC) standard. The method is sometimes referred to as the block merge method since the derived motion information is used for generating the samples of the entire block.

The method first generates a list of motion information candidates. The list is also referred to as the merge list. The candidates are derived from previously coded blocks. The blocks can be spatially adjacent neighboring blocks or temporal collocated blocks relative to the current block.

The merge list construction process usually checks the previously coded blocks in a predefined order, for example, T-L-TR-LB-TL. For each previously coded block being checked, if this previously coded block is inter coded and its motion information has no duplicates in the list, then the motion information of this previously coded block is added to the merge list. FIG. 19 shows possible spatial neighboring blocks: left (L), top (T), top-right (TR), left-bottom (LB) and top-left (TL) for fetching neighboring motion information.

After the merge list is generated, one of the candidates inside the list is used to derive the motion information of the current block. The candidate selection process is done on the encoder side. An encoder would select a best candidate from the list and encode an index (merge_index) in the bitstream to signal to a decoder. The decoder receives the index, it follows the same merge list derivation process as the encoder, and uses the index to retrieve the correct candidate. The blocks that use block merge method are sometimes referred to as blocks in merge mode.

In the current development of ECM (An enhanced compression model which has its compression capabilities beyond VVC), non-adjacent spatial blocks are also considered for fetching motion information from during the merge list construction. FIG. 20 shows some (marked with NA1, NA2 and NA3) of those non-adjacent spatial blocks.

Subblock Merge Method and Subblock Motion Refinement

VVC also include subblock merge method and also subblock based motion refinement. A current block is divided into a number of subblocks and each subblock is allowed to have its own motion information. FIG. 21 shows an example of a current block and its subblocks. For each subblock, it maintains its own motion information.

Explicit Motion Information Signaling

VVC also include explicit motion information signaling method, such as AMVP (alternative motion vector prediction). For a current inter block, its number of reference pictures, reference picture indices as well as motion vectors are explicitly signaled and encoded into the bitstream.

The explicit motion information signaling is usually chosen by an encoder when directly inheriting or reusing motion information from previously coded inter blocks do not fit well for a current block. For example, when the previously coded blocks and the current block belong to different objects, it is likely that the motion of the previously coded blocks and the current block do not correlate well.

When an encoder decides to use explicit signaling for the current block's MV, the process usually involves deriving of a motion vector predictor (MVP), where the MVP is derived from MVs of previously coded blocks. After the MVP is derived, the motion vector difference (MVD) between the MVP and the current MV is calculated as MVD=MV−MVP. FIG. 22 shows an example of the MVD derivation.

As can be clearly seen, the MVD also have two components: x- and y-components. Each component has information in two folds: magnitude and sign. Both the magnitude and sign information (if the magnitude is non-zero) of x- and y-components are signaled in a bitstream.

For example, in case the current block's MV is (+10, −5), and the derived MVP is (+7, +3), the MVD would be (+3, −8), where 3=10−7 and −8=−5−3. The magnitudes 3 and 8, as well as the signs + and − are all signaled in the bitstream.

For a decoder to reconstruct the MV of the current block, it decodes the magnitude and sign information of both x- and y-components of the MVD from the bitstream. Then the decoder follows the same predictor derivation process as the encoder to derive the MVP, the MV is reconstructed by using the MVP and MVD. Using the example above, the decoder decodes the magnitudes 3 and 8 as well as the signs + and − from the bitstream to get the MVD (+3, −8). The decoder then uses the same predictor derivation process to get MVP which is (+7, +3). The MV is derived as (+10, −5), where 10=3+7, −5=−8+3.

Reference Picture Resampling (RPR)

RPR is a VVC tool that can be used to enable switching between different resolutions in a video bitstream without encoding a startup of a new sequence with an intra picture. This gives more flexibility to adapt resolution to control bitrate which can be of used in, for example, video conferencing or adaptive streaming. RPR can make use of previously encoded pictures of lower or higher resolution than the current picture to be encoded by re-scaling them to the resolution of the current picture as part of inter prediction of the current picture.

SUMMARY

Certain challenges exist. The filters proposed in JVET-Y0172 and JVET-Y02024 (test EE2-2.6) has phase misalignments at lower frequencies. The phase and magnitude responses of the filters suggested in EE2-2.6 are shown in FIG. 23(*a*)-(*b*). In FIG. 23(*a*), the green straight lines show the ideal phase delay responses, and the red curves show the phase delay responses for the EE2-2.6 filters. Similarly, in FIG. 23(*b*), the green line of the figures shows the ideal magnitude responses, and the red curves show the magnitude responses of the EE2-2.6 filters. As shown in FIGS. 23(*a*) and 9(*b*), the EE2-2.6 filters have suboptimal phase characteristics at lower frequencies, and such suboptimal phase characteristics are especially noticeable not only for 12-tap but also for 6-tap and 8-tap filters, as shown in FIGS. 24(*a*)-25(*b*). Additionally, as shown in FIGS. 26(*a*)-27(*b*), there are phase misalignments in the scalable extension of high efficiency video coding (SHVC) filters that could be used for RPR in ECM to align with use of 12-tap for luma in motion compensation for upscaling. Furthermore, as shown in FIGS. 28(*a*)-29(*b*), 4-tap chroma RPR filters for 2× and 1.5× downscaling that are used in VVC and in ECM attenuate at lower frequencies, and thus they remove more information than needed.

Furthermore, the 2× filters proposed in JVET-Z0062 for downsampling (a.k.a., "downscaling") cause some amplification of lower frequency components and some phase misalignments at lower frequencies. On the other hand, while the 1.5× filters proposed in JVET-Z0062 for downsampling are generally good, they cause some pass through of some higher frequency components with non-zero magnitude.

FIGS. 33(*a*)-34(*b*) show the phase and magnitude responses of the filters suggested in JVET-Z0062 (note that FIG. 33 shows same filter as in Filter set #3 shown in FIG. 5 (*a*) and 5(*b*)). The straight lines in FIGS. 33(*a*) and 34(*a*) correspond to the ideal phase delay responses, the curves in FIG. 33(*a*) correspond to the phase delay responses for the 1.5× downsampling 12-tap filters from JVET-Z0062, and the curves in FIG. 34(*a*) correspond to the phase delay responses for the 2× downsampling 12-tap filters from JVET-Z0062 (note that FIG. 34 shows same filter as in FIG. 27(*a*)- and 27(*b*)).

The straight lines in FIGS. 33(*b*) and 34(*b*) correspond to reference magnitude response, the solid curves in FIG. 33(*b*) correspond to the magnitude responses of the 1.5× downsampling 12-tap filters from JVET-Z0062, and the curves in FIG. 34(*b*) correspond to the magnitude responses of the 2× downsampling 12-tap filters from JVET-Z0062. Reference magnitude response is a reference response that is similar to an ideal response but is not exactly an ideal response. For example, in FIGS. 33(*b*) and 34(*b*), the straight lines correspond to a reference magnitude response but is not an ideal magnitude response as an ideal magnitude response should have a constant value of 1 from the normalized frequency 0 to a certain cut-off frequency and a constant value of 0 from the cut-off frequency to the normalized frequency 1.

Accordingly, in one aspect of the embodiments of this disclosure, there is provided a method for encoding or decoding a video, the video comprising a sequence of pictures which includes a first picture (e.g., a reference picture) and a second picture (e.g., a current picture). The method comprises obtaining a first group of values of samples included in a first block, wherein the first block is included in the first picture; selecting from a set of filters a filter to use for generating a second group of values included in a second block, wherein the second block is included in the first picture or the second picture; and using the selected filter and the first group of values, generating the second group of values, wherein the filter comprises a set of 6, 8, 10, or 12 coefficient values, and the set of coefficient values is selected from groups of coefficient values ±2. The groups of coefficient values are disclosed in embodiment A1 below.

In another aspect there is provided a method for encoding or decoding a video, the video comprising a sequence of pictures which includes a first picture and a second picture, the method comprising: obtaining a first group of values of samples included in a first block, wherein the first block is included in the first picture; selecting a length of a filter based on characteristics of reconstructed samples included in the first picture or the second picture; selecting a filter based at least on the selected length; interpolating the first group of values using the selected filter; based on a result of interpolating the first group of values, generating a second group of values of samples included in a second block, wherein the second block is included in the first picture or the second picture; and based at least on the second group of values, encoding or decoding the video.

In a different aspect, there is provided a computer program comprising instructions which when executed by processing circuitry cause the processing circuitry to perform the method of any one of the embodiments described above.

In a different aspect, there is provided an apparatus for encoding or decoding a video, the video comprising a sequence of pictures which includes a first picture and a second picture. The apparatus is configured to: obtain a first group of values of samples included in a first block, wherein the first block is included in the first picture; interpolate the first group of values using a filter; based on a result of interpolating the first group of values, generate a second group of values of samples included in a second block, wherein the second block is included in the first picture or the second picture; and based at least on the second group of values, encode or decode the video, wherein the filter comprises a set of 6, 8, 10, or 12 coefficient values, and the set of 6, 8, 10, or 12 coefficient values is selected from groups of coefficient values ±2. The groups of coefficient values are disclosed in embodiment A1 below.

In a different aspect, there is provided an apparatus for encoding or decoding a video, the video comprising a sequence of pictures which includes a first picture and a second picture. The apparatus is configured to obtain a first group of values of samples included in a first block, wherein the first block is included in the first picture; select a length of a filter based on characteristics of reconstructed samples included in the first picture or the second picture; select a filter based at least on the selected length; interpolate the first group of values using the selected filter; based on a result of interpolating the first group of values, generate a second group of values of samples included in a second block, wherein the second block is included in the first picture or the second picture; and based at least on the second group of values, encode or decode the video.

In a different aspect, there is provided an apparatus. The apparatus comprises a memory and processing circuitry coupled to the memory, wherein the apparatus is configured to perform the method of any one of the embodiments described above.

Embodiments of this disclosure provide interpolation filters with accurate phase for use in interpolation for performing a motion compensated prediction in video coding, upscaling to a higher resolution, downscaling to a lower resolution, and/or at the same time for performing a motion compensation (e.g., RPR). The filters may be used at least for one color or luma or chroma component.

BRIEF DESCRIPTION OF THE DRAWINGS

The accompanying drawings, which are incorporated herein and form part of the specification, illustrate various embodiments.

FIG. 33(*b*) shows plots of magnitude of frequency responses of 1.5× downsampling 12-tap filters from JVET-Z0062. Same as 1.5× filters in Filter set #3 also shown in FIG. 5(*b*).

FIG. 34(*b*) shows plots of magnitude of frequency responses of 2× downsampling 12-tap filters from JVET-Z0062. Same as 2× filters in SHIM also shown in FIG. 27(*b*)

DETAILED DESCRIPTION

Figure 1A:
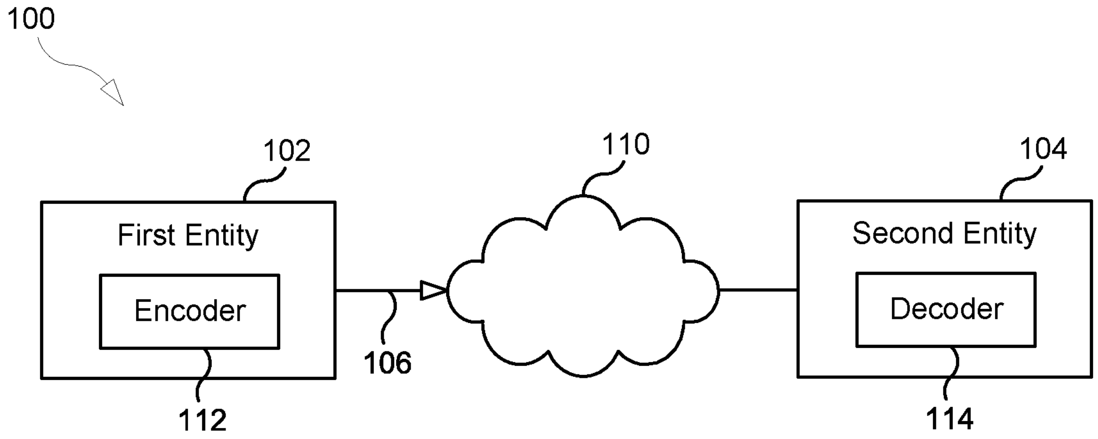
FIGS. 1A, 1B and 1C respectively show a system according to some embodiments.

FIG. 1A shows a system 100 according to some embodiments. The system 100 comprises a first entity 102, a second entity 104, and a network 110. The first entity 102 is configured to transmit towards the second entity 104 a video stream (a.k.a., "a video bitstream," "a bitstream," "an encoded video") 106.

The first entity 102 may be any computing device (e.g., a network node such as a server) capable of encoding a video using an encoder 112 and transmitting the encoded video towards the second entity 104 via the network 110. The second entity 104 may be any computing device (e.g., a network node) capable of receiving the encoded video and decoding the encoded video using a decoder 114. Each of the first entity 102 and the second entity 104 may be a single physical entity or a combination of multiple physical entities. The multiple physical entities may be located in the same location or may be distributed in a cloud.

Figure 1B:
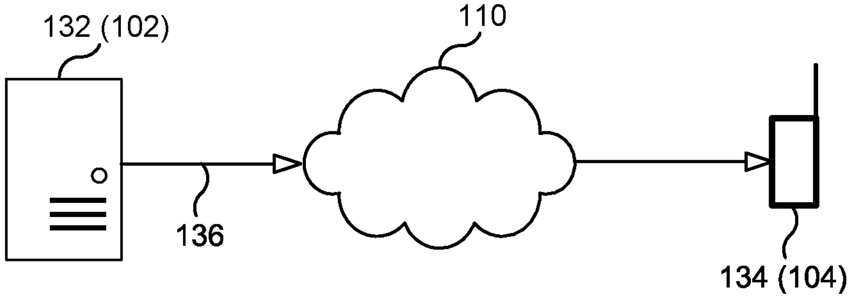

In some embodiments, as shown in FIG. 1B, the first entity 102 is a video streaming server 132 and the second entity 104 is a user equipment (UE) 134. The UE 134 may be any of a desktop, a laptop, a tablet, a mobile phone, or any other computing device. The video streaming server 132 is capable of transmitting a video bitstream 136 (e.g., YouTube™ video streaming) towards the video streaming client 134. Upon receiving the video bitstream 136, the UE 134 may decode the received video bitstream 136, thereby generating and displaying a video for the video streaming.

Figure 1C:
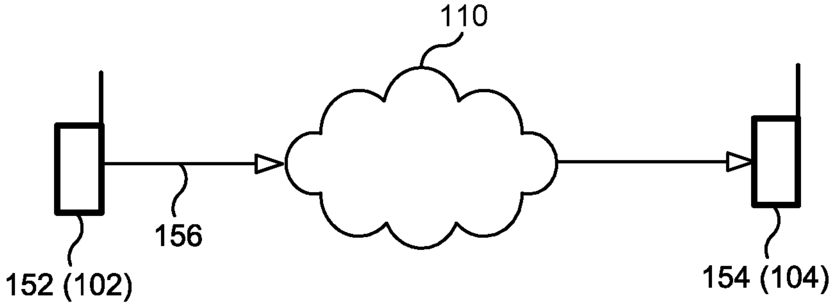

In other embodiments, as shown in FIG. 1C, the first entity 102 and the second entity 104 are first and second UEs 152 and 154. For example, the first UE 152 may be an offeror of a video conferencing session or a caller of a video chat, and the second UE 154 may be an answerer of the video conference session or the answerer of the video chat. In the embodiments shown in FIG. 1C, the first UE 152 is capable of transmitting a video bitstream 156 for a video conference (e.g., Zoom™, Skype™, MS Teams™, etc.) or a video chat (e.g., Facetime™) towards the second UE 154. Upon receiving the video bitstream 156, the UE 154 may decode the received video bitstream 156, thereby generating and displaying a video for the video conferencing session or the video chat.

Figure 2:
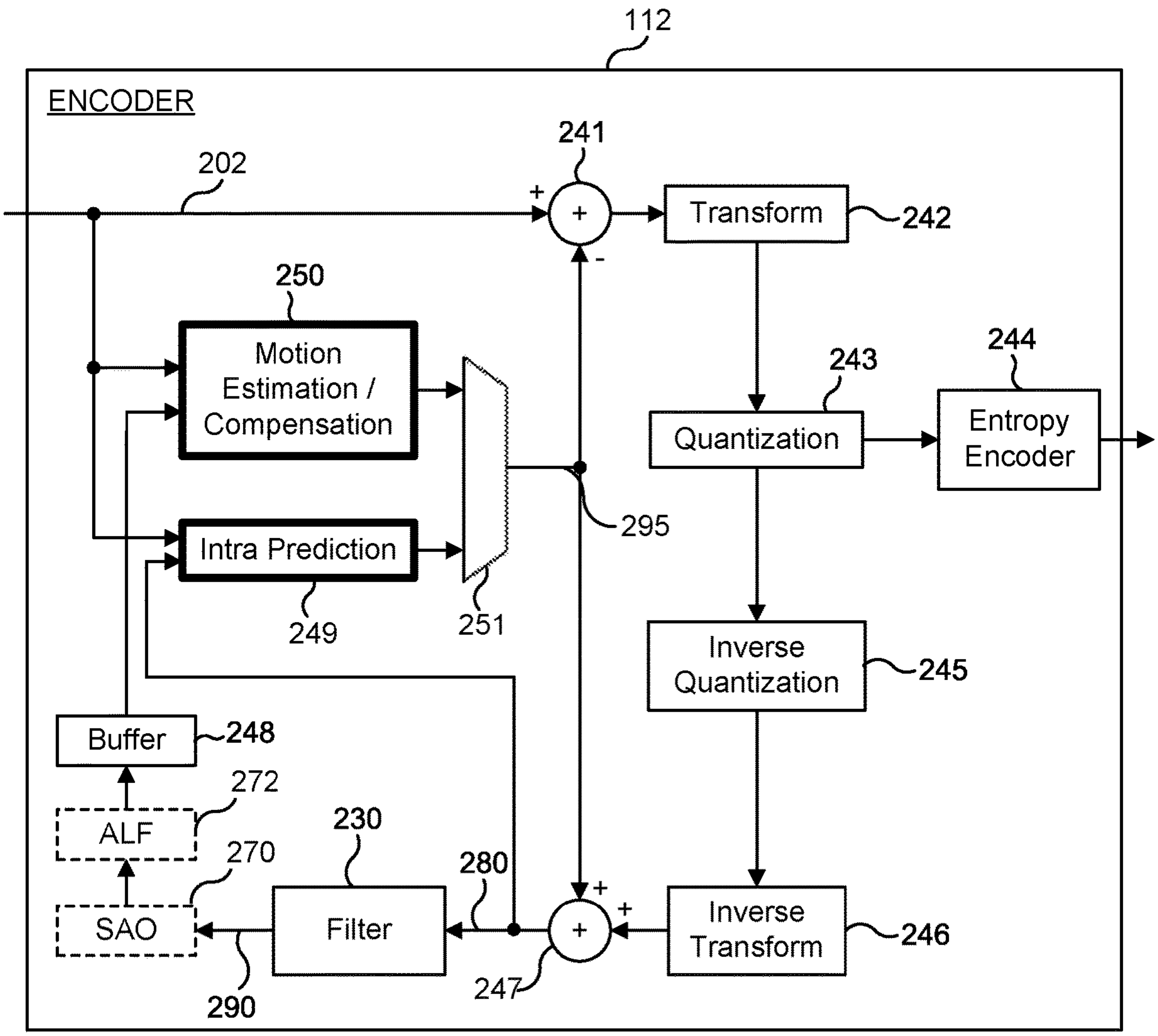
FIG. 2 shows a schematic block diagram of an encoder according to some embodiments.

FIG. 2 shows a schematic block diagram of the encoder 112 according to some embodiments. The encoder 112 is configured to encode a block of pixel values (hereafter "block") in a video frame of a source video 202. In the encoder 112, a current block (e.g., a block included in a video frame of the source video 202) is predicted by performing a motion estimation by a motion estimator 250 from an already provided block in the same frame or in a previous frame. The result of the motion estimation is a motion or displacement vector associated with the reference block, in the case of inter prediction. The motion vector is utilized by the motion compensator 250 for outputting an inter prediction of the block.

An intra predictor 249 computes an intra prediction of the current block. The outputs from the motion estimator/compensator 250 and the intra predictor 249 are inputted to a selector 251 that either selects intra prediction or inter prediction for the current block. The output from the selector 251 is input to an error calculator in the form of an adder 241 that also receives the pixel values of the current block. The adder 241 calculates and outputs a residual error as the difference in pixel values between the block and its prediction. The error is transformed in a transformer 242, such as by a discrete cosine transform, and quantized by a quantizer 243 followed by coding in an encoder 244, such as by entropy encoder. In inter coding, the estimated motion vector is brought to the encoder 244 for generating the coded representation of the current block.

The transformed and quantized residual error for the current block is also provided to an inverse quantizer 245 and inverse transformer 246 to retrieve the original residual error. This error is added by an adder 247 to the block prediction output from the motion compensator 250 or the intra predictor 249 to create a reconstructed sample block 280 that can be used in the prediction and coding of a next block. The reconstructed sample block 280 is processed by a Filter 230 according to the embodiments in order to perform filtering to combat any blocking artifact. The output from the Filter 230, i.e., the output data 290, is then temporarily stored in a frame buffer 248, where it is available to the intra predictor 249 and the motion estimator/compensator 250.

In some embodiments, the encoder 112 may include SAO unit 270 and/or ALF 272. The SAO unit 270 and the ALF 272 may be configured to receive the output data 290 from the Filter 230, perform additional filtering on the output data 290, and provide the filtered output data to the buffer 248.

Even though, in the embodiments shown in FIG. 2, the Filter 230 is disposed between the SAO unit 270 and the adder 247, in other embodiments, the Filter 230 may replace the SAO unit 270 and/or the ALF 272. Alternatively, in other embodiments, the Filter 230 may be disposed between the buffer 248 and the motion compensator 250. Furthermore, in some embodiments, a deblocking filter (not shown) may be disposed between the Filter 230 and the adder 247 such that the reconstructed sample block 280 goes through the deblocking process and then is provided to the Filter 230. Also, in other embodiments, the Filter 230 may serve as a deblocking filter.

Figure 3:
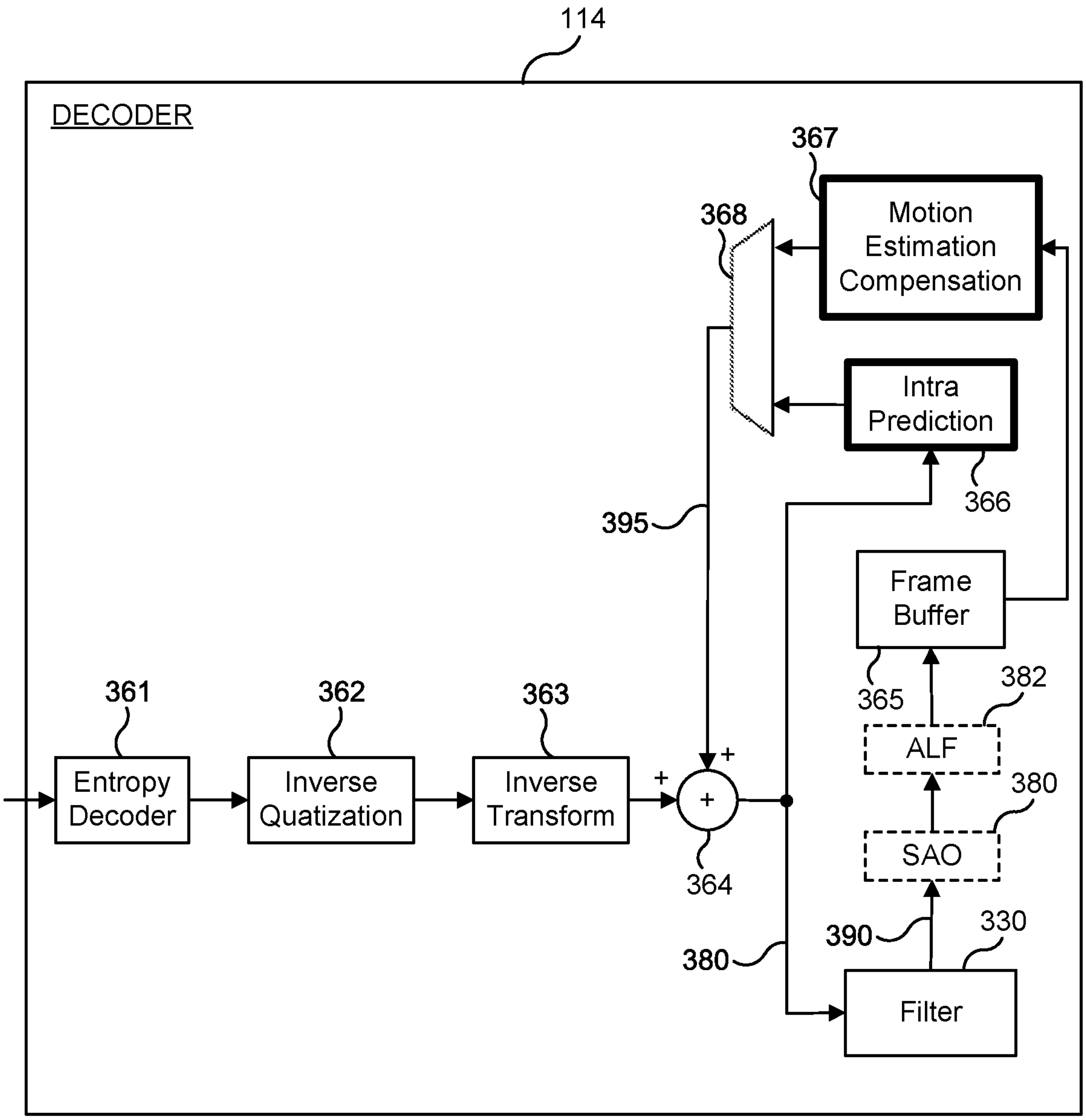
FIG. 3 shows a schematic block diagram of a decoder according to some embodiments.

FIG. 3 is a schematic block diagram of the decoder 114 according to some embodiments. The decoder 114 comprises a decoder 361, such as entropy decoder, for decoding an encoded representation of a block to get a set of quantized and transformed residual errors. These residual errors are dequantized in an inverse quantizer 362 and inverse transformed by an inverse transformer 363 to get a set of residual errors. These residual errors are added in an adder 364 to the pixel values of a reference block. The reference block is determined by a motion estimator/compensator 367 or intra predictor 366, depending on whether inter or intra prediction is performed.

A selector 368 is thereby interconnected to the adder 364 and the motion estimator/compensator 367 and the intra predictor 366. The resulting decoded block 380 output form the adder 364 is input to a Filter unit 330 according to the embodiments in order to filter any blocking artifacts. The filtered block 390 is output form the Filter 330 and is furthermore preferably temporarily provided to a frame buffer 365 and can be used as a reference block for a subsequent block to be decoded.

The frame buffer (e.g., decoded picture buffer (DPB)) 365 is thereby connected to the motion estimator/compensator 367 to make the stored blocks of pixels available to the motion estimator/compensator 367. The output from the adder 364 is preferably also input to the intra predictor 366 to be used as an unfiltered reference block.

In some embodiments, the decoder 114 may include SAO unit 380 and/or ALF 372. The SAO unit 380 and the ALF 382 may be configured to receive the output data 390 from the Filter 330, perform additional filtering on the output data 390, and provide the filtered output data to the buffer 365.

Even though, in the embodiments shown in FIG. 3, the Filter 330 is disposed between the SAO unit 380 and the adder 364, in other embodiments, the Filter 330 may replace the SAO unit 380 and/or the ALF 382. Alternatively, in other embodiments, the Filter 330 may be disposed between the buffer 365 and the motion compensator 367. Furthermore, in some embodiments, a deblocking filter (not shown) may be disposed between the Filter 330 and the adder 364 such that the reconstructed sample block 380 goes through the deblocking process and then is provided to the Filter 330.

As discussed above, in some embodiments, an interpolation-based filtering (a.k.a., "the filtering") may be used for the motion estimation/compensation (performed by the motion estimator/compensator 250/367) and/or the intra prediction (performed by the intra predictor 249/366). The filtering may also be used for converting a resolution of a current picture into a higher resolution (i.e., upscaling) or a lower resolution (i.e., downscaling). For example, the filter set #1 discussed below may be used for upscaling while the filter sets #2, #3, #4, and #5 may be used for downscaling. In some embodiments, this filtering-based upscaling/downscaling may be used with the motion compensation (a.k.a., "motion compensated prediction") (e.g., RPR).

In this disclosure, the filtering means adding up products obtained from multiplying values of samples (e.g., decoded samples) of a previous (or a current) picture by N filter coefficients using a motion vector (mvX, mvY). The formulas below show an example of the filtering.

$$t(x', y') = \left(\sum_{n=0}^{N-1} f_i(n) * r\left(x + n - \frac{N}{2} + 1 + mvXInt,\ y + mvYInt\right)\right) >> P$$

$$r''(x, y) = \left(\sum_{n=0}^{N-1} f_j(n) * t\left(x',\ y' + n - \frac{N}{2} + 1\right)\right) >> R$$

t(x', y') is a value of a sample after horizontal filtering, x is a horizontal coordinate and y is a vertical coordinate of a sample in the current picture, x' is a horizontal coordinate and y' is a vertical coordinate of a sample in the temporal buffer t, mvXInt and mvYInt are the motion vectors in the integer resolution that are used to determine the sample to filter in the reference picture r, $f_i$ is the sub-sample filter that corresponds to the fractional position (phase) of mvX and $f_i(n)$ is the filter coefficient at position n of that filter, $f_j$ is the sub-sample filter that corresponds to the fractional position (phase) of mvY and $f_j(n)$ is the filter coefficient at position n of that filter, r(A, B) is the value of a sample in the previous/current picture at the location (A, B), and N is filter length (i.e., the number of taps).

r"(x, y) is a sample that has both been horizontally and vertically filtered, e.g., a sample obtained using the inter prediction that is based on fractional sample interpolation of samples from a reference picture (previously reconstructed picture). As shown above, before the vertical filtering is applied, the horizontal filtering is applied for all samples that are needed for vertical filtering.

As explained above, in order to perform the filtering, filter coefficients are needed.

Filter Set #1

In some embodiments, the filters in the following filter set may be used as interpolation filters in video coding for phase 1/32 to 31/32 with 9 bits coefficients (where the magnitude of each coefficient is represented by 8 bits and the sign (+ or −) of each coefficient is represented by 1 sign bit). The zero phase, e.g. phase 0/32, pixel copy is sufficient, that can also be indicated by the filter coefficients {0, 0, 256, 0, 0, 0}.

For the filter having the filter length of 6 (i.e., N=6), the coefficients of the filter are: {1, −6, 256, 6, −1, 0}, {2, −11, 254, 14, −4, 1}, {4, −18, 252, 23, −6, 1}, {6, −24, 249, 32, −9, 2}, {6, −26, 244, 41, −12, 3}, {7, −30, 239, 53, −18, 5}, {8, −34, 235, 61, −19, 5}, {10, −38, 228, 72, −22, 6}, {10, −39, 220, 84, −26, 7}, {10, −40, 213, 94, −29, 8}, {11, −42, 205, 105, −32, 9}, {11, −42, 196, 116, −35, 10}, {11, −42, 186, 128, −37, 10}, {11, −42, 177, 138, −38, 10}, {11, −41, 167, 148, −40, 11}, {11, −41, 158, 158, −41, 11}, {11, −40, 148, 167, −41, 11}, {10, −38, 138, 177, −42, 11}, {10, −37, 128, 186, −42, 11}, {10, −35, 116, 196, −42, 11}, {9, −32, 105, 205, −42, 11}, {8, −29, 94, 213, −40, 10}, {7, −26, 84, 220, −39, 10}, {6, −22, 72, 228, −38, 10}, {5, −19, 61, 235, −34, 8}, {5, −18, 53, 239, −30, 7}, {3, −12, 41, 244, −26, 6}, {2, −9, 32, 249, −24, 6}, {1, −6, 23, 252, −18, 4}, {1, −4, 14, 254, −11, 2}, {0, −1, 6, 256, −6, 1}.

In the above set of coefficients, there are 31 subsets of coefficients. The first subset of coefficients comprises {1, −6, 256, 6, −1, 0} and the last subset of coefficients comprises {0, −1, 6, 256, −6, 1}. For the first subset of coefficients, i (or j)=1 and for the last subset of coefficients, i (or j)=31. Thus, $f_1(0)=1$, $f_1(1)=-6$, $f_1(2)=256$, . . . etc. Similarly, $f_{31}(0)=0$, $f_{31}(1)=-1$, $F_{31}(2)=6$, . . . etc.

The zero phase, e.g. phase 0/32, pixel copy is sufficient, that can also be indicated by the filter coefficients {0, 0, 0, 256, 0, 0, 0, 0}. For the filter having the filter length of 8 (i.e., N=8), the coefficients of the filter are: {−1, 3, −7, 254, 11, −6, 3, −1}, {−1, 4, −12, 253, 16, −6, 3, −1}, {−2, 7, −18, 249, 28, −12, 6, −2}, {−2, 8, −23, 248, 33, −11, 4, −1}, {−3, 11, −28, 242, 47, −19, 8, −2}, {−3, 12, −33, 241, 51, −16, 5, −1}, {−4, 15, −38, 236, 62, −21, 8, −2}, {−5, 18, −43, 231, 72, −23, 8, −2}, {−6, 19, −44, 223, 84, −28, 12, −4}, {−4, 15, −40, 210, 99, −35, 15, −4}, {−3, 12, −36, 195, 117, −42, 18, −5}, {−4, 15, −40, 190, 124, −42, 18, −5}, {−4, 15, −41, 183, 133, −42, 16, −4}, {−4, 15, −42, 176, 142, −44, 18, −5}, {−5, 17, −42, 165, 153, −45, 18, −5}, {−4, 16, −44, 160, 160, −44, 16, −4}, {−5, 18, −45, 153, 165, −42, 17, −5}, {−5, 18, −44, 142, 176, −42, 15, −4}, {−4, 16, −42, 133, 183, −41, 15, −4}, {−5, 18, −42, 124, 190, −40, 15, −4}, {−5, 18, −42, 117, 195, −36, 12, −3}, {−4, 15, −35, 99, 210, −40, 15, −4}, {−4, 12, −28, 84, 223, −44, 19, −6}, {−2, 8, −23, 72, 231, −43, 18, −5}, {−2, 8, −21, 62, 236, −38, 15, −4}, {−1, 5, −16, 51, 241, −33, 12, −3}, {−2, 8, −19, 47, 242, −28, 11, −3}, {−1, 4, −11, 33, 248, −23, 8, −2}, {−2, 6, −12, 28, 249, −18, 7, −2}, {−1, 3, −6, 16, 253, −12, 4, −1}, {−1, 3, −6, 11, 254, −7, 3, −1}.

The zero phase, e.g. phase 0/32, pixel copy is sufficient, that can also be indicated by the filter coefficients {0, 0, 0, 0, 0, 256, 0, 0, 0, 0, 0, 0}. For the filter having the filter length of 12 (i.e., N=12), the coefficients of the filter are: {0, 1, −2, 3, −7, 255, 8, −3, 2, −1, 0, 0}, {−1, 3, −4, 6, −14, 254, 17, −8, 5, −3, 1, 0}, {−1, 3, −5, 9, −21, 253, 25, −10, 5, −3, 1, 0}, {−1, 4, −8, 13, −26, 249, 34, −14, 8, −4, 1, 0}, {−2, 6, −10, 16, −32, 246, 44, −18, 9, −4, 1, 0}, {−2, 5, −9, 17, −36, 241, 54, −22, 12, −6, 3, −1}, {−1, 4, −9, 18, −39, 235, 65, −26, 13, −6, 3, −1}, {−2, 6, −12, 22, −44, 230, 75, −28, 14, −7, 3, −1}, {−2, 6, −12, 23, −47, 224, 85, −31, 15, −7, 3, −1}, {−2, 7, −13, 23, −48, 216, 97, −36, 18, −9, 4, −1}, {−2, 6, −12, 23, −49, 209, 106, −37, 19, −10, 4, −1}, {−3, 8, −14, 26, −52, 200, 119, −42, 22, −12, 6, −2}, {−2, 6, −12, 24, −51, 191, 129, −43, 22, −12, 6, −2}, {−2, 7, −14, 25, −50, 180, 141, −46, 23, −12, 6, −2}, {−2, 6, −12, 24, −50, 171, 151, −47, 23, −12, 6, −2}, {−2, 6, −13, 25, −50, 162, 162, −50, 25, −13, 6, −2}, {−2, 6, −12, 23, −47, 151, 171, −50, 24, −12, 6, −2}, {−2, 6, −12, 23, −46, 141, 180, −50, 25, −14, 7, −2}, {−2, 6, −12, 22, −43, 129, 191, −51, 24, −12, 6, −2}, {−2, 6, −12, 22, −42, 119, 200, −52, 26, −14, 8, −3}, {−1, 4, −10, 19, −37, 106, 209, −49, 23, −12, 6, −2}, {−1, 4, −9, 18, −36, 97, 216, −48, 23, −13, 7, −2}, {−1, 3, −7, 15, −31, 85, 224, −47, 23, −12, 6, −2}, {−1, 3, −7, 14, −28, 75, 230, −44, 22, −12, 6, −2}, {−1, 3, −6, 13, −26, 65, 235, −39, 18, −9, 4, −1}, {−1, 3, −6, 12, −22, 54, 241, −36, 17, −9, 5, −2}, {0, 1, −4, 9, −18, 44, 246, −32, 16, −10, 6, −2}, {0, 1, −4, 8, −14, 34, 249, −26, 13, −8, 4, −1}, {0, 1, −3, 5, −10, 25, 253, −21, 9, −5, 3, −1}, {0, 1, −3, 5, −8, 17, 254, −14, 6, −4, 3, −1}, {0, 0, −1, 2, −3, 8, 255, −7, 3, −2, 1, 0}.

Each of the coefficients may be represented using 9 bits, where 8 bits indicate the magnitude of a coefficient and 1 bit indicates the sign (whether the coefficient is + or −) of the coefficient.

Figure 30A:
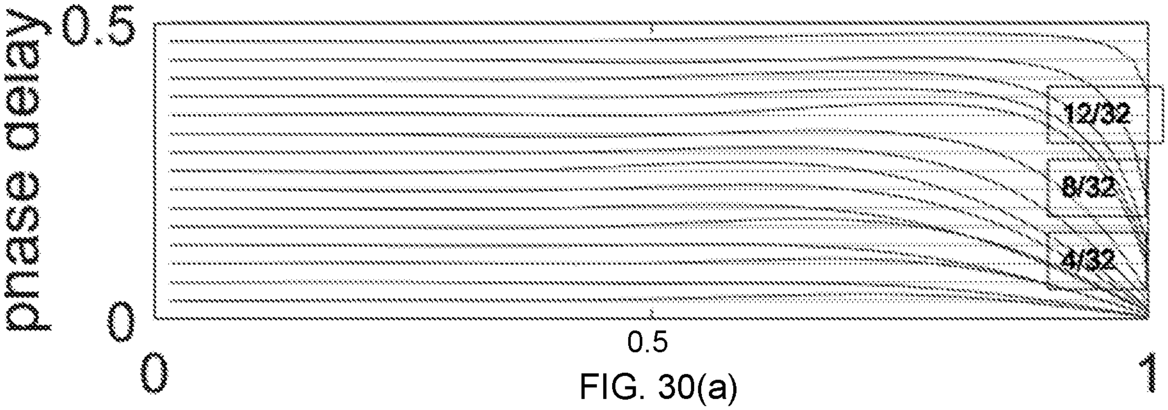
FIGS. 30(*a*) and 30(*b*) respectively show plots of phase delay response and magnitude of frequency response of a filter.
Figure 30B:
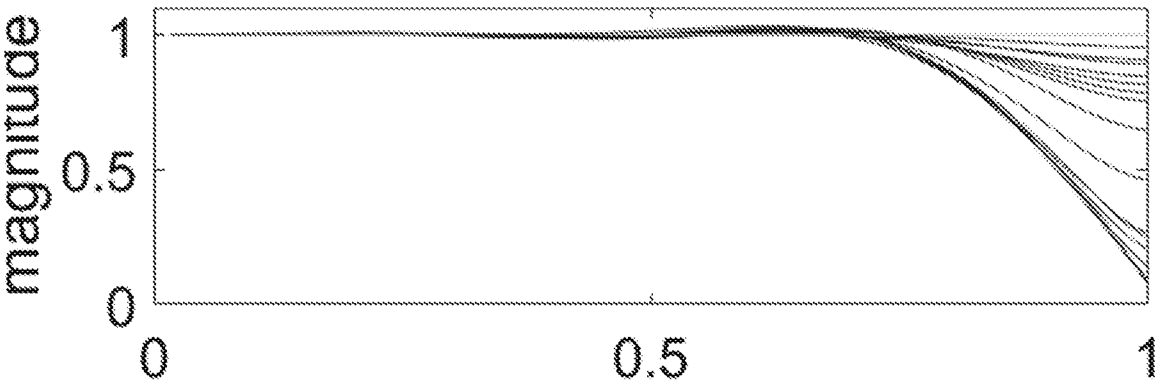
Figure 31A:
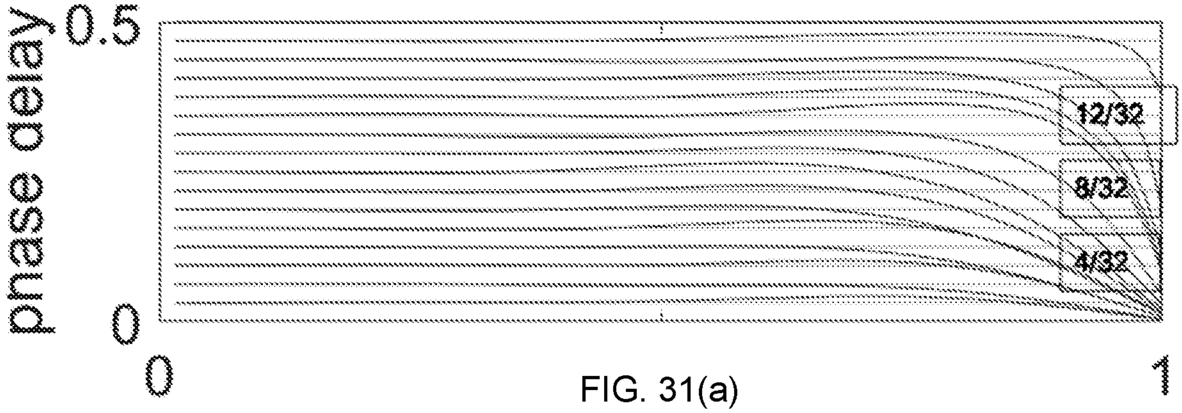
FIGS. 31(*a*) and 31(*b*) respectively show plots of phase delay response and magnitude of frequency response of a filter.
Figure 31B:
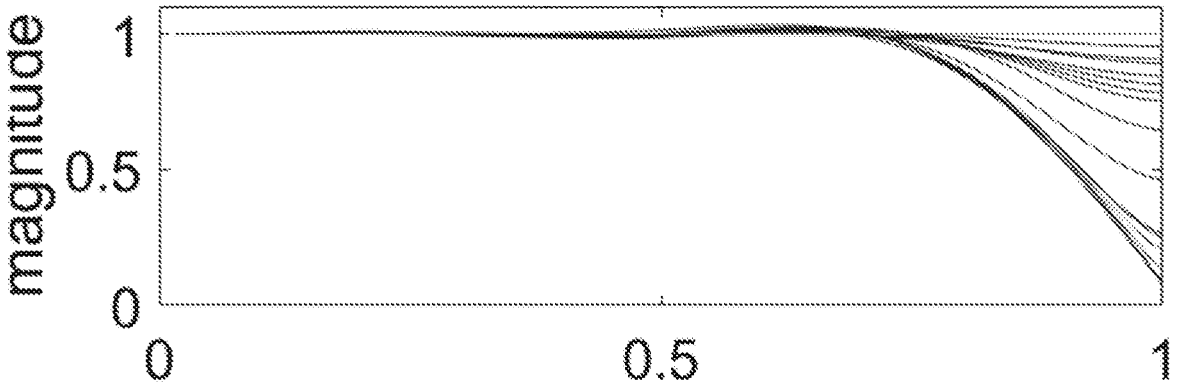
Figure 32A:
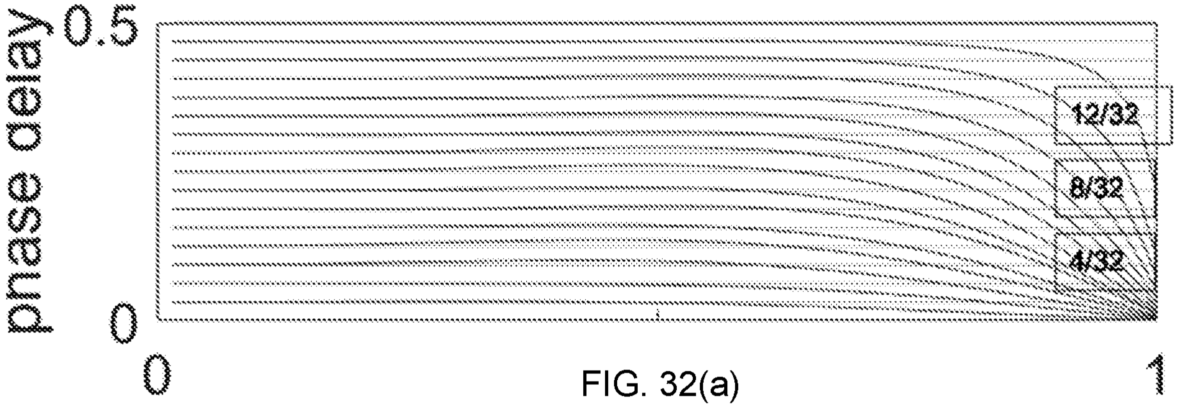
FIGS. 32(*a*) and 32(*b*) respectively show plots of phase delay response and magnitude of frequency response of a filter.
Figure 32B:
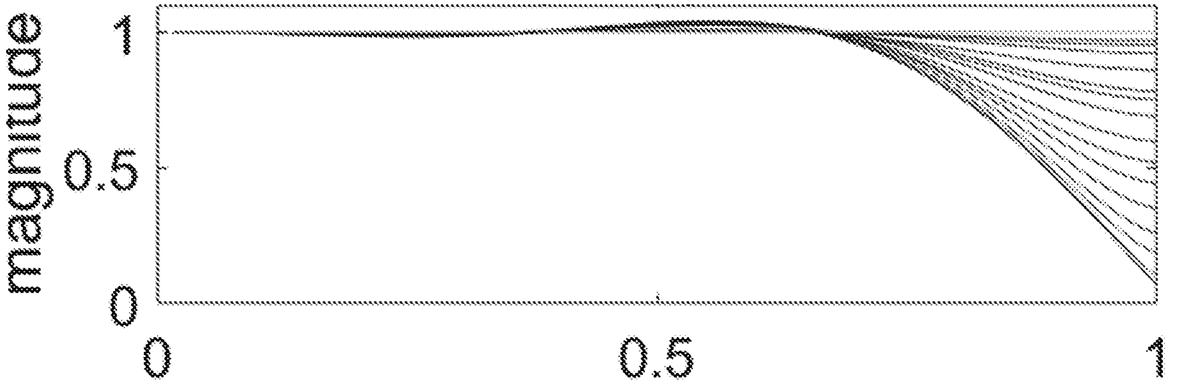
Figures 33A, 33B:
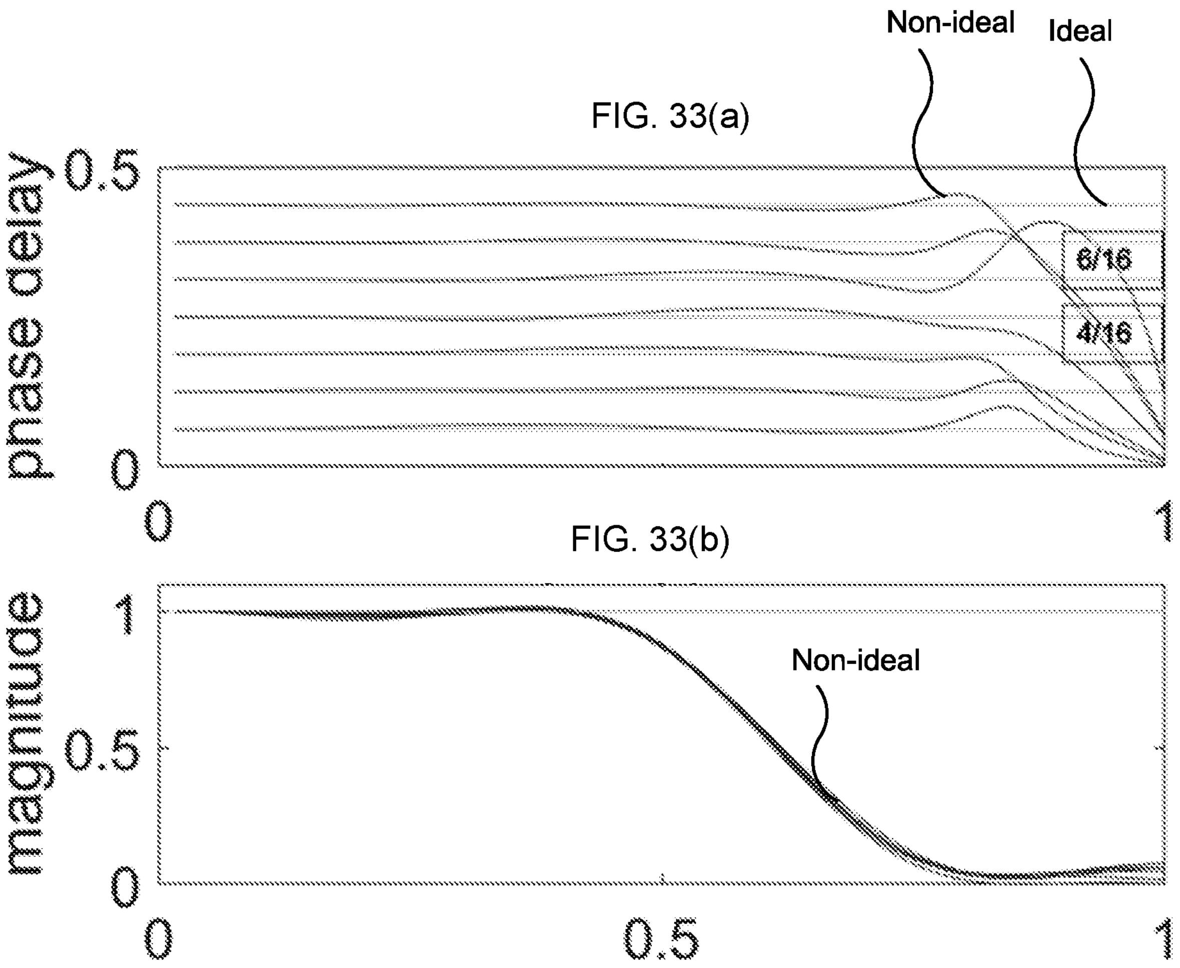
FIG. 33(*a*) shows plots of phase delay responses of 1.5× downsampling 12-tap filters from JVET-Z0062. Same as 1.5× filters in Filter set #3 also shown in FIG. 5(*a*).
Figure 34A:
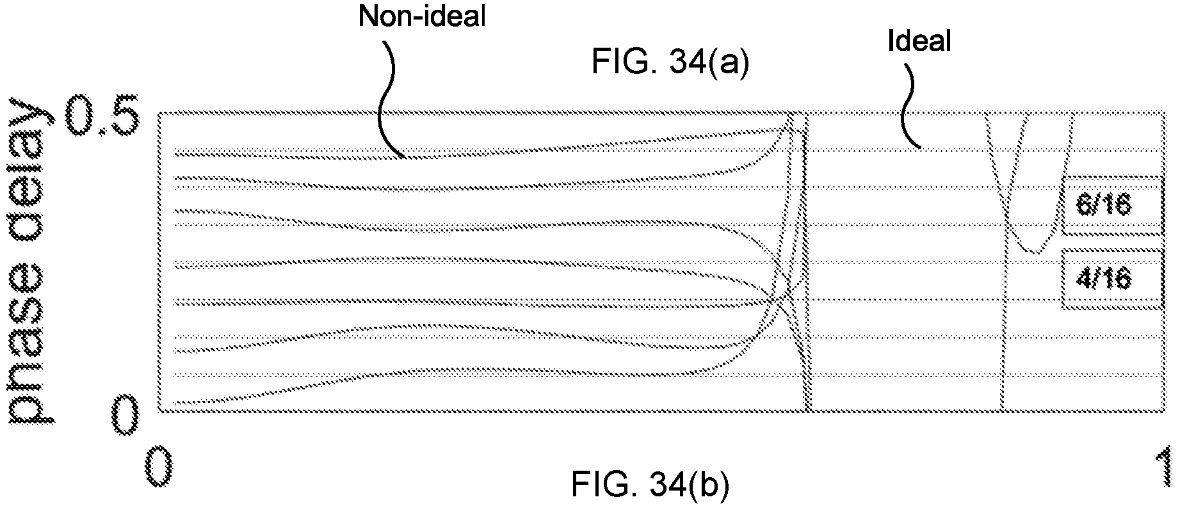
FIG. 34(*a*) shows plots of phase delay responses of 2× downsampling 12-tap filters from JVET-Z0062. Same as 2× filters in SHM also shown in FIG. 27(*a*).
Figure 34B:
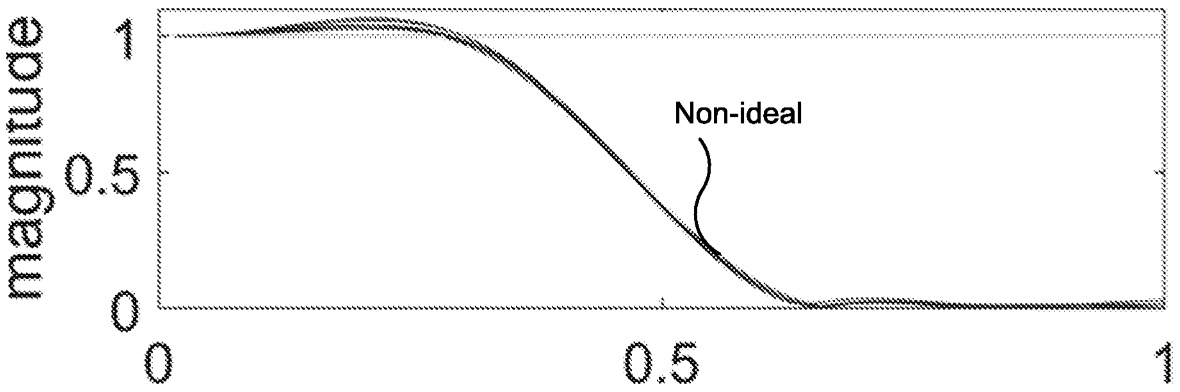

FIG. 30 (*a*) shows plots of phase delay responses of the 12-tap chroma interpolation filters according to some embodiments and FIG. 30(*b*) shows plots of magnitude of frequency responses of the filters. FIG. 31 (*a*) shows plots of phase delay responses of the 8-tap chroma interpolation filters according to some embodiments and FIG. 31(*b*) shows plots of magnitude of frequency responses of the filters. FIG. 32 (*a*) shows plots of phase delay responses of the 6-tap chroma interpolation filters according to some embodiments and FIG. 32(*b*) shows plots of magnitude of frequency responses of the filters.

Filter Set #2

In some embodiments, phases from 1/32 to 31/32 may be defined to resemble the magnitude response of, for example, the half-pel LP filter that can be selected for use in VVC. Instead of the half-pel LP filter of VVC, other reference half-pel filters could also be used. Also instead of using a range between 1 and 32, a different range of phases can be used. The important aspect of the filter set #2 is that the magnitude of the frequency response of a half-pel filter may be maintained in some degrees but that the phase characteristics may vary according to desired phase accuracy (1/32 or 1/16).

The filters in the following filter set may be used as interpolation filters in video coding for 1/32 to 31/32 with 9 bits coefficients (where the magnitude of each coefficient is represented by 8 bits and the sign (+ or −) of each coefficient is represented by 1 sign bit). The coefficients may be obtained from VVC (e.g., the half-pel filter) with its filter gain adjusted to 256.

For the filter having the filter length of 6 (i.e., N=6), the coefficients of the filter are: {28, 46, 103, 49, 29, 1}, {26, 47, 100, 53, 28, 2}, {25, 46, 99, 55, 28, 3}, {26, 39, 105, 53, 29, 4}, {25, 39, 102, 56, 29, 5}, {23, 40, 99, 60, 28, 6}, {22, 40, 96, 63, 28, 7}, {20, 41, 93, 66, 29, 7}, {19, 40, 92, 68, 29, 8}, {18, 39, 91, 70, 29, 9}, {16, 40, 88, 73, 30, 9}, {16, 38, 87, 74, 31, 10}, {16, 36, 86, 75, 32, 11}, {14, 38, 82, 77, 34, 11}, {12, 38, 81, 79, 35, 11}, {12, 36, 80, 80, 36, 12}, {11, 35, 79, 81, 38, 12}, {11, 34, 77, 82, 38, 14}, {11, 32, 75, 86, 36, 16}, {10, 31, 74, 87, 38, 16}, {9, 30, 73, 88, 40, 16}, {9, 29, 70, 91, 39, 18}, {8, 29, 68, 92, 40, 19}, {7, 29, 66, 93, 41, 20}, {7, 28, 63, 96, 40, 22}, {6, 28, 60, 99, 40, 23}, {5, 29, 56, 102, 39, 25}, {4, 29, 53, 105, 39, 26}, {3, 28, 55, 99, 46, 25}, {2, 28, 53, 100, 47, 26}, {1, 29, 49, 103, 46, 28}.

In some embodiments, corresponding luma filters with 1/16 phase may be obtained by taking every other phase from the above defined filter set. Indeed, filters with 16 phases may be obtained by taking every other phase from any filters with 32 phases.

For the filter having the filter length of 8 (i.e., N=8), the coefficients of the filter are: {0, 29, 44, 105, 47, 30, 1, 0}, {1, 25, 49, 96, 55, 27, 3, 0}, {1, 24, 47, 96, 57, 27, 5, −1}, {0, 24, 45, 97, 58, 28, 5, −1}, {−1, 25, 42, 98, 58, 30, 5, −1}, {−1, 24, 41, 97, 60, 30, 6, −1}, {−2, 25, 38, 97, 62, 30, 8, −2}, {−2, 24, 37, 96, 64, 30, 9, −2}, {−2, 23, 36, 95, 66, 30, 10, −2}, {−2, 21, 37, 92, 69, 31, 10, −2}, {−2, 20, 36, 91, 71, 31, 11, −2}, {0, 16, 39, 85, 74, 32, 11, −1}, {−1, 17, 36, 86, 75, 32, 12, −1}, {0, 13, 39, 82, 77, 35, 10, 0}, {0, 12, 38, 81, 79, 35, 11, 0}, {0, 12, 36, 80, 80, 36, 12, 0}, {0, 11, 35, 79, 81, 38, 12, 0}, {0, 10, 35, 77, 82, 39, 13, 0}, {−1, 12, 32, 75, 86, 36, 17, −1}, {−1, 11, 32, 74, 85, 39, 16, 0}, {−2, 11, 31, 71, 91, 36, 20, −2}, {−2, 10, 31, 69, 92, 37, 21, −2}, {−2, 10, 30, 66, 95, 36, 23, −2}, {−2, 9, 30, 64, 96, 37, 24, −2}, {−2, 8, 30, 62, 97, 38, 25, −2}, {−1, 6, 30, 60, 97, 41, 24, −1}, {−1, 5, 30, 58, 98, 42, 25, −1}, {−1, 5, 28, 58, 97, 45, 24, 0}, {−1, 5, 27, 57, 96, 47, 24, 1}, {0, 3, 27, 55, 96, 49, 25, 1}, {0, 1, 30, 47, 105, 44, 29, 0}.

In some embodiments, corresponding luma filters with 1/16 phase may be obtained by taking every other phase from the above defined filter set.

Figure 4A:
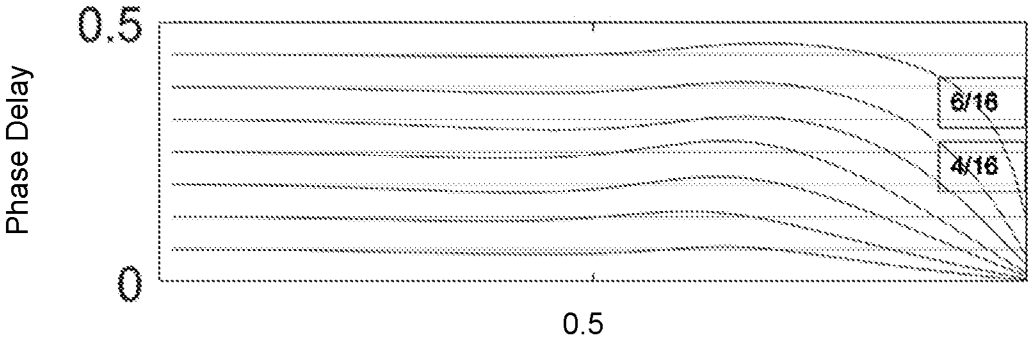
FIGS. 4(*a*) and 4(*b*) respectively show plots of phase delay response and magnitude of frequency response of a filter according to some embodiments.
Figure 4B:
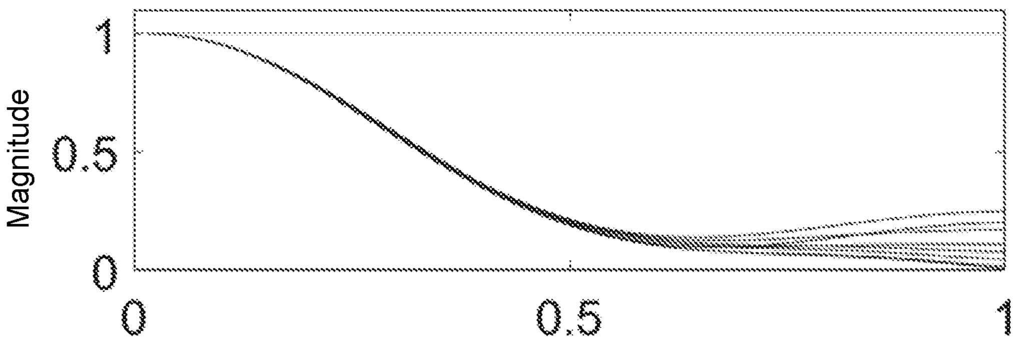

FIG. 4(*a*) shows plots of phase delay responses and FIG. 4(*b*) shows magnitude of frequency responses (b) of proposed 6-tap LP luma interpolation filters. As shown in FIGS. 4(*a*) and 4(*b*), the phase of the above filters is maintained but the filters have much more low-pass characteristics.

Filter Set #3

In some embodiments, phases from full-pel, 1/16 to 15/16 may be defined to resemble the magnitude response of, for example, the SHM (reference codec for SHVC) filters for down-sampling. In other embodiments, instead of the SHM filters for down-sampling, other reference filters or reference functions may be used. Also in other embodiments, a different range of phases may be used. The important aspect of the filter set #3 is that the magnitude of the frequency response of the SHM filters may be maintained in some degree but that the phase characteristics may vary according to desired phase accuracy (1/16 or 1/32).

The filters in the following filter set may be used as interpolation filters in video coding for phase full-pel, 1/16 to 15/16 with 9 bits coefficients (where the magnitude of each coefficient is represented by 8 bits and the sign (+ or −) of each coefficient is represented by 1 sign bit).

For the filter having the filter length of 12 (i.e., N=12) for 1.5× downsampling, the coefficients of the filter are: {0, 10, −12, −19, 70, 158, 70, −19, −12, 10, 0, 0}, {0, 10, −9, −22, 62, 156, 79, −17, −13, 9, 1, 0}, {−1, 10, −8, −22, 54, 155, 87, −13, −16, 9, 2, −1}, {−2, 10, −5, −23, 46, 152, 95, −9, −18, 9, 2, −1}, {−2, 9, −4, −23, 39, 150, 103, −6, −20, 8, 4, −2}, {−2, 8, −1, −24, 33, 144, 111, −2, −20, 6, 5, −2}, {−3, 9, −1, −24, 26, 142, 117, 4, −22, 5, 5, −2}, {−3, 8, 0, −23, 20, 137, 123, 10, −23, 4, 5, −2}, {−2, 6, 3, −25, 16, 130, 130, 16, −25, 3, 6, −2}, {−2, 5, 4, −23, 10, 123, 137, 20, −23, 0, 8, −3}, {−2, 5, 5, −22, 4, 117, 142, 26, −24, −1, 9, −3}, {−2, 5, 6, −20, −2, 111, 144, 33, −24, −1, 8, −2}, {−2, 4, 8, −20, −6, 103, 150, 39, −23, −4, /9, −2}, {−1, 2, 9, −18, −9, 95, 152, 46, −23, −5, 10, −2}, {−1, 2, 9, −16, −13, 87, 155, 54, −22, −8, 10, −1}, {0, 1, 9, −13, −17, 79, 156, 62, −22, −9, 10, 0}

Figure 5A:
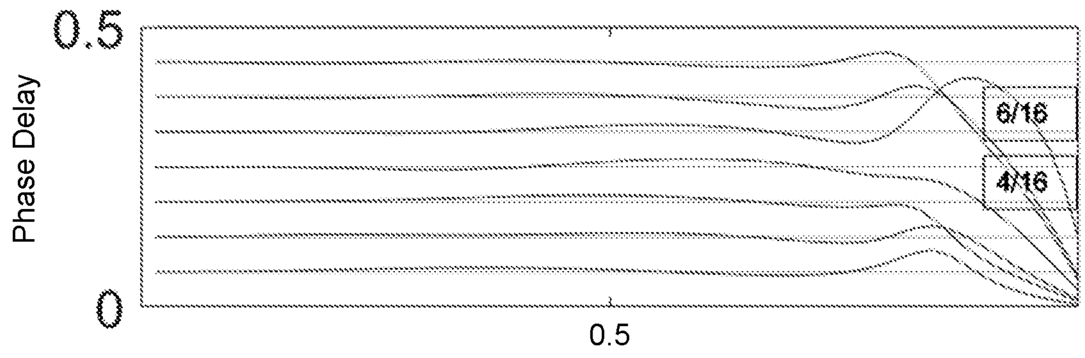
FIGS. 5(*a*) and 5(*b*) respectively show plots of phase delay response and magnitude of frequency response of a filter according to some embodiments.
Figure 5B:
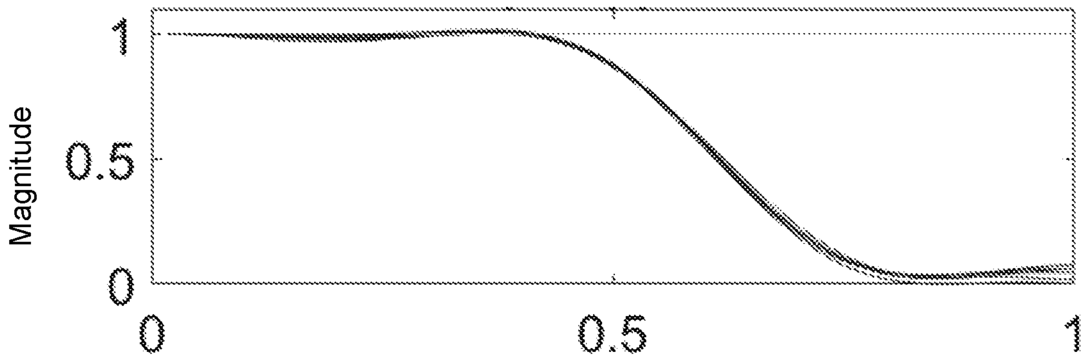

FIG. 5(*a*) show plots of improved phase delay responses and FIG. 5(*b*) shows plots of improved magnitude of frequency responses of the above 12-tap 1.5× downsampling filters.

For the filter having the filter length of 12 (i.e., N=12) for 2× downsampling, the coefficients of the filter are: {4, −7, −17, 13, 73, 124, 73, 13, −17, −7, 4, 0}, {3, −7, −17, 9, 72, 122, 81, 15, −16, −9, 3, 0}, {3, −5, −16, 6, 66, 120, 85, 18, −15, −10, 3, 1}, {3, −6, −17, 3, 64, 120, 90, 23, −15, −11, 1, 1}, {2, −3, −15, 0, 58, 117, 93, 25, −13, −10, 1, 1}, {4, −4, −16, −2, 54, 116, 96, 31, −14, −12, 0, 3}, {4, −3, −14, −6, 49, 114, 101, 32, −12, −12, 0, 3}, {4, −3, −13, −7, 45, 110, 103, 38, −11, −12, −2, 4}, {2, 0, −14, −9, 42, 107, 107, 42, −9, −14, 0, 2}, {4, −2, −12, −11, 38, 103, 110, 45, −7, −13, −3, 4}, {3, 0, −12, −12, 32, 101, 114, 49, −6, −14, −3, 4}, {3, 0, −12, −14, 31, 96, 116, 54, −2, −16, −4, 4}, {1, 1, −10, −13, 25, 93, 117, 58, 0, −15, −3, 2}, {1, 1, −11, −15, 23, 90, 120, 64, 3, −17, −6, 3}, {1, 3, −10, −15, 18, 85, 120, 66, 6, −16, −5, 3}, {0, 3, −9, −16, 15, 81, 122, 72, 9, −17, −7, 3}.

Figure 6A:
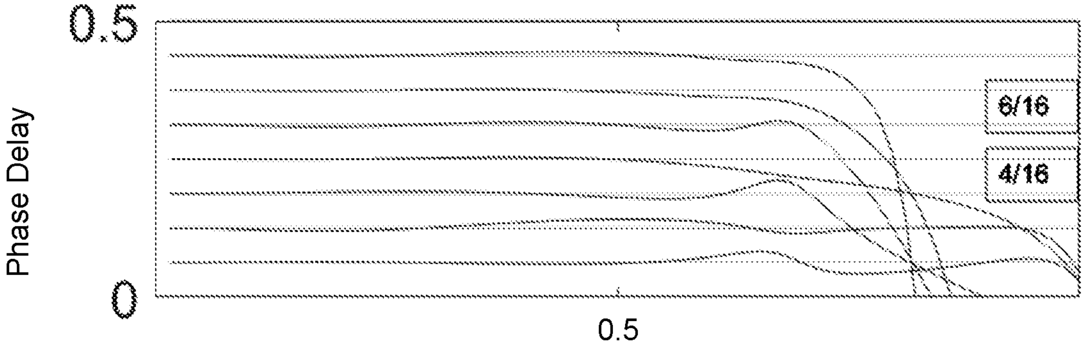
FIGS. 6(*a*) and 6(*b*) respectively show plots of phase delay response and magnitude of frequency response of a filter according to some embodiments.
Figure 6B:
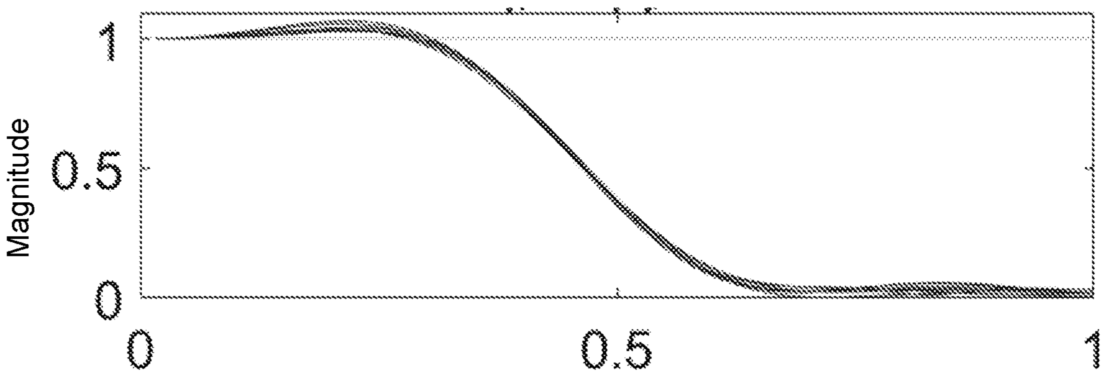

FIG. 6(*a*) show plots of phase delay responses and FIG. 6(*b*) shows plots of magnitude of frequency responses of the above 12-tap 2× downsampling filters.

As can be seen in FIGS. 5(*a*)-6(*b*), the phase is more accurate than the SHIM filters (FIG. 12 an FIG. 13 for 1.5× and 2× downsampling respectively) but have similar magnitude responses as the SHIM filters.

In some embodiments, the 6-tap half-pel low-pass filter may be extended when it is used as an alternative filter for half-pel interpolation in motion compensation.

In some embodiments, the extended filter may be the following 10-tap filter: f={2, 4, 10, 34, 78, 78, 34, 10, 4, 2}, with the normalization factor 256. Alternatively, the extended filter may be the following 8-tap filter: f={1, 10, 39, 78, 78, 39, 10, 1}, with the normalization factor 256.

In some embodiments, the magnitude frequency response of the alternative half-pel (i.e., with phase at 8/16 or 16/32) filter may be used to derive filters for interpolation of other phases and may be made available for selection of a low-pass filter for motion compensation instead of the 6-tap or 8-tap filters discussed with respect to the filter set #2.

Filter Set #4

In some embodiments, the phase alignments for the 4-tap chroma RPR 1.5× filters (used for motion compensation and downscaling from a higher resolution to a lower resolution at around the ratio of 1.5×) in VVC may be corrected by using the filter(s) in the following filter set. As compared to the 4-tap chroma RPR 1.5× filters in VVC, the filters in the following filter set are extended to 8-tap. In some embodiments, the filters may be extended to 6-tap.

The filters in the following filter set may be used as interpolation filters in video coding for phase full-pel, 1/32 to 31/32 with 9 bits coefficients (where the magnitude of each coefficient is represented by 8 bits and the sign (+ or −) of each coefficient is represented by 1 sign bit). The coefficients may be obtained from VVC (e.g., the half-pel filter (phase 16/32) and the full-pel filter) with its filter gain adjusted to 256.

The zero phase, corresponding to integer motion, e.g. phase 0/32, pixel copy is sufficient, that can also be indicated by the filter coefficients {0, 0, 256, 0, 0, 0}. For the filter having the filter length of 6 (i.e., N=6), the coefficients of the filter are: {0, 44, 160, 53, −2, 1}, {−2, 42, 160, 59, −4, 1}, {−2, 38, 159, 65, −5, 1}, {−1, 33, 159, 68, −4, 1}, {−2, 33, 154, 74, −4, 1}, {−1, 27, 155, 78, −4, 1}, {−2, 25, 153, 84, −5, 1}, {−2, 22, 151, 89, −5, 1}, {−1, 17, 151, 93, −6, 2}, {−2, 16, 147, 99, −5, 1}, {−1, 14, 142, 103, −3, 1}, {−1, 12, 139, 107, −2, 1}, {−1, 10, 135, 112, 0, 0}, {−1, 8, 132, 116, 1, 0}, {0, 3, 131, 122, −1, 1}, {0, 4, 124, 124, 4, 0}, {1, −1, 122, 131, 3, 0}, {0, 1, 116, 132, 8, −1}, {0, 0, 112, 135, 10, −1}, {1, −2, 107, 139, 12, −1}, {1, −3, 103, 142, 14, −1}, {1, −5, 99, 147, 16, −2}, {2, −6, 93, 151, 17, −1}, {1, −5, 89, 151, 22, −2}, {1, −5, 84, 153, 25, −2}, {1, −4, 78, 155, 27, −1}, {1, −4, 74, 154, 33, −2}, {1, −4, 68, 159, 33, −1}, {1, −5, 65, 159, 38, −2}, {1, −4, 59, 160, 42, −2}, {1, −2, 53, 160, 44, 0}.

Figure 7A:
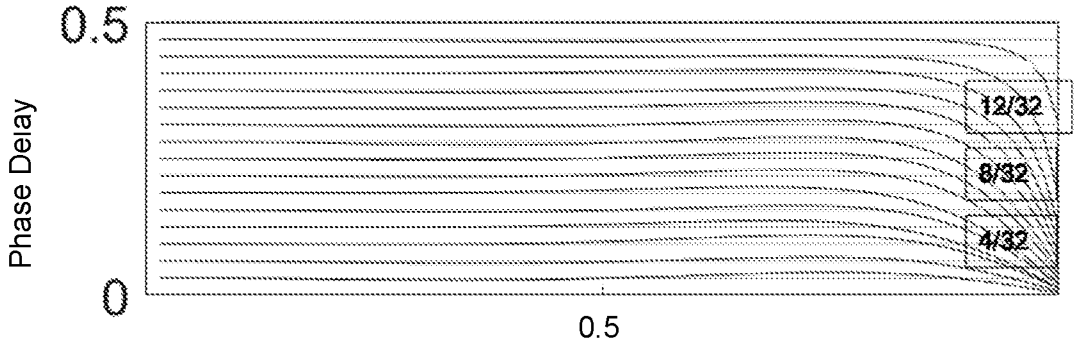
FIGS. 7(*a*) and 7(*b*) respectively show plots of phase delay response and magnitude of frequency response of a filter according to some embodiments.
Figure 7B:
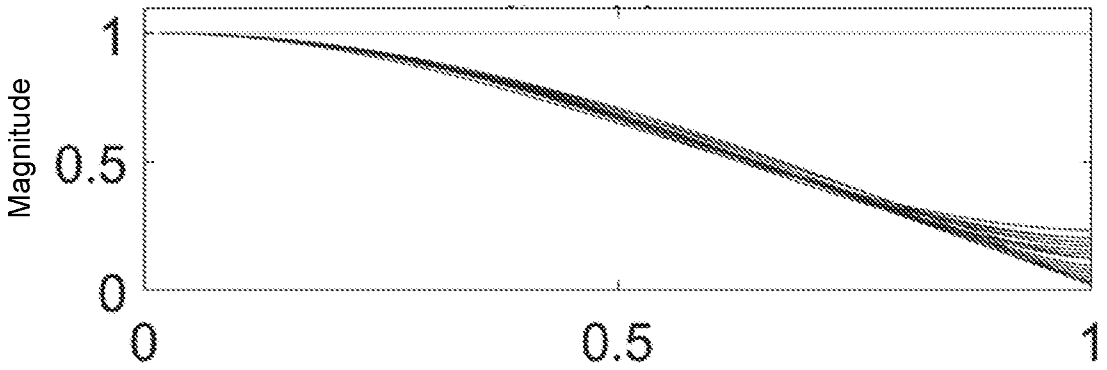

FIG. 7(*a*) shows plots of improved phase delay responses and FIG. 7(*b*). shows magnitude of frequency responses of proposed 6-tap chroma RPR1.5× downsampling filters.

In other embodiments, filters which are more similar to 12-tap luma filter for 1.5× downscaling but with only 6-tap for chroma 1.5× downscaling may be derived. In some embodiments, the filters having the following coefficients may be used for the filtering (for phase full-pel, 1/32 to 31/32).

The filters in the following filter set may be used as interpolation filters in video coding for phase full-pel, 1/32 to 31/32 with 9 bits coefficients (where the magnitude of each coefficient is represented by 8 bits and the sign (+ or −) of each coefficient is represented by 1 sign bit).

For the filter having the filter length of 6 (i.e., N=6), the coefficients of the filter are: {−14, 64, 156, 64, −14, 0}, {−13, 59, 155, 68, −12, −1}, {−13, 56, 154, 71, −11, −1}, {−13, 52, 153, 76, −10, −2}, {−12, 47, 153, 79, −9, −2}, {−13, 45, 151, 84, −8, −3}, {−13, 39, 154, 88, −9, −3}, {−14, 34, 156, 94, −10, −4}, {−15, 33, 152, 99, −7, −6}, {−15, 30, 150, 103, −5, −7}, {−14, 26, 148, 107, −4, −7}, {−12, 23, 143, 110, −1, −7}, {−13, 18, 145, 116, −2, −8}, {−10, 15, 139, 118, 1, −7}, {−15, 19, 134, 122, 9, −13}, {−14, 18, 129, 123, 13, −13}, {−14, 18, 124, 124, 18, −14}, {−13, 13, 123, 129, 18, −14}, {−13, 9, 122, 134, 19, −15}, {−7, 1, 118, 139, 15, −10}, {−8, −2, 116, 145, 18, −13}, {−7, −1, 110, 143, 23, −12}, {−7, −4, 107, 148, 26, −14}, {−7, −5, 103, 150, 30, −15}, {−6, −7, 99, 152, 33, −15}, {−4, −10, 94, 156, 34, −14}, {−3, −9, 88, 154, 39, −13}, {−3, −8, 84, 151, 45, −13}, {−2, −9, 79, 153, 47, −12}, {−2, −10, 76, 153, 52, −13}, {−1, −11, 71, 154, 56, −13}, {−1, −12, 68, 155, 59, −13}.

Figure 8A:
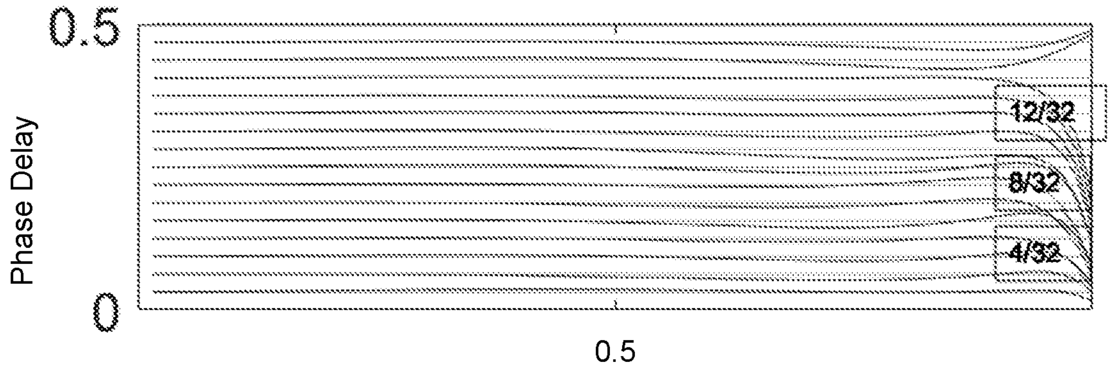
FIGS. 8(*a*) and 8(*b*) respectively show plots of phase delay response and magnitude of frequency response of a filter according to some embodiments.
Figure 8B:
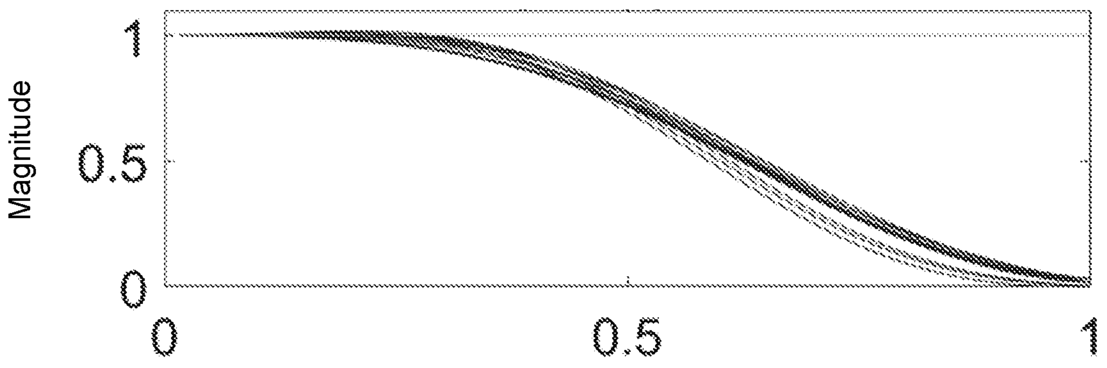
Figure 9A:
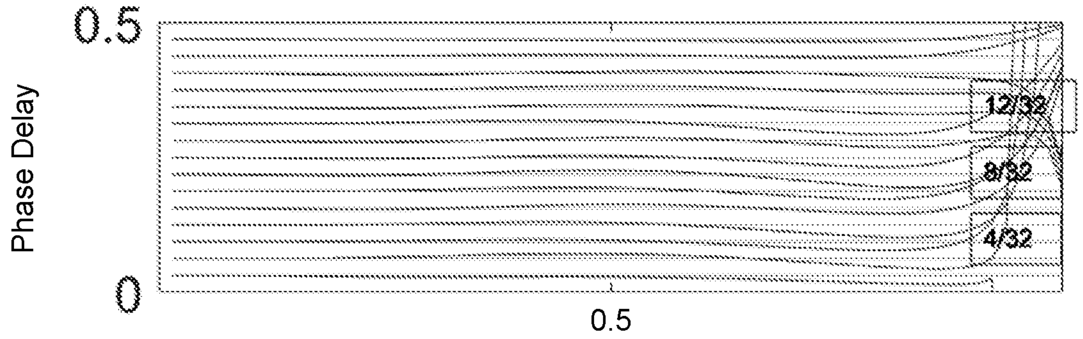
FIGS. 9(*a*) and 9(*c*), and 9(*b*) and 9(*d*) respectively show plots of phase delay response and magnitude of frequency response of a filter according to some embodiments.
Figure 9B:
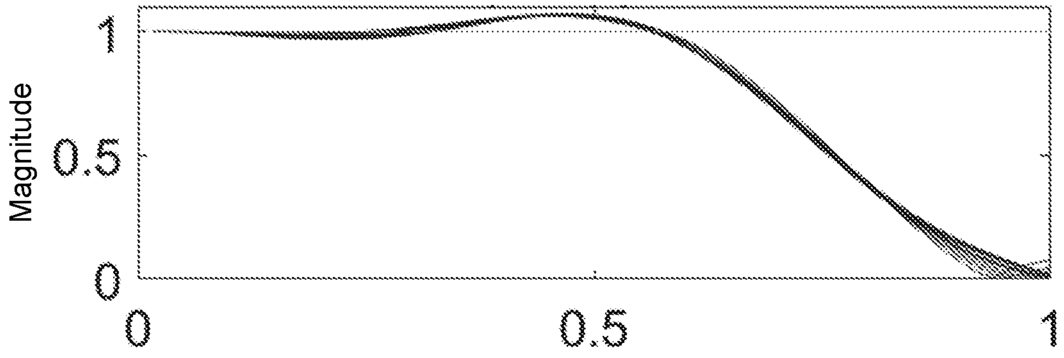
Figure 9C:
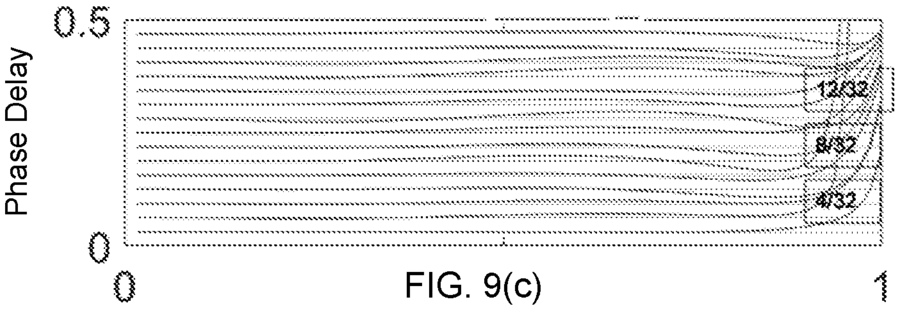
Figure 9D:
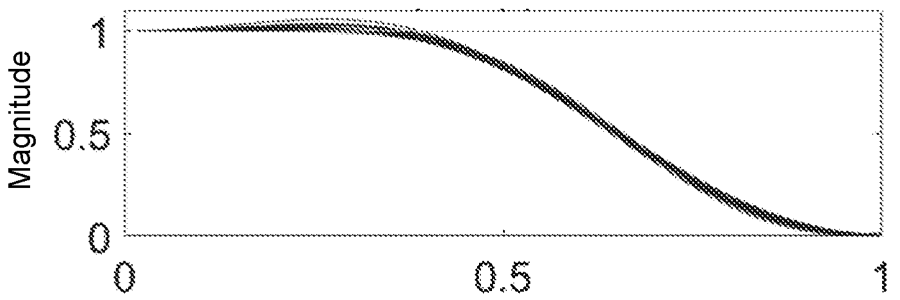

FIG. 8(*a*) shows plots of improved phase delay responses and FIG. 8(*b*) shows magnitude of frequency responses of the 6-tap chroma RPR1.5× downsampling filters.

In some embodiments, the filters may be extended to 8-tap. In those embodiments, the filters having the following coefficients may be used for the filtering (for phase full-pel, 1/32 to 31/32): {13, −38, 56, 194, 56, −38, 13, 0,}, {13, −38, 52, 193, 62, −38, 11, 1,}, {13, −36, 44, 193, 69, −37, 8, 2,}, {12, −34, 39, 192, 74, −36, 7, 2,}, {13, −33, 32, 192, 79, −36, 6, 3,}, {12, −30, 26, 190, 86, −36, 4, 4,}, {12, −29, 21, 188, 92, −35, 3, 4,}, {14, −28, 15, 185, 97, −35, 2, 6,}, {13, −26, 11, 182, 103, −34, 1, 6,}, {13, −23, 4, 180, 109, −34, 0, 7,}, {13, −23, 2, 175, 115, −31, −2, 7,}, {12, −20, −3, 172, 121, −30, −4, 8,}, {11, −18, −7, 168, 128, −28, −6, 8,}, {11, −16, −11, 164, 133, −27, −7, 9,}, {11, −15, −14, 159, 139, −25, −8, 9,}, {10, −13, −17, 155, 144, −23, −9, 9,}, {9, −11, −20, 150, 150, −20, −11, 9,}, {9, −9, −23, 144, 155, −17, −13, 10,}, {9, −8, −25, 139, 159, −14, −15, 11,}, {9, −7, −27, 133, 164, −11, −16, 11,}, {8, −6, −28, 128, 168, −7, −18, 11,}, {8, −4, −30, 121, 172, −3, −20, 12,}, {7, −2, −31, 115, 175, 2, −23, 13,}, {7, 0, −34, 109, 180, 4, −23, 13,}, {6, 1, −34, 103, 182, 11, −26, 13,}, {6, 2, −35, 97, 185, 15, −28, 14,}, {4, 3, −35, 92, 188, 21, −29, 12,}, {4, 4, −36, 86, 190, 26, −30, 12,}, {3, 6, −36, 79, 192, 32, −33, 13,}, {2, 7, −36, 74, 192, 39, −34, 12,}, {2, 8, −37, 69, 193, 44, −36, 13,}, {1, 11, −38, 62, 193, 52, −38, 13,}.

FIG. 9(*a*) shows plots of improved phase delay responses and FIG. 9(*b*) shows magnitude of frequency responses of proposed 8-tap chroma RPR1.5× downsampling filters.

In another embodiment an alternative set of 8-tap filters that has a more uniform magnitude response at lower frequencies (which is preferred) may be used. Usage of at least one (filter f) of the following interpolation filters in video coding for phase full-pel, 1/32 to 31/32, with coefficients in 9 bits, magnitude in 8 bits+1 sign bit: {−4, −20, 68, 168, 68, −20, −4, 0}, {−4, −20, 64, 167, 73, −19, −5, 0}, {−1, −20, 58, 164, 77, −19, −4, 1}, {−1, −20, 53, 165, 81, −18, −5, 1}, {0, −19, 49, 161, 84, −15, −5, 1}, {0, −19, 45, 160, 89, −14, −6, 1}, {1, −20, 42, 157, 95, −13, −8, 2}, {1, −19, 37, 157, 98, −12, −8, 2}, {1, −18, 33, 154, 103, −10, −9, 2}, {1, −18, 31, 151, 107, −8, −11, 3}, {1, −19, 26, 152, 113, −7, −12, 2}, {1, −19, 23, 151, 116, −6, −12, 2}, {3, −17, 18, 145, 120, −4, −13, 4}, {3, −17, 16, 142, 123, −1, −14, 4}, {4, −17, 11, 141, 127, 0, −14, 4}, {4, −17, 9, 137, 131, 4, −16, 4}, {4, −16, 8, 132, 132, 8, −16, 4}, {4, −16, 4, 131, 137, 9, −17, 4}, {4, −14, 0, 127, 141, 11, −17, 4}, {4, −14, −1, 123, 142, 16, −17, 3}, {4, −13, −4, 120, 145, 18, −17, 3}, {2, −12, −6, 116, 151, 23, −19, 1}, {2, −12, −7, 113, 152, 26, −19, 1}, {3, −11, −8, 107, 151, 31, −18, 1}, {2, −9, −10, 103, 154, 33, −18, 1}, {2, −8, −12, 98, 157, 37, −19, 1}, {2, −8, −13, 95, 157, 42, −20, 1}, {1, −6, −14, 89, 160, 45, −19, 0}, {1, −5, −15, 84, 161, 49, −19, 0}, {1, −5, −18, 81, 165, 53, −20, −1}, {1, −4, −19, 77, 164, 58, −20, −1}, {0, −5, −19, 73, 167, 64, −20, −4}

FIG. 9(*c*) shows plots of improved phase delay responses and FIG. 9(*d*) shows magnitude of frequency responses of above 8-tap chroma RPR1.5× downsampling filters.

Filter Set #5

In some embodiments, the phase alignments for the 4-tap chroma RPR 2× filters (used for motion compensation and downscaling from a higher resolution to a lower resolution at around the ratio of 2×) in VVC may be corrected by using the filter(s) in the following filter set. As compared to the 4-tap chroma RPR 2× filters in VVC, the filters in the following filter set are extended to 8-tap. In some embodiments, the filters may be extended to 6-tap.

The filters in the following filter set may be used as interpolation filters in video coding for phase full-pel, 1/32 to 31/32 with 9 bits coefficients (where the magnitude of each coefficient is represented by 8 bits and the sign (+ or −) of each coefficient is represented by 1 sign bit).

For the filter having the filter length of 6 (i.e., N=6), the coefficients of the filter are: {−5, 64, 138, 64, −5, 0}, {−8, 66, 132, 73, −6, −1}, {−9, 62, 134, 76, −5, −2}, {−10, 59, 134, 80, −4, −3}, {−10, 57, 132, 82, −2, −3}, {−10, 53, 132, 85, 0, −4}, {−11, 50, 132, 89, 1, −5}, {−12, 47, 132, 93, 2, −6}, {−13, 45, 131, 96, 4, −7}, {−12, 40, 131, 99, 5, −7}, {−12, 39, 127, 101, 9, −8}, {−13, 36, 127, 105, 10, −9}, {−12, 33, 124, 107, 14, −10}, {−13, 30, 124, 111, 15, −11}, {−13, 29, 121, 112, 18, −11}, {−12, 25, 119, 115, 21, −12}, {−13, 24, 117, 117, 24, −13}, {−12, 21, 115, 119, 25, −12}, {−11, 18, 112, 121, 29, −13}, {−11, 15, 111, 124, 30, −13}, {−10, 14, 107, 124, 33, −12}, {−9, 10, 105, 127, 36, −13}, {−8, 9, 101, 127, 39, −12}, {−7, 5, 99, 131, 40, −12}, {−7, 4, 96, 131, 45, −13}, {−6, 2, 93, 132, 47, −12}, {−5, 1, 89, 132, 50, −11}, {−4, 0, 85, 132, 53, −10}, {−3, −2, 82, 132, 57, −10}, {−3, −4, 80, 134, 59, −10}, {−2, −5, 76, 134, 62, −9}, {−1, −6, 73, 132, 66, −8}.

Figure 10A:
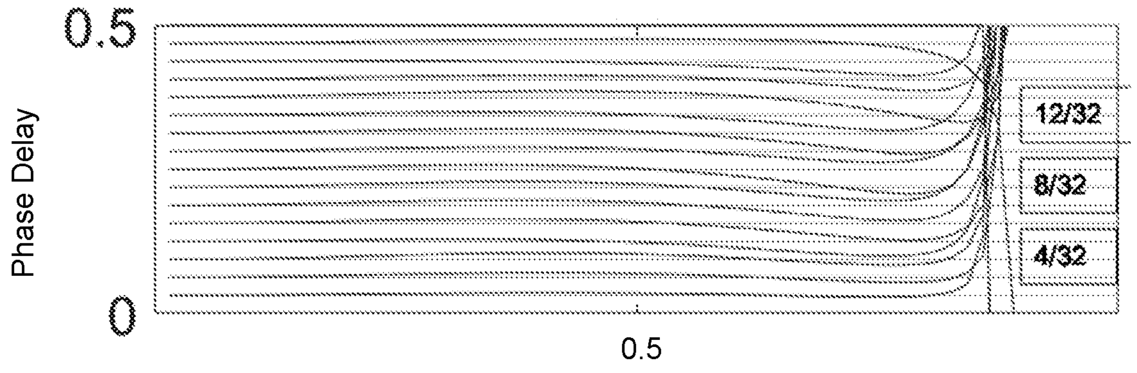
FIGS. 10(*a*) and 10(*b*) respectively show plots of phase delay response and magnitude of frequency response of a filter according to some embodiments.
Figure 10B:
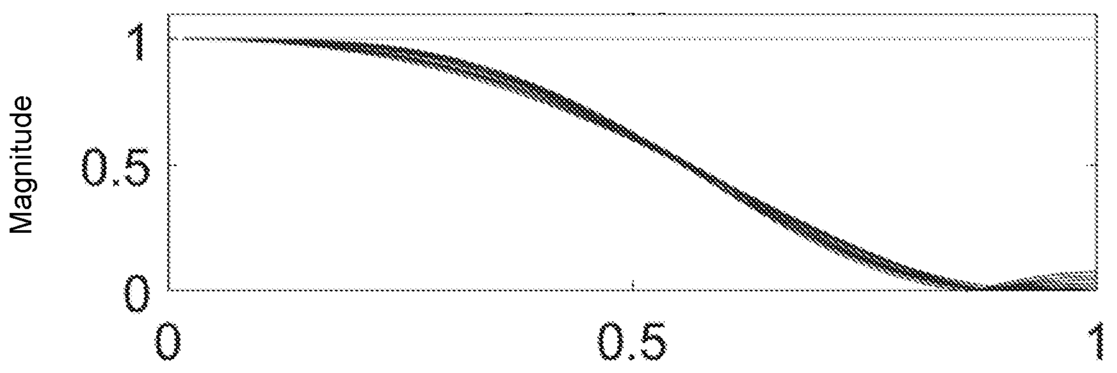
Figure 11A:
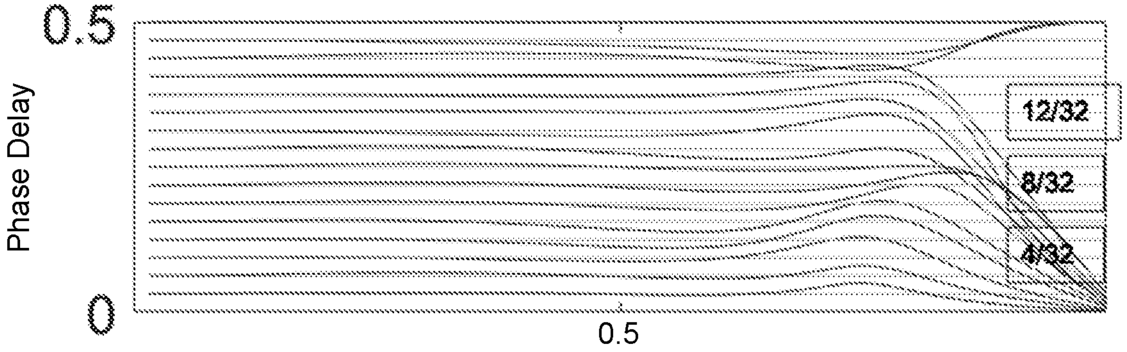
FIGS. 11(*a*) and 11(*c*), and 11(*b*) and 11(*d*) respectively show plots of phase delay response and magnitude of frequency response of a filter according to some embodiments.
Figure 11B:
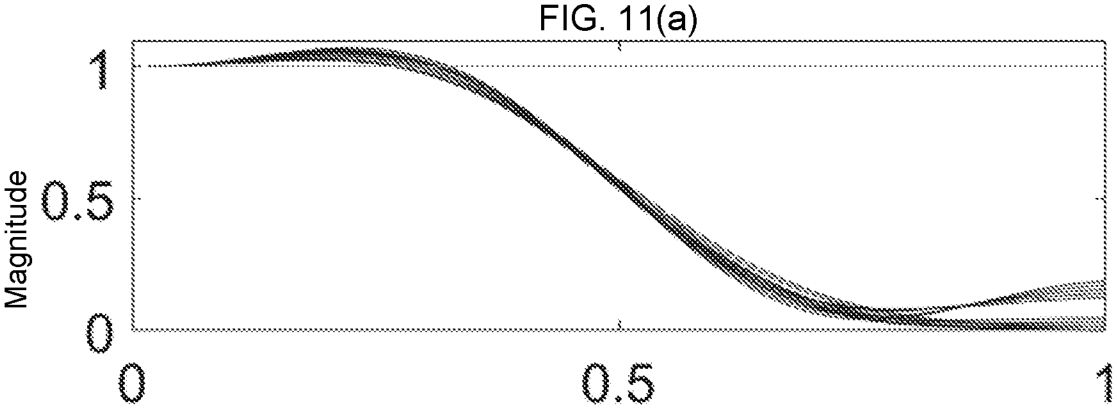
Figure 11C:
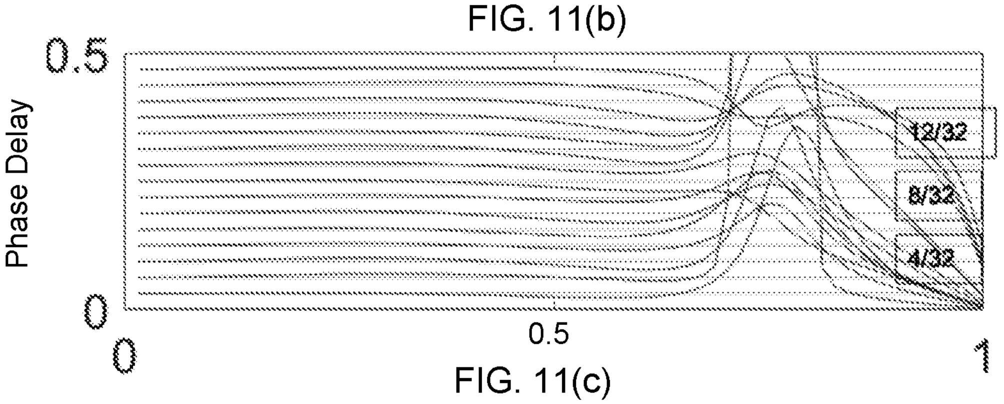
Figure 11D:
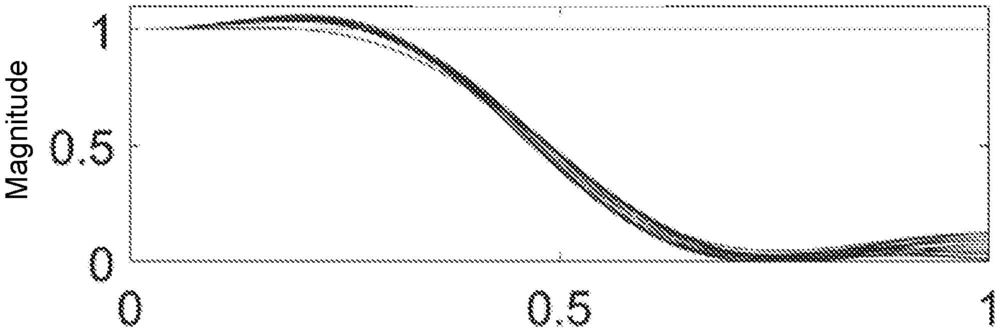

FIG. 10(*a*) shows plots of improved phase delay responses and FIG. 10(*b*) shows magnitude of frequency responses of the above 6-tap chroma RPR 2× downsampling filters.

Below is a different filter that may be used as an interpolation filter in video coding for phase full-pel, 1/32 to 31/32 with 9 bits coefficients (where the magnitude of each coefficient is represented by 8 bits and the sign (+ or −) of each coefficient is represented by 1 sign bit).

For the filter having the filter length of 8 (i.e., N=8), the coefficients of the filter are: {−21, 7, 74, 136, 74, 7, −21, 0,}, {−20, 5, 69, 140, 75, 8, −20, −1,}, {−19, 3, 66, 140, 78, 9, −19, −2,}, {−17, 1, 62, 141, 80, 8, −17, −2,}, {−16, 1, 59, 138, 82, 10, −15, −3,}, {−16, −1, 57, 138, 86, 11, −15, −4,}, {−11, −6, 57, 131, 91, 10, −13, −3,}, {−9, −8, 53, 131, 94, 10, −12, −3,}, {−8, −9, 49, 131, 97, 11, −12, −3,}, {−13, −8, 50, 130, 100, 18, −15, −6,}, {−10, −9, 46, 128, 102, 17, −14, −4,}, {−11, −10, 44, 127, 106, 21, −15, −6,}, {−9, −12, 41, 126, 109, 21, −15, −5,}, {−10, −12, 40, 123, 111, 26, −15, −7,}, {−9, −13, 38, 120, 113, 29, −14, −8,}, {−8, −14, 35, 120, 115, 29, −14, −7,}, {−7, −13, 32, 116, 116, 32, −13, −7,}, {−7, −14, 29, 115, 120, 35, −14, −8,}, {−8, −14, 29, 113, 120, 38, −13, −9,}, {−7, −15, 26, 111, 123, 40, −12, −10,}, {−5, −15, 21, 109, 126, 41, −12, −9,}, {−6, −15, 21, 106, 127, 44, −10, −11,}, {−4, −14, 17, 102, 128, 46, −9, −10,}, {−6, −15, 18, 100, 130, 50, −8, −13,}, {−3, −12, 11, 97, 131, 49, −9, −8,}, {−3, −12, 10, 94, 131, 53, −8, −9,}, {−3, −13, 10, 91, 131, 57, −6, −11,}, {−4, −15, 11, 86, 138, 57, −1, −16,}, {−3, −15, 10, 82, 138, 59, 1, −16,}, {−2, −17, 8, 80, 141, 62, 1, −17,}, {−2, −19, 9, 78, 140, 66, 3, −19,}, {−1, −20, 8, 75, 140, 69, 5, −20,}.

FIG. 11(*a*) shows plots of improved phase delay responses and FIG. 11(*b*) shows magnitude of frequency responses of the above 8-tap chroma RPR 2× downsampling filters.

In another embodiment an alternative set of 8-tap filters that has a more uniform magnitude response at lower frequencies and suppresses more of the magnitude response at higher frequencies (which usually is preferred in 2× downsampling) may be used. Usage of at least one (filter f) of the following interpolation filters in video coding for phase full-pel, 1/32 to 31/32, with coefficients in 9 bits, magnitude in 8 bits+1 sign bit: {−15, 9, 75, 118, 75, 9, −15, 0}, {−14, 7, 70, 123, 75, 9, −13, −1}, {−18, 7, 69, 125, 79, 14, −18, −2}, {−17, 5, 66, 126, 81, 14, −16, −3}, {−16, 3, 63, 127, 83, 15, −16, −3}, {−17, 3, 60, 128, 85, 17, −16, −4}, {−16, 3, 56, 127, 86, 19, −14, −5}, {−15, 0, 56, 124, 90, 21, −15, −5}, {−16, 1, 53, 124, 90, 25, −15, −6}, {−15, 0, 51, 121, 93, 26, −13, −7}, {−16, −2, 52, 118, 97, 29, −13, −9}, {−15, −4, 51, 116, 99, 31, −13, −9}, {−15, −4, 47, 116, 102, 31, −10, −11}, {−15, −4, 45, 114, 103, 34, −9, −12}, {−14, −5, 43, 112, 104, 37, −9, −12}, {−13, −7, 42, 110, 106, 39, −9, −12}, {−13, −9, 41, 109, 109, 41, −9, −13}, {−12, −9, 39, 106, 110, 42, −7, −13}, {−12, −9, 37, 104, 112, 43, −5, −14}, {−12, −9, 34, 103, 114, 45, −4, −15}, {−11, −10, 31, 102, 116, 47, −4, −15}, {−9, −13, 31, 99, 116, 51, −4, −15}, {−9, −13, 29, 97, 118, 52, −2, −16}, {−7, −13, 26, 93, 121, 51, 0, −15}, {−6, −15, 25, 90, 124, 53, 1, −16}, {−5, −15, 21, 90, 124, 56, 0, −15}, {−5, −14, 19, 86, 127, 56, 3, −16}, {−4, −16, 17, 85, 128, 60, 3, −17}, {−3, −16, 15, 83, 127, 63, 3, −16}, {−3, −16, 14, 81, 126, 66, 5, −17}, {−2, −18, 14, 79, 125, 69, 7, −18}, {−1, −13, 9, 75, 123, 70, 7, −14}.

FIG. 11(*c*) shows plots of improved phase delay responses and FIG. 11(*d*) shows magnitude of frequency responses of the above 8-tap chroma RPR 2× downsampling filters.

In some embodiments, the encoder 112 and/or the decoder 114 may select a filter (e.g., a non-symmetric filter) to be used for the filtering from at least two sets of filters having different frequency characteristics but having similar phase characteristics. The at least two sets of filters may include a filter set which keeps the most energy in the reconstructed samples from a previous picture (a reference picture) (e.g., like the filter set #1 discussed above) and/or a filter set which removes most of higher frequency components in the reconstructed samples from the previous picture. Both filter sets may be capable of maintaining an accurate phase (e.g., like the filter sets #2, #3, #4, or #5 discussed above). The selection of the filter may be made on a block level, a picture level, or on a sequence level.

In some embodiments, the selection of the filter may be made via implicit deriving (e.g., template matching) or explicit signalling (e.g., by signalling a flag value indicating which filter set is to be used).

In some embodiments, the selection of the filter may be enabled only for a restricted set of phases. For example, the selection of the filter may be enabled only for every other phase position (e.g., 2/16, 4/16, 6/16, etc.) or every fourth phase position (e.g., 4/16, 8/16, 12/16, etc.).

In some embodiments, the encoder 112 or the decoder 114 may select a filter length (e.g., 6, 8, or 12-tap) based on characteristics of a current block (i.e., the block that is subject to the filtering by the motion estimator/compensator, the intra predictor, or the inter predictor) and perform the filtering using the selected filter length.

In some embodiments, the characteristics of the current block may be determined by reconstructed samples (e.g., 280 in FIG. 2 or 380 in FIG. 3) from previously coded blocks within a region inside the current picture. For example, in case it is determined that the reconstructed samples contain high frequency information, a filter with a longer filter length (e.g., 12-tap) may be used. Otherwise, a filter with a shorter filter length (e.g., 6-tap) may be used.

In other embodiments, instead of or in addition to the degree of the frequency information of the reconstructed samples, the characteristics of the current block may be determined by a picture resolution of the current picture.

In other embodiments, instead of or in addition to any one or more of the degree of the frequency information of the reconstructed samples or the picture resolution, the characteristics of the current block may be determined by the chroma format (e.g., 444, 422, or 420) of the current picture.

In other embodiments, instead of or in addition to any one or more of the degree of the frequency information of the reconstructed samples, the picture resolution, or the chroma format of the current picture, the characteristics of the current block may be determined by the quantization parameters (QP) of the current block or the QP of the current picture.

The tables below show the performance improvement (related to coding efficiency) provided by the filters in Filter Set #1 according to some embodiments of this disclosure.

TABLE 1

12-tap chroma IF for CTC

| | Random Access Main 10 Over ECM-4.0 | | | | |
|---|---|---|---|---|---|
| | Y | U | V | EncT | DecT |
| Class A1 | −0.01% | −0.11% | −0.17% | 99% | 114% |
| Class A2 | −0.05% | −1.16% | −1.20% | 100% | 112% |
| Class B | −0.10% | −1.78% | −1.88% | 97% | 105% |
| Class C | −0.07% | −3.20% | −2.94% | 103% | 111% |
| Class E | | | | | |
| Overall | −0.06% | −1.70% | −1.68% | 100% | 110% |
| Class D | −0.05% | −4.85% | −5.26% | 105% | 106% |
| Class F | −0.03% | −1.32% | −1.39% | 94% | 97% |
| | **Low delay B Main10 Over ECM-4.0** | | | | |
| | Y | U | V | EncT | DecT |
| Class A1 | | | | | |
| Class A2 | | | | | |
| Class B | −0.14% | −2.52% | −2.64% | 97% | 102% |
| Class C | −0.09% | −3.05% | −3.05% | 99% | 102% |
| Class E | −0.05% | −0.16% | 0.95% | 98% | 102% |
| Overall | −0.10% | −2.11% | −1.88% | 98% | 102% |
| Class D | −0.24% | −4.01% | −5.81% | 97% | 107% |
| Class F | −0.06% | −0.52% | −0.76% | 93% | 95% |

TABLE 2

8-tap chroma IF for CTC

| | Random Access Main 10 Over ECM-4.0 | | | | |
|---|---|---|---|---|---|
| | Y | U | V | EncT | DecT |
| Class A1 | −0.01% | −0.19% | −0.20% | 103% | 109% |
| Class A2 | −0.06% | −0.95% | −0.96% | 103% | 117% |
| Class B | −0.09% | −1.44% | −1.73% | 98% | 107% |
| Class C | −0.07% | −2.73% | −2.48% | 100% | 105% |
| Class E | | | | | |
| Overall | −0.06% | −1.44% | −1.47% | 100% | 109% |
| Class D | −0.06% | −3.99% | −4.62% | 102% | 98% |
| Class F | −0.04% | −1.18% | −1.29% | 97% | 96% |
| | **Low delay B Main10 Over ECM-4.0** | | | | |
| | Y | U | V | EncT | DecT |
| Class A1 | | | | | |
| Class A2 | | | | | |

TABLE 2-continued 8-tap chroma IF for CTC

| | | | | | |
|---|---|---|---|---|---|
| Class B | −0.12% | −2.37% | −2.58% | 102% | 112% |
| Class C | −0.11% | −2.72% | −2.87% | 95% | 98% |
| Class E | −0.08% | −0.60% | 0.88% | 99% | 100% |
| Overall | −0.10% | −2.04% | −1.81% | 99% | 104% |
| Class D | −0.14% | −3.45% | −4.85% | 100% | 105% |
| Class F | −0.13% | −0.60% | −1.17% | 93% | 96% |

TABLE 3

6-tap chroma IF for CTC

| | Random Access Main 10 Over ECM-4.0 | | | | |
|---|---|---|---|---|---|
| | Y | U | V | EncT | DecT |
| Class A1 | −0.01% | −0.18% | −0.08% | 103% | 108% |
| Class A2 | −0.05% | −0.92% | −0.84% | 103% | 118% |
| Class B | −0.08% | −1.24% | −1.32% | 99% | 104% |
| Class C | −0.04% | −2.30% | −2.04% | 105% | 112% |
| Class E | | | | | |
| Overall | −0.05% | −1.25% | −1.17% | 102% | 110% |
| Class D | −0.04% | −3.47% | −3.78% | 107% | 104% |
| Class F | −0.03% | −0.99% | −1.02% | 98% | 94% |
| | **Low delay B Main10 Over ECM-4.0** | | | | |
| | Y | U | V | EncT | DecT |
| Class A1 | | | | | |
| Class A2 | | | | | |
| Class B | −0.13% | −1.84% | −2.02% | 102% | 103% |
| Class C | −0.10% | −2.04% | −2.61% | 102% | 105% |
| Class E | −0.05% | 0.35% | 0.94% | 105% | 107% |
| Overall | −0.10% | −1.36% | −1.48% | 103% | 105% |
| Class D | −0.16% | −3.08% | −4.03% | 109% | 113% |
| Class F | −0.08% | −0.08% | −1.18% | 100% | 102% |

As discussed above, the filters according to the embodiments can provide objective gains in video coding for motion compensated prediction with sub-sample accuracy. The phase and magnitude responses for the filters are shown FIGS. 30(*a*)-32(*b*). As shown in the figures, the behavior of the filters are closer to the ideal phase and magnitude response (especially at lower frequencies).

FIG. 30(*a*) shows plots of phase delay responses and FIG. 30(*b*) shows magnitude of frequency responses of the 12-tap chroma interpolation filters according to some embodiments.

FIG. 31(*a*) shows plots of phase delay responses and FIG. 31(*b*) shows magnitude of frequency responses (b) of the 8-tap chroma interpolation filters according to some embodiments FIG. 32(*a*) shows plots of phase delay responses and FIG. 32(*b*) shows magnitude of frequency responses of the 6-tap chroma interpolation filters according to some embodiments.

Selecting a Filter Set Based on a Ratio of the Reference Picture and the Current Picture Filter Set #6

In some embodiments, a filter set may be selected based on a ratio of the reference picture and the current picture. For example, in one embodiment, any of the above 2× downscaling filter sets #3, #4, #5, and the 12-tap filter set provided in the next paragraph may be used for 2× downscaling when a ratio of a picture resolution of the reference picture and a picture resolution of the current picture is substantially close to a predefined value (e.g., 2) or above a certain ratio threshold value (e.g., 1.75). Alternatively or additionally, the 12-tap 2× downscaling filter set provided in the next paragraph may be used for performing a filtering operation in a horizontal direction when a ratio of a width of the reference picture and a width of the current picture is substantially close to a predefined value (e.g., 2) or above a certain ratio threshold value (e.g., 1.75). Alternatively or additionally, the 12-tap 2× downscaling filter set provided in the next paragraph may be used for performing a filtering operation in a vertical direction when a ratio of a height of the reference picture and a height of the current picture is substantially close to a predefined value (e.g., 2) or above a certain ratio threshold value (e.g., 1.75).

Filter Set: {5, −5, −17, 9, 78, 116, 78, 9, −17, −5, 5, 0}, {5, −4, −18, 7, 73, 116, 82, 14, −18, −6, 4, 1}, {5, −4, −17, 4, 69, 115, 86, 17, −17, −7, 4, 1}, {5, −3, −17, 1, 64, 115, 90, 21, −17, −8, 3, 2}, {4, −2, −15, −2, 59, 114, 93, 24, −15, −8, 2, 2}, {4, −1, −15, −5, 55, 113, 96, 29, −15, −10, 3, 2}, {4, 0, −15, −7, 51, 110, 100, 33, −14, −11, 2, 3}, {3, 1, −13, −9, 45, 108, 104, 36, −12, −11, 1, 3}, {3, 1, −13, −10, 42, 105, 105, 42, −10, −13, 1, 3}, {3, 1, −11, −12, 36, 104, 108, 45, −9, −13, 1, 3}, {3, 2, −11, −14, 33, 100, 110, 51, −7, −15, 0, 4}, {2, 3, −10, −15, 29, 96, 113, 55, −5, −15, −1, 4}, {2, 2, −8, −15, 24, 93, 114, 59, −2, −15, −2, 4}, {2, 3, −8, −17, 21, 90, 115, 64, 1, −17, −3, 5}, {1, 4, −7, −17, 17, 86, 115, 69, 4, −17, −4, 5}, {1, 4, −6, −18, 14, 82, 116, 73, 7, −18, −4, 5}.

As shown above, the filter set comprises 16 subsets of coefficient values and each subset of coefficient values comprises 12 coefficient values.

As discussed above, in some embodiments, the coefficient values in the filter set may be used for interpolation filtering in video coding for phase 0⁄16 to 15⁄16. For example, in the filter set above, the first subset of coefficient values is {5, −5, −17, 9, 78, 116, 78, 9, −17, −5, 5, 0}corresponding to phase 0⁄16 and the last subset of coefficient values is {1, 4, −6, −18, 14, 82, 116, 73, 7, −18, −4, 5}corresponding to phase 15⁄16.

Figure 35A:
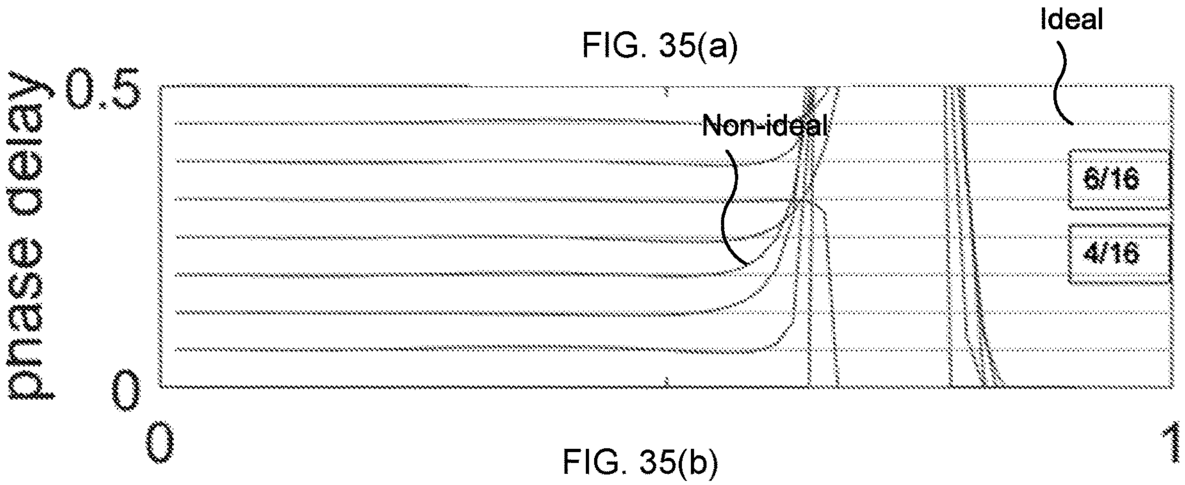
FIGS. 35(*a*) and 35(*b*) respectively show plots of phase delay response and magnitude of frequency response of a filter according to some embodiments.
Figure 35B:
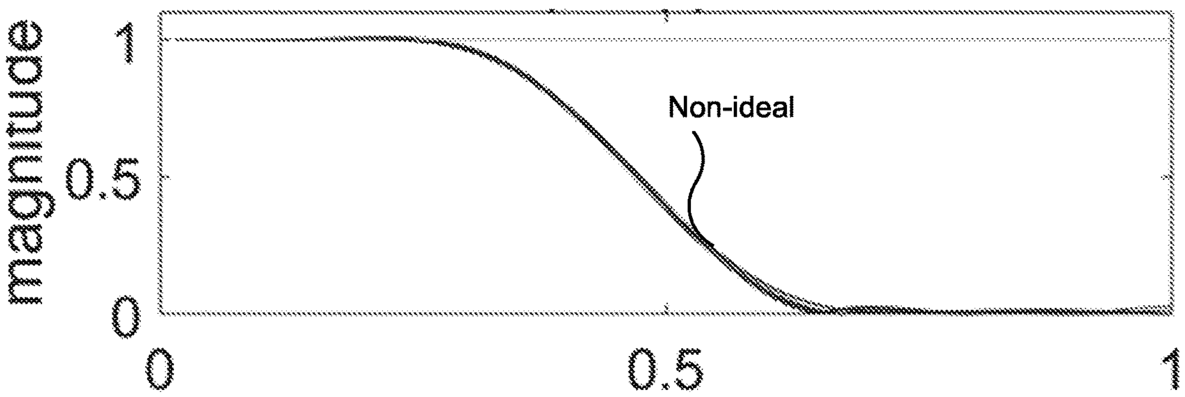

FIG. 35(*a*) shows plots of phase delay responses of the above 12-tap 2× downscaling filters, and FIG. 35(*b*) shows plots of magnitude of frequency responses of the above 12-tap 2× downscaling filters.

Filter Set #7

In one embodiment, any of the above 1.5× downscaling filter sets #3, #4, #5, and the 12-tap filter set provided in the next paragraph may be used for 1.5× downscaling when a ratio of a picture resolution of the reference picture and a picture resolution of the current picture is substantially close to a predefined value (e.g., 1.5) or within a certain range (e.g., between 1.25 and 1.75). Alternatively or additionally, the 12-tap 1.5× downscaling filter set provided in the next paragraph may be used for performing a filtering operation in a horizontal direction when a ratio of a width of the reference picture and a width of the current picture is substantially close to a predefined value (e.g., 1.5) or within a certain range (e.g., between 1.25 and 1.75). Alternatively or additionally, the 12-tap 1.5× downscaling filter set provided in the next paragraph may be used for performing a filtering operation in a vertical direction when a ratio of a height of the reference picture and a height of the current picture is substantially close to a predefined value (e.g., 1.5) or within a certain range (e.g., between 1.25 and 1.75).

Filter Set: {−1, 9, −10, −21, 74, 154, 74, −21, −10, 9, −1, 0}, {−2, 9, −8, −22, 65, 155, 81, −18, −12, 9, 0, −1}, {−2, 8, −5, −24, 57, 153, 90, −15, −14, 9, 0, −1}, {−1, 8, −5, −25, 52, 148, 97, −10, −17, 8, 2, −1}, {−2, 8, −5, −23, 45, 144, 104, −3, −20, 6, 4, −2}, {−2, 6, 0, −25, 35, 144, 112, −2, −20, 7, 3, −2}, {−2, 6, 1, −25, 28, 140, 119, 3, −22, 6, 4, −2}, {−1, 3, 4, −23, 18, 137, 126, 6, −21, 6, 2, −1}, {−1, 2, 6, −22, 10, 133, 133, 10, −22, 6, 2, −1}, {−1, 2, 6, −21, 6, 126, 137, 18, −23, 4, 3, −1}, {−2, 4, 6, −22, 3, 119, 140, 28, −25, 1, 6, −2}, {−2, 3, 7, −20, −2, 112, 144, 35, −25, 0, 6, −2}, {−2, 4, 6, −20, −3, 104, 144, 45, −23, −5, 8, −2}, {−1, 2, 8, −17, −10, 97, 148, 52, −25, −5, 8, −1}, {−1, 0, 9, −14, −15, 90, 153, 57, −24, −5, 8, −2}, {−1, 0, 9, −12, −18, 81, 155, 65, −22, −8, 9, −2}.

As shown above, the filter set comprises 16 subsets of coefficient values and each subset of coefficient values comprises 12 coefficient values.

As discussed above, in some embodiments, the coefficient values in the filter set may be used for interpolation filtering in video coding for phase 0⁄16 to 15⁄16. For example, in the filter set above, the first subset of coefficient values is {−1, 9, −10, −21, 74, 154, 74, −21, −10, 9, −1, 0}corresponding to phase 0⁄16 and the last subset of coefficient values is {−1, 0, 9, −12, −18, 81, 155, 65, −22, −8, 9, −2}corresponding to phase 15⁄16.

Figure 36A:
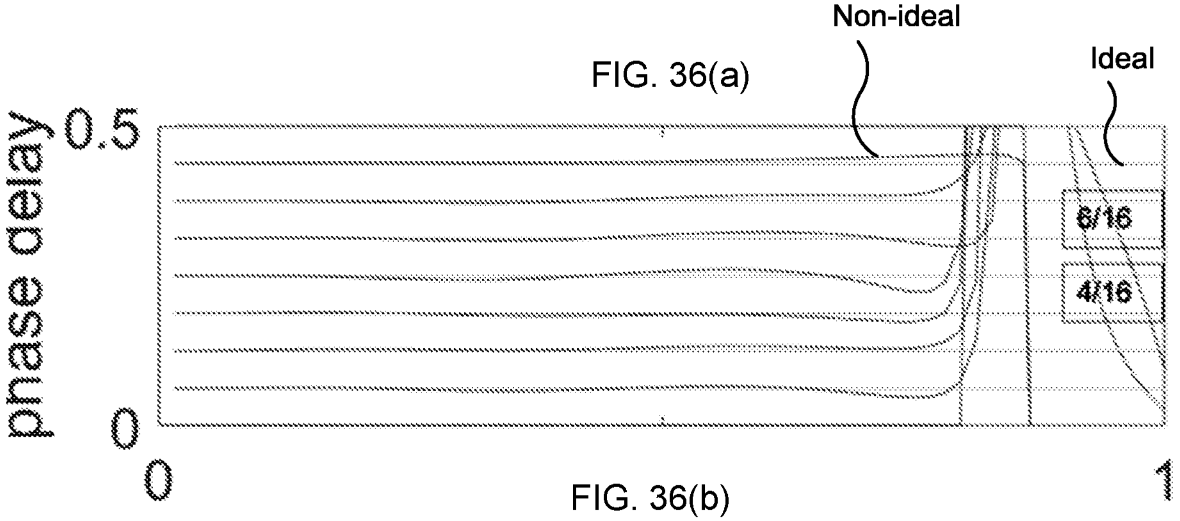
FIGS. 36(*a*) and 36(*b*) respectively show plots of phase delay response and magnitude of frequency response of a filter according to some embodiments.
Figure 36B:
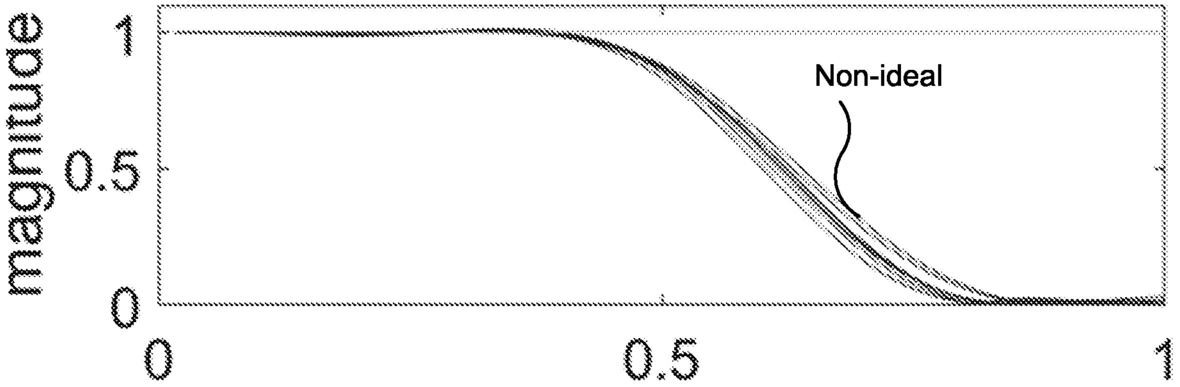

FIG. 36(*a*) shows plots of phase delay responses of the above 12-tap 1.5× downscaling filters, and FIG. 36(*b*) shows plots of magnitude of frequency responses of the above 12-tap 1.5× downscaling filters.

Filter Set #8

In some embodiments, instead of using the 12-tap filter(s), the 10-tap filter(s) may be used. As compared to the 12-tap filter(s), the 10-tap filter(s) may reduce computational complexity of the filtering while providing compromised compression performance. These 10-tap filters may be used for an inter block that is in a subblock mode (e.g., affine mode).

In one embodiment, the 10-tap filter set provided in the next paragraph may be used for 2× downscaling when a ratio of a picture resolution of the reference picture and a picture resolution of the current picture is substantially close to a predefined value (e.g., 2) or above a certain ratio threshold value (e.g., 1.75). Alternatively or additionally, the 12-tap 2× downscaling filter set provided in the next paragraph may be used for performing a filtering operation in a horizontal direction when a ratio of a width of the reference picture and a width of the current picture is substantially close to a predefined value (e.g., 2) or above a certain ratio threshold value (e.g., 1.75). Alternatively or additionally, the 12-tap 2× downscaling filter set provided in the next paragraph may be used for performing a filtering operation in a vertical direction when a ratio of a height of the reference picture and a height of the current picture is substantially close to a predefined value (e.g., 2) or above a certain ratio threshold value (e.g., 1.75).

Filter Set: {−3, −14, 10, 77, 116, 77, 10, −14, −3, 0}, {−4, −15, 8, 73, 116, 82, 14, −15, −5, 2}, {−3, −15, 5, 69, 115, 86, 18, −15, −6, 2}, {−2, −15, 2, 65, 114, 89, 22, −14, −7, 2}, {−1, −14, −1, 60, 113, 93, 26, −14, −8, 2}, {−1, −14, −3, 56, 112, 96, 30, −13, −9, 2}, {0, −13, −5, 51, 110, 100, 34, −12, −10, 1}, {0, −13, −7, 47, 108, 103, 38, −10, −11, 1}, {1, −12, −9, 43, 105, 105, 43, −9, −12, 1}, {1, −11, −10, 38, 103, 108, 47, −7, −13, 0}, {1, −10, −12, 34, 100, 110, 51, −5, −13, 0}, {2, −9, −13, 30, 96, 112, 56, −3, −14, −1}, {2, −8, −14, 26, 93, 113, 60, −1, −14, −1}, {2, −7, −14, 22, 89, 114, 65, 2, −15, −2}, {2, −6, −15, 18, 86, 115, 69, 5, −15, −3}, {2, −5, −15, 14, 82, 116, 73, 8, −15, −4}.

As shown above, the filter set comprises 16 subsets of coefficient values and each subset of coefficient values comprises 10 coefficient values.

As discussed above, in some embodiments, the coefficient values in the filter set may be used for interpolation filtering in video coding for phase 0⁄16 to 15⁄16. For example, in the filter set above, the first subset of coefficient values is {−3, −14, 10, 77, 116, 77, 10, −14, −3, 0} and corresponds to phase 0/16 and the last subset of coefficient values is {2, −5, −15, 14, 82, 116, 73, 8, −15, −4} and corresponds to phase 15/16.

Figures 37A, 37B:
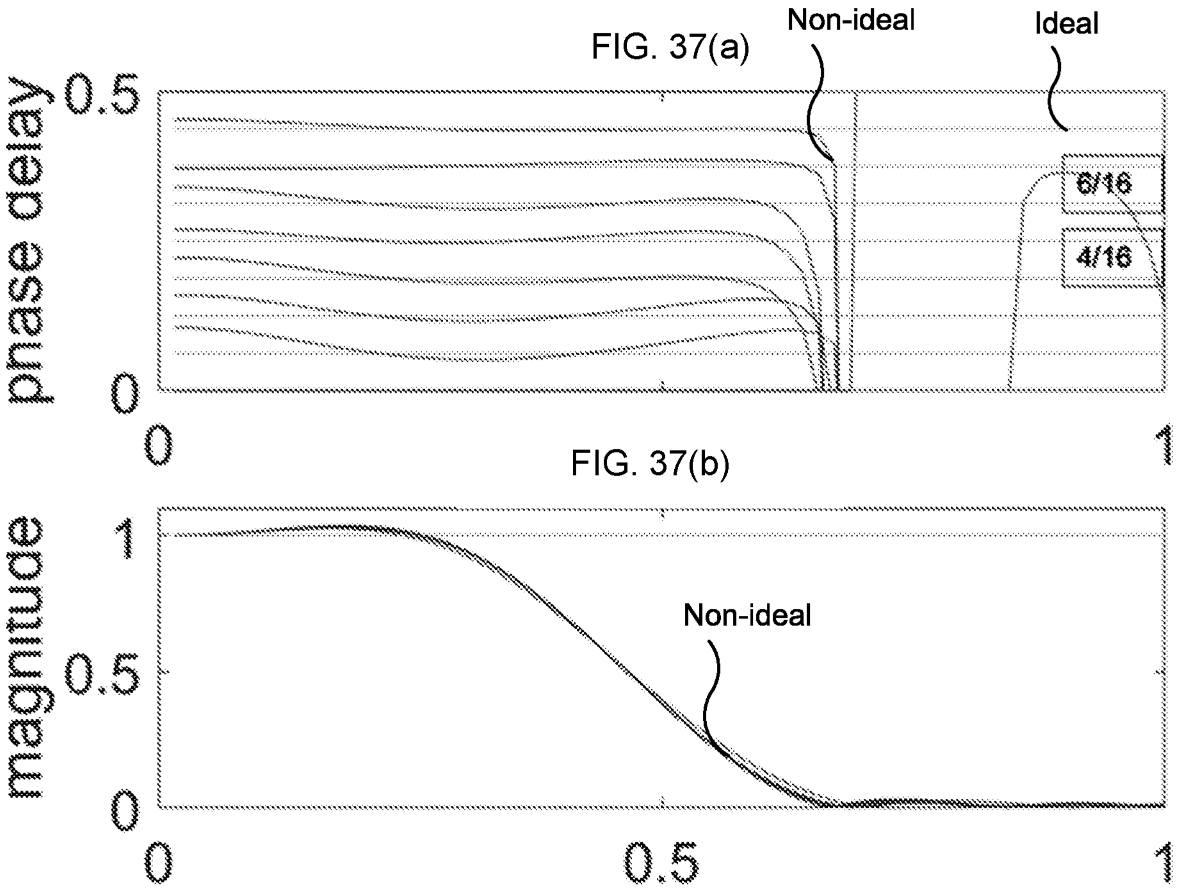
FIGS. 37(*a*) and 37(*b*) respectively show plots of phase delay response and magnitude of frequency response of a filter according to some embodiments.

FIG. 37(*a*) shows plots of phase delay responses of the above 10-tap 2× downscaling filters, and FIG. 37(*b*) shows plots of magnitude of frequency responses of the above 10-tap 2× downscaling filters.

Filter Set #9

In one embodiment, the 10-tap filter set provided in the next paragraph may be used for 1.5× downscaling when a ratio of a picture resolution of the reference picture and a picture resolution of the current picture is substantially close to a predefined value (e.g., 1.5) or within a certain range (e.g., between 1.25 and 1.75). Alternatively or additionally, the 10-tap 1.5× downscaling filter set provided in the next paragraph may be used for performing a filtering operation in a horizontal direction when a ratio of a width of the reference picture and a width of the current picture is substantially close to a predefined value (e.g., 1.5) or within a certain range (e.g., between 1.25 and 1.75). Alternatively or additionally, the 10-tap 1.5× downscaling filter set provided in the next paragraph may be used for performing a filtering operation in a vertical direction when a ratio of a height of the reference picture and a height of the current picture is substantially close to a predefined value (e.g., 1.5) or within a certain range (e.g., between 1.25 and 1.75).

Filter Set: {6, −10, −19, 74, 154, 74, −19, −10, 6, 0}, {8, −8, −22, 66, 153, 82, −18, −13, 8, 0}, {7, −6, −24, 58, 152, 90, −14, −15, 8, 0}, {7, −5, −25, 51, 150, 97, −11, −17, 8, 1}, {6, −2, −26, 43, 147, 105, −7, −19, 7, 2}, {6, −1, −26, 35, 144, 112, −2, −21, 7, 2}, {5, 1, −26, 28, 140, 118, 3, −22, 6, 3}, {5, 2, −26, 22, 135, 125, 9, −24, 5, 3}, {4, 4, −25, 15, 130, 130, 15, −25, 4, 4}, {3, 5, −24, 9, 125, 135, 22, −26, 2, 5}, {3, 6, −22, 3, 118, 140, 28, −26, 1, 5}, {2, 7, −21, −2, 112, 144, 35, −26, −1, 6}, {2, 7, −19, −7, 105, 147, 43, −26, −2, 6}, {1, 8, −17, −11, 97, 150, 51, −25, −5, 7}, {0, 8, −15, −14, 90, 152, 58, −24, −6, 7}, {0, 8, −13, −18, 82, 153, 66, −22, −8, 8}.

As shown above, the filter set comprises 16 subsets of coefficient values and each subset of coefficient values comprises 10 coefficient values.

As discussed above, in some embodiments, the coefficient values in the filter set may be used for interpolation filtering in video coding for phase 0/16 to 15/16. For example, in the filter set above, the first subset of coefficient values is {6, −10, −19, 74, 154, 74, −19, −10, 6, 0}corresponding to phase 0/16 and the last subset of coefficient values is {0, 8, −13, −18, 82, 153, 66, −22, −8, 8}corresponding to phase 15/16.

Figures 38A, 38B:
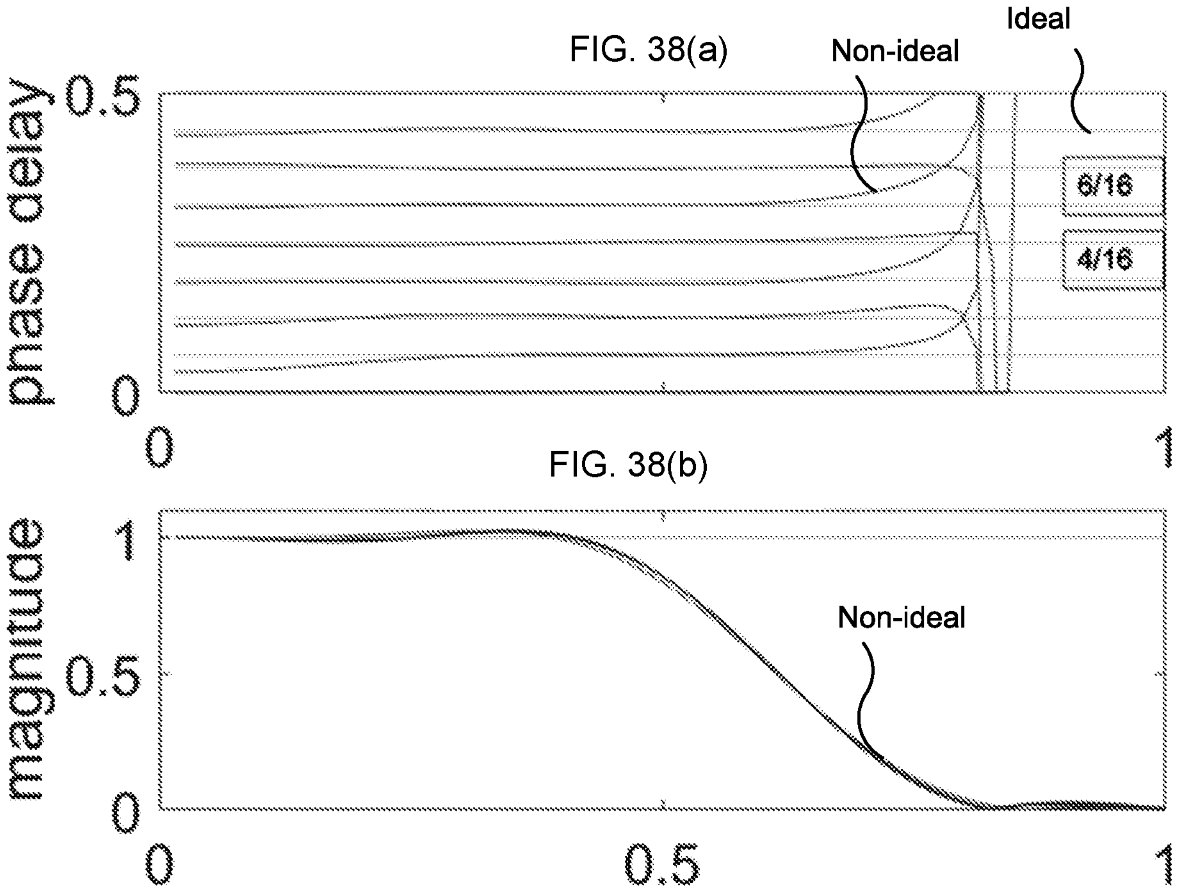
FIGS. 38(*a*) and 38(*b*) respectively show plots of phase delay response and magnitude of frequency response of a filter according to some embodiments.

FIG. 38(*a*) shows plots of phase delay responses of the above 10-tap 1.5× downscaling filters, and FIG. 38(*b*) shows plots of magnitude of frequency responses of the above 10-tap 1.5× downscaling filters.

Filter Set #10

In one embodiment, the 10-tap filter set provided in the next paragraph may be used for upscaling when a ratio of a picture resolution of the reference picture and a picture resolution of the current picture is less than a threshold value (e.g., 1 or 1.25). In other words, the 10-tap filter set provided in the next paragraph is mainly used in scenarios where a picture resolution of the reference picture is smaller than a picture resolution of the current picture. In another embodiment, the 10-tap upscaling filter set provided in the next paragraph may be used for performing a filtering operation in a horizontal direction when a ratio of a width of the reference picture and a width of the current picture is less than a threshold value (e.g., 1 or 1.25). In other embodiment, the 10-tap upscaling filter set provided in the next paragraph may be used for performing a filtering operation in a vertical direction when a ratio of a height of the reference picture and a height of the current picture is less than a threshold value (e.g., 1 or 1.25).

Filter Set: {0, 0, 0, 0, 256, 0, 0, 0, 0, 0}, {2, −3, 6, −14, 254, 16, −7, 4, −2, 0}, {3, −6, 12, −26, 249, 34, −14, 7, −4, 1}, {4, −9, 17, −36, 241, 54, −22, 11, −6, 2}, {5, −11, 20, −43, 230, 75, −29, 15, −8, 2}, {5, −12, 23, −48, 216, 96, −36, 18, −9, 3}, {5, −13, 25, −51, 200, 118, −42, 21, −11, 4}, {5, −13, 25, −51, 181, 140, −46, 23, −12, 4}, {5, −13, 25, −50, 161, 161, −50, 25, −13, 5}, {4, −12, 23, −46, 140, 181, −51, 25, −13, 5}, {4, −11, 21, −42, 118, 200, −51, 25, −13, 5}, {3, −9, 18, −36, 96, 216, −48, 23, −12, 5}, {2, −8, 15, −29, 75, 230, −43, 20, −11, 5}, {2, −6, 11, −22, 54, 241, −36, 17, −9, 4}, {1, −4, 7, −14, 34, 249, −26, 12, −6, 3}, {0, −2, 4, −7, 16, 254, −14, 6, −3, 2}.

As shown above, the filter set comprises 16 subsets of coefficient values and each subset of coefficient values comprises 10 coefficient values.

As discussed above, in some embodiments, the coefficient values in the filter set may be used for interpolation filtering in video coding for phase 0/16 to 15/16. For example, in the filter set above, the first subset of coefficient values is {0, 0, 0, 0, 256, 0, 0, 0, 0, 0}corresponding to phase 0/16 and the last subset of coefficient values is {0, −2, 4, −7, 16, 254, −14, 6, −3, 2}corresponding to phase 15/16.

Figure 39A:
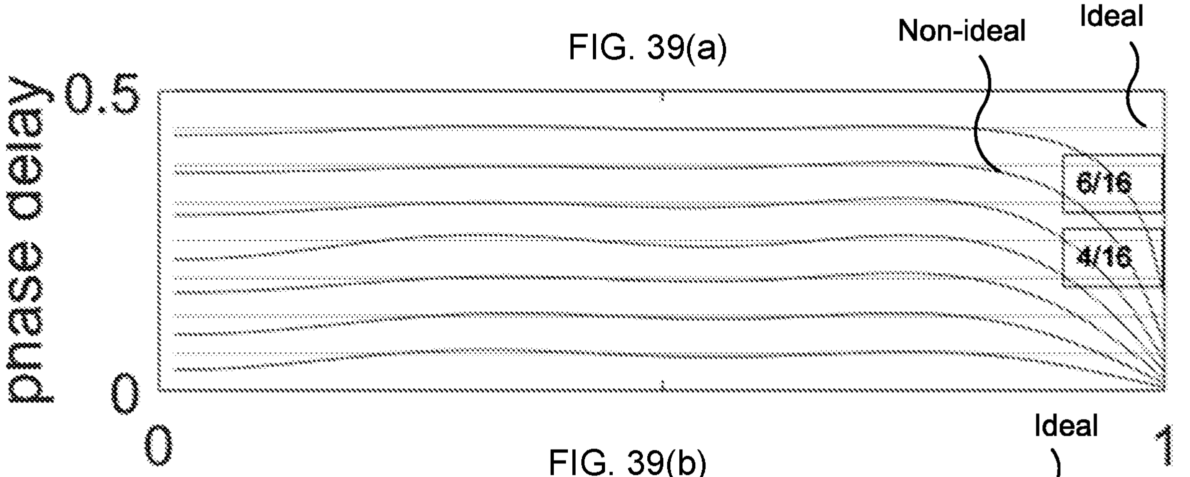
FIGS. 39(*a*) and 39(*b*) respectively show plots of phase delay response and magnitude of frequency response of a filter according to some embodiments.
Figure 39B:
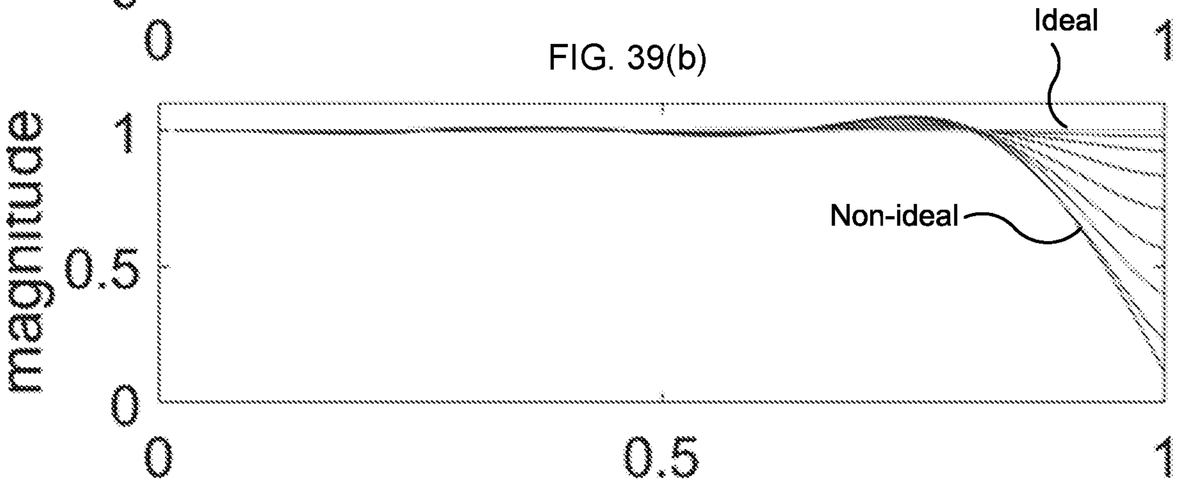

FIG. 39(*a*) shows plots of phase delay responses of the above 10-tap upscaling filters, and FIG. 39(*b*) shows plots of magnitude of frequency responses of the above 10-tap upscaling filters.

Filter Set #11

Like the Filter set #8 discussed above, the Filter set #11 disclosed below is used for 2× downscaling. However, as compared to the Filter set #8, this filter set provides better phase characteristics while maintaining similar magnitude characteristics.

In one embodiment, the 10-tap filter set provided in the next paragraph may be used for 2× downscaling when a ratio of a picture resolution of the reference picture and a picture resolution of the current picture is substantially close to a predefined value (e.g., 2) or above a certain ratio threshold value (e.g., 1.75). Alternatively or additionally, the 10-tap 2× downscaling filter set provided in the next paragraph may be used for performing a filtering operation in a horizontal direction when a ratio of a width of the reference picture and a width of the current picture is substantially close to a predefined value (e.g., 2) or above a certain ratio threshold value (e.g., 1.75). Alternatively or additionally, the 10-tap 2× downscaling filter set provided in the next paragraph may be used for performing a filtering operation in a vertical direction when a ratio of a height of the reference picture and a height of the current picture is substantially close to a predefined value (e.g., 2) or above a certain ratio threshold value (e.g., 1.75).

Filter Set: {−2, −14, 10, 76, 116, 76, 10, −14, −2, 0}, {−2, −14, 7, 73, 115, 81, 13, −14, −3, 0}, {−2, −13, 4, 68, 115, 85, 17, −14, −4, 0}, {−1, −13, 1, 64, 114, 89, 20, −14, −4, 0}, {−1, −13, −1, 59, 114, 93, 24, −13, −6, 0}, {0, −12, −3, 54, 111, 96, 28, −12, −6, 0}, {0, −10, −7, 51, 109, 99, 32, −11, −8, 1}, {1, −12, −6, 45, 107, 103, 36, −10, −8, 0}, {1, −9, −9, 41, 104, 104, 41, −9, −9, 1}, {0, −8, −10, 36, 103, 107, 45, −6, −12, 1}, {1, −8, −11, 32, 99, 109, 51, −7, −10, 0}, {0, −6, −12, 28, 96, 111, 54, −3, −12, 0}, {0, −6, −13, 24, 93, 114, 59, −1, −13, −1}, {0, −4, −14, 20, 89, 114, 64, 1, −13, −1}, {0, −4, −14, 17, 85, 115, 68, 4, −13, −2}.

As shown above, the filter set comprises 16 subsets of coefficient values and each subset of coefficient values comprises 10 coefficient values.

As discussed above, in some embodiments, the coefficient values in the filter set may be used for interpolation filtering in video coding for phase 0/16 to 15/16. For example, in the filter set above, the first subset of coefficient values is {−2, −14, 10, 76, 116, 76, 10, −14, −2, 0}corresponding to phase 0/16 and the last subset of coefficient values is {0, −4, −14, 17, 85, 115, 68, 4, −13, −2}corresponding to phase 15/16.

Figures 40A, 40B:
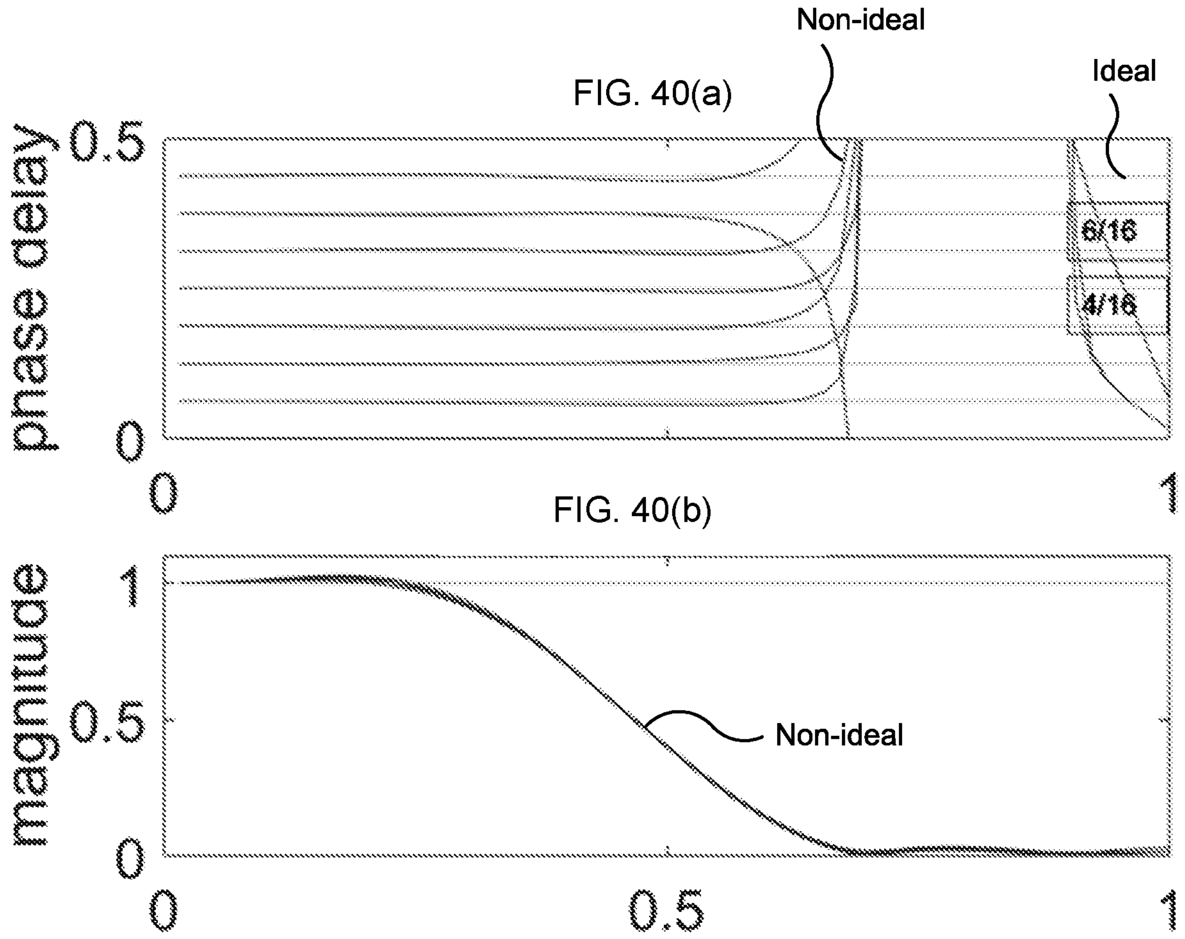
FIGS. 40(*a*) and 40(*b*) respectively show plots of phase delay response and magnitude of frequency response of a filter according to some embodiments.

FIG. 40(*a*) shows plots of phase delay responses of the above 10-tap 2× downscaling filters, and FIG. 40(*b*) shows plots of magnitude of frequency responses of the above 10-tap 2× downscaling filters.

Filter Set #12

Like the Filter set #10 discussed above, the Filter set #12 disclosed below may be used for upscaling. However, as compared to the Filter set #10, this filter set provides better phase characteristics while maintaining similar magnitude characteristics.

In one embodiment, the 10-tap filter set provided in the next paragraph may be used for upscaling when a ratio of a picture resolution of the reference picture and a picture resolution of the current picture is less than a threshold value (e.g., 1 or 1.25). In other words, the 10-tap filter set provided in the next paragraph is mainly used in scenarios where a picture resolution of the reference picture is smaller than a picture resolution of the current picture. In another embodiment, the 10-tap upscaling filter set provided in the next paragraph may be used for performing a filtering operation in a horizontal direction when a ratio of a width of the reference picture and a width of the current picture is less than a threshold value (e.g., 1 or 1.25). In other embodiment, the 10-tap upscaling filter set provided in the next paragraph may be used for performing a filtering operation in a vertical direction when a ratio of a height of the reference picture and a height of the current picture is less than a threshold value (e.g., 1 or 1.25).

Filter Set: {0, 0, 0, 0, 256, 0, 0, 0, 0, 0}, {3, −6, 9, −16, 253, 19, −11, 6, −2, 1}, {3, −7, 13, −27, 248, 36, −16, 8, −4, 2}, {3, −7, 16, −36, 240, 53, −21, 10, −4, 2}, {3, −8, 19, −44, 231, 72, −26, 12, −5, 2}, {5, −11, 22, −49, 217, 94, −34, 16, −8, 4}, {5, −12, 24, −52, 202, 114, −38, 19, −11, 5}, {6, −14, 26, −52, 182, 136, −43, 22, −13, 6}, {6, −13, 24, −50, 161, 161, −50, 24, −13, 6}, {6, −13, 22, −43, 136, 182, −52, 26, −14, 6}, {5, −11, 19, −38, 114, 202, −52, 24, −12, 5}, {4, −8, 16, −34, 94, 217, −49, 22, −11, 5}, {2, −5, 12, −26, 72, 231, −44, 19, −8, 3}, {2, −4, 10, −21, 53, 240, −36, 16, −7, 3}, {2, −4, 8, −16, 36, 248, −27, 13, −7, 3}, or {1, −2, 6, −11, 19, 253, −16, 9, −6, 3}.

As shown above, the filter set comprises 16 subsets of coefficient values and each subset of coefficient values comprises 10 coefficient values.

As discussed above, in some embodiments, the coefficient values in the filter set may be used for interpolation filtering in video coding for phase 0/16 to 15/16. For example, in the filter set above, the first subset of coefficient values is {0, 0, 0, 0, 256, 0, 0, 0, 0, 0}corresponding to phase 0/16 and the last subset of coefficient values is {1, −2, 6, −11, 19, 253, −16, 9, −6, 3}corresponding to phase 15/16.

Figure 41A:
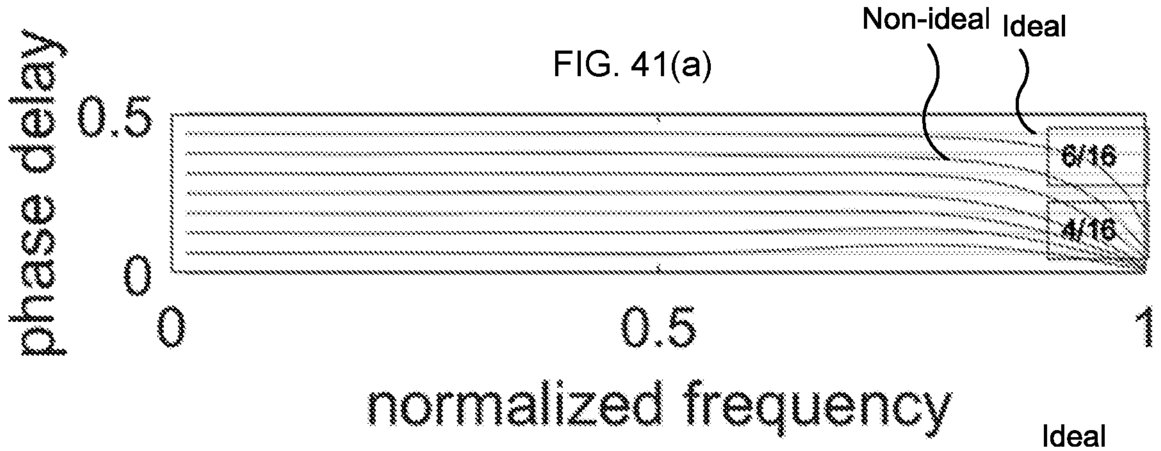
FIGS. 41(*a*) and 41(*b*) respectively show plots of phase delay response and magnitude of frequency response of a filter according to some embodiments.
Figure 41B:
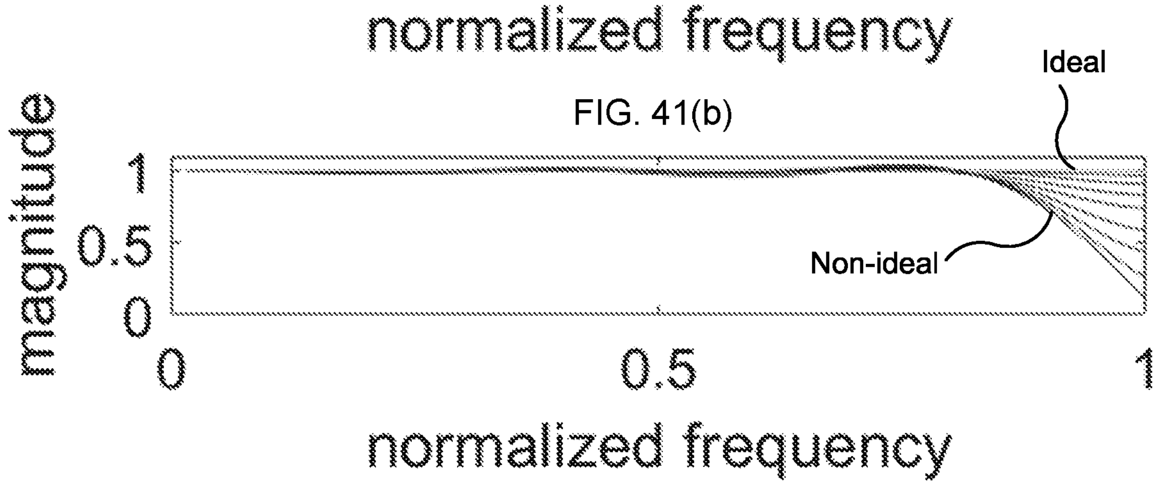

FIG. 41(*a*) shows plots of phase delay responses of the above 10-tap upscaling filters, and FIG. 41(*b*) shows plots of magnitude of frequency responses of the above 10-tap upscaling filters.

In some embodiments, the above filter sets #3-#12 may be used for an RPR motion compensation process in a video encoder or a video decoder. Also, as discussed above, the filter sets may be used for up-scaling or down-scaling a picture having a certain picture resolution into a picture having a different picture resolution.

In some embodiments, the following steps may be executed during the RPR motion compensation process in order to encode or decode a current inter block in a current picture. First step comprises determining a reference picture that is associated with a current inter block included in a current picture. Second step comprises determining a motion vector that is associated with the reference picture for the current inter block. Third step comprises determining a scaling ratio based on a picture resolution of the current picture and a picture resolution of the reference picture. Fourth step comprises determining a phase index based on the motion vector. Fifth step comprises selecting from a set of filters a filter to use in the motion compensation for generating a prediction block that contains prediction samples of the current inter block, based on the scaling ratio and the phase index. Sixth step comprises generating, based on the filter, the prediction block that contains prediction samples for the current inter block.

The above 10-tap filter sets #8-#12 selected based on the ratio of the reference picture and the current picture may be used for RPR filtering of affine coded blocks and/or the above 12-tap filter sets #6-#7 may be used for RPR filtering of non-affine coded blocks.

Figure 12:
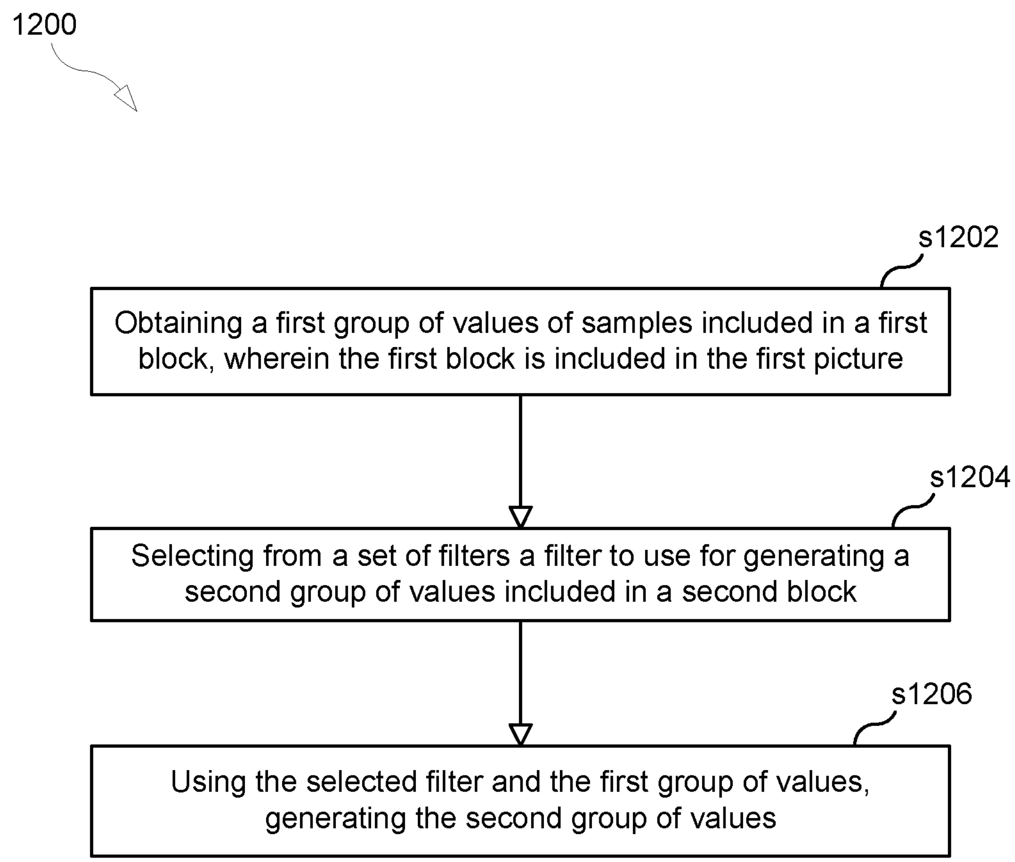
FIGS. 12 and 13 respectively show a process according to some embodiments.

FIG. 12 shows a process 1200 for encoding or decoding a video according to some embodiments. The video comprises a sequence of pictures which includes a first picture and a second picture. The process 1200 may begin with step s1202. Step s1202 comprises obtaining a first group of values of samples included in a first block, wherein the first block is included in the first picture. Step s1204 comprises selecting from a set of filters a filter to use for generating a second group of values included in a second block, wherein the second block is included in the first picture or the second picture. Step s1206 comprises using the selected filter and the first group of values, generating the second group of values, wherein the filter comprises a set of 6, 8, 10, or 12 coefficient values, and the set of coefficient values is selected from groups of coefficient values±2, where the groups of coefficient values are disclosed in embodiment A1 below.

The embodiments of A2-A26 below are applicable to process 1200 shown in FIG. 12.

Figure 13:
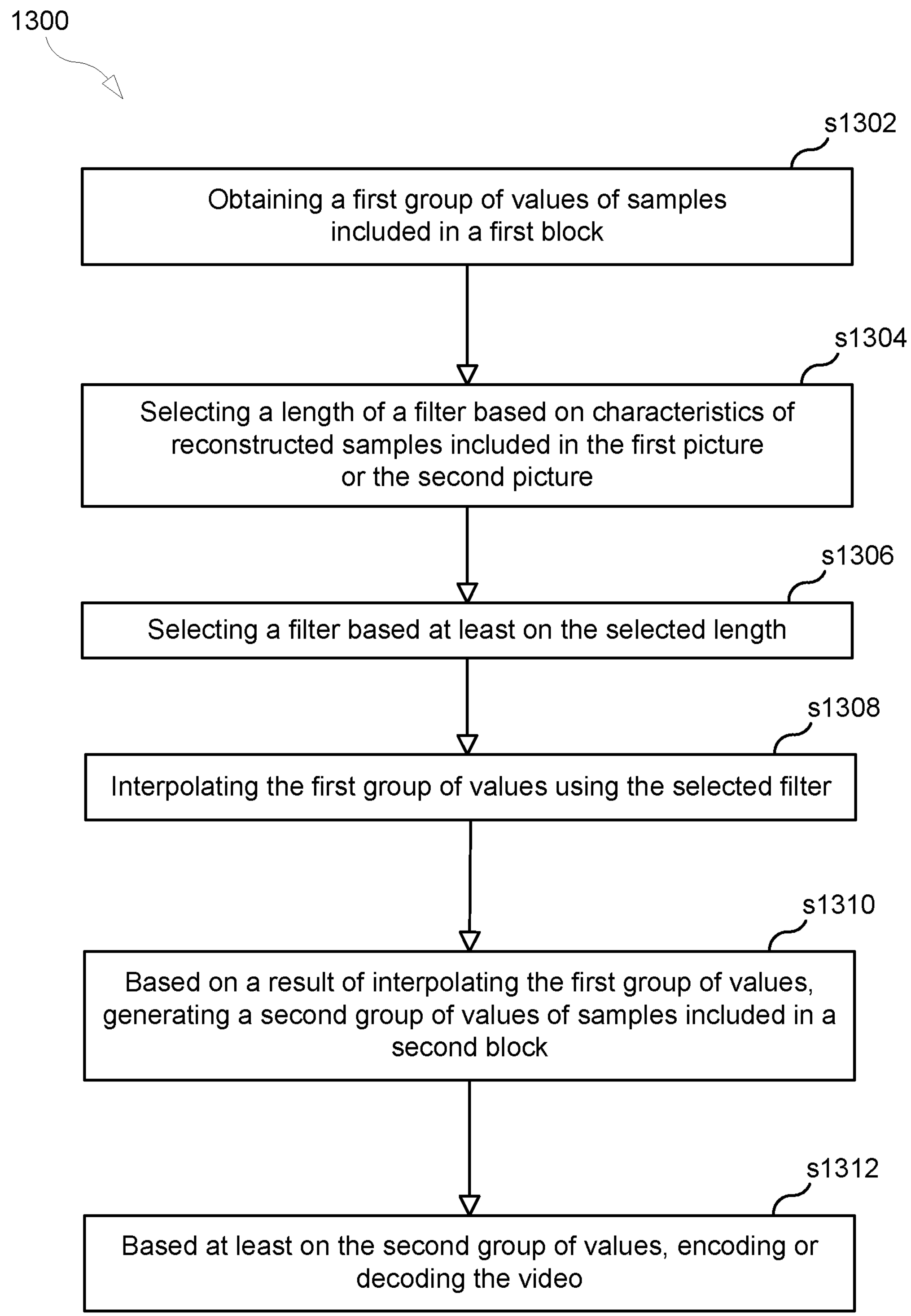

FIG. 13 shows a process 1300 for encoding or decoding a video. The video comprises a sequence of pictures which includes a first picture and a second picture. The process 1300 may begin with step s1302. Step s1302 comprises obtaining a first group of values of samples included in a first block, wherein the first block is included in the first picture. Step s1304 comprises selecting a length of a filter based on characteristics of reconstructed samples included in the first picture or the second picture. Step s1306 comprises selecting a filter based at least on the selected length. Step s1308 comprises interpolating the first group of values using the selected filter. Step s1310 comprises, based on a result of interpolating the first group of values, generating (s1310) a second group of values of samples included in a second block, wherein the second block is included in the first picture or the second picture. Step s1312 comprises based at least on the second group of values, encoding or decoding (s1312) the video. The embodiments B2-B26 below are applicable to process 1300 shown in FIG. 13.

Figure 14:
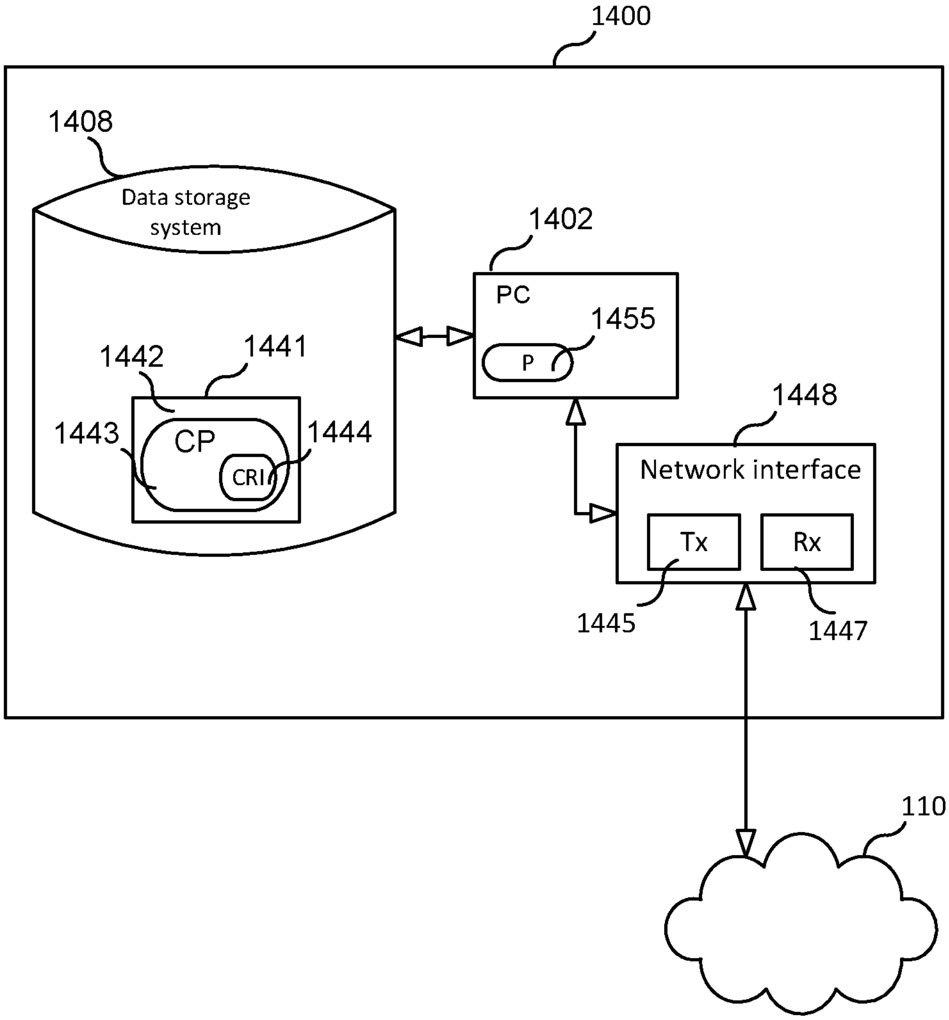
FIG. 14 shows an apparatus according to some embodiments.
Figure 15:
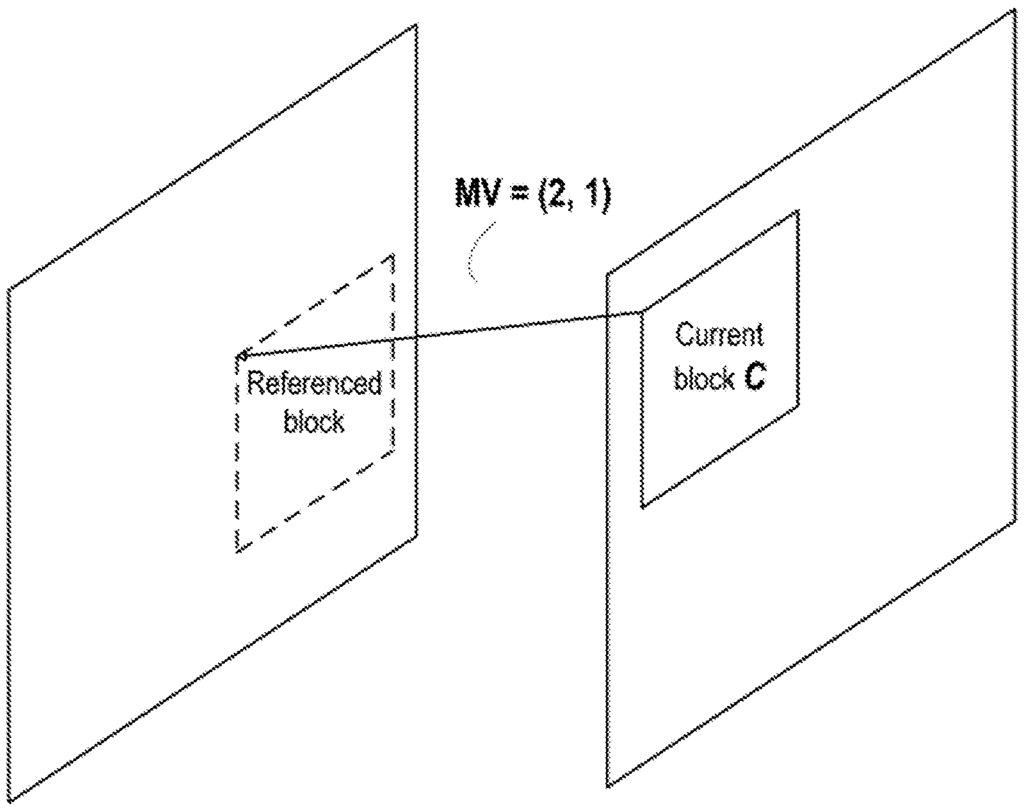
FIG. 15 shows an example of a motion vector.
Figure 16:
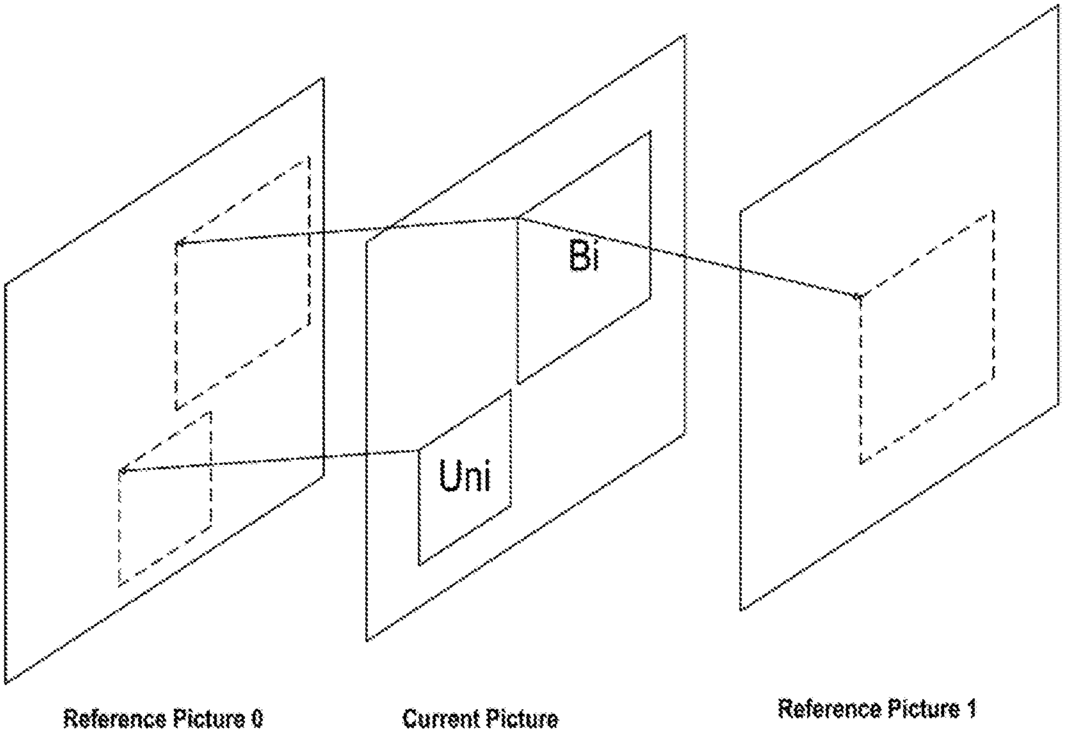
FIG. 16 shows different prediction types.
Figure 17:
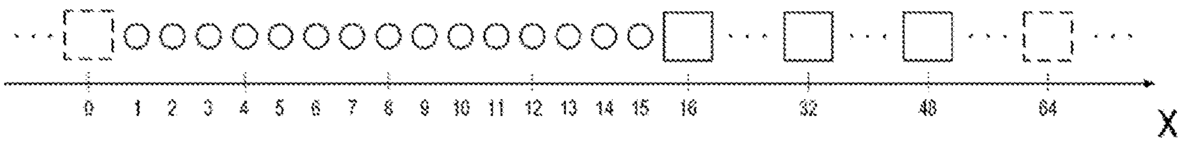
FIG. 17 shows a fractional MV position.
Figure 18:
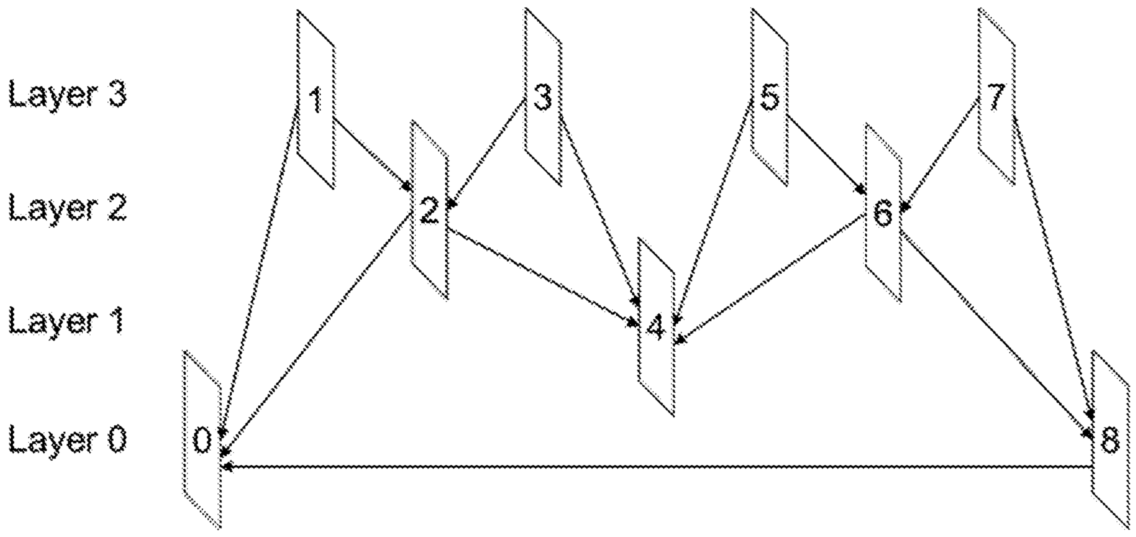
FIG. 18 shows an example of a four layer B-GOP structure.
Figure 19:
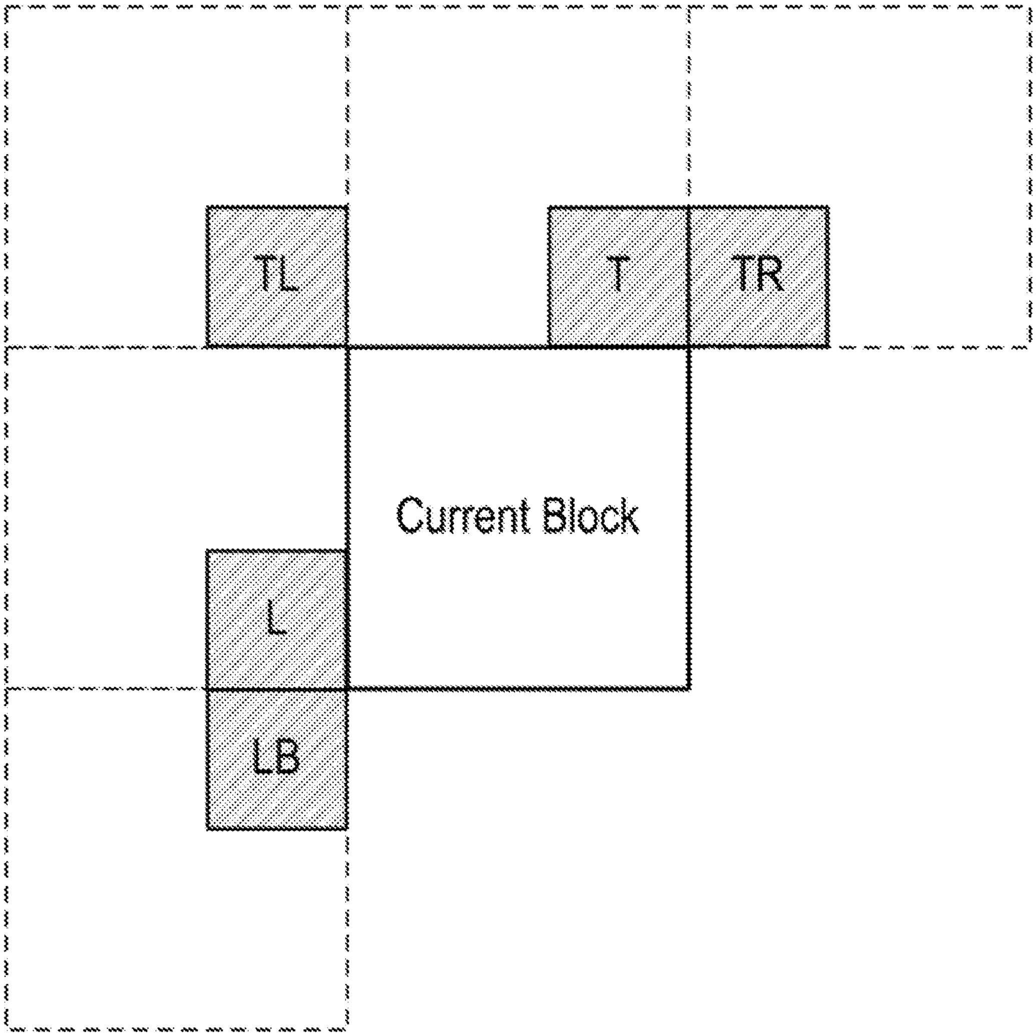
FIGS. 19 and 20 respectively show an arrangement of possible spatial blocks.
Figure 20:
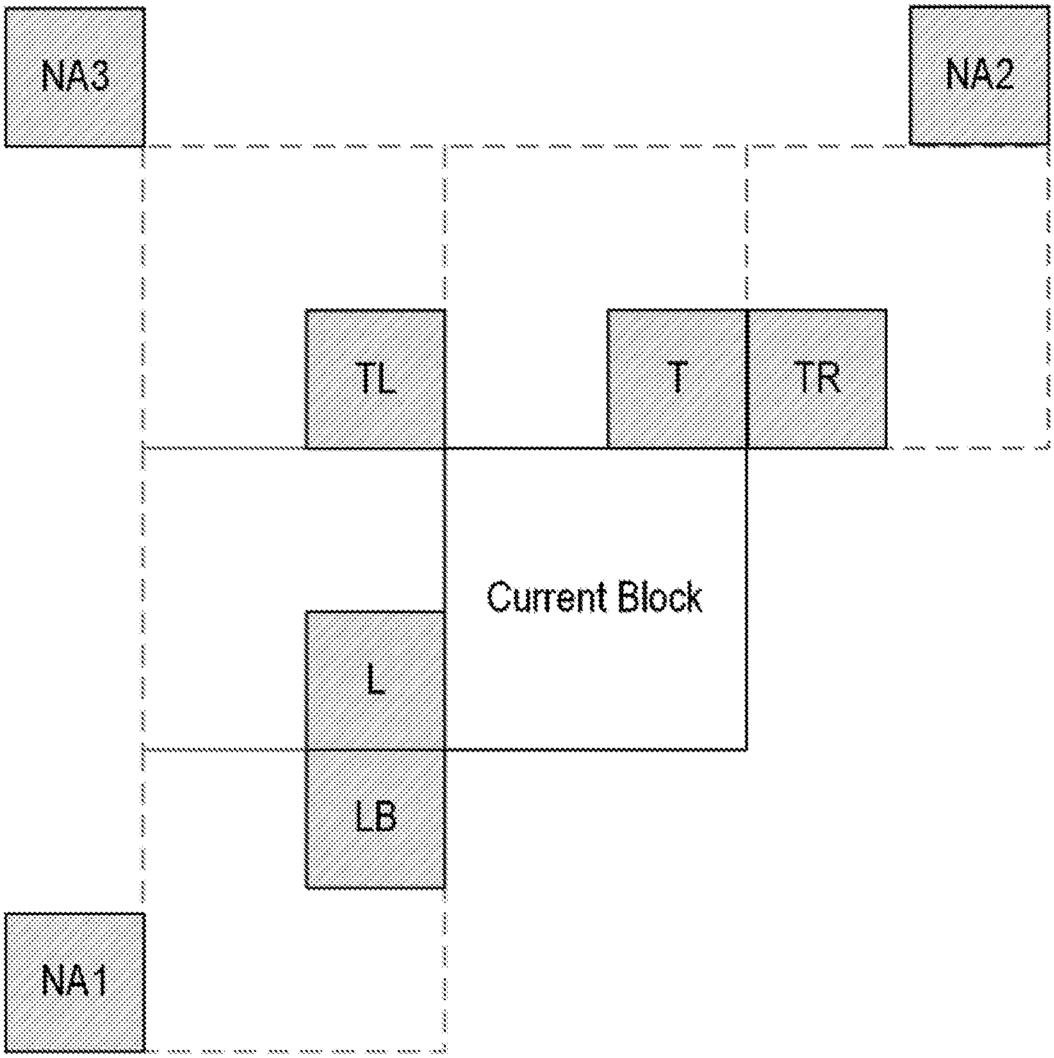
Figure 21:
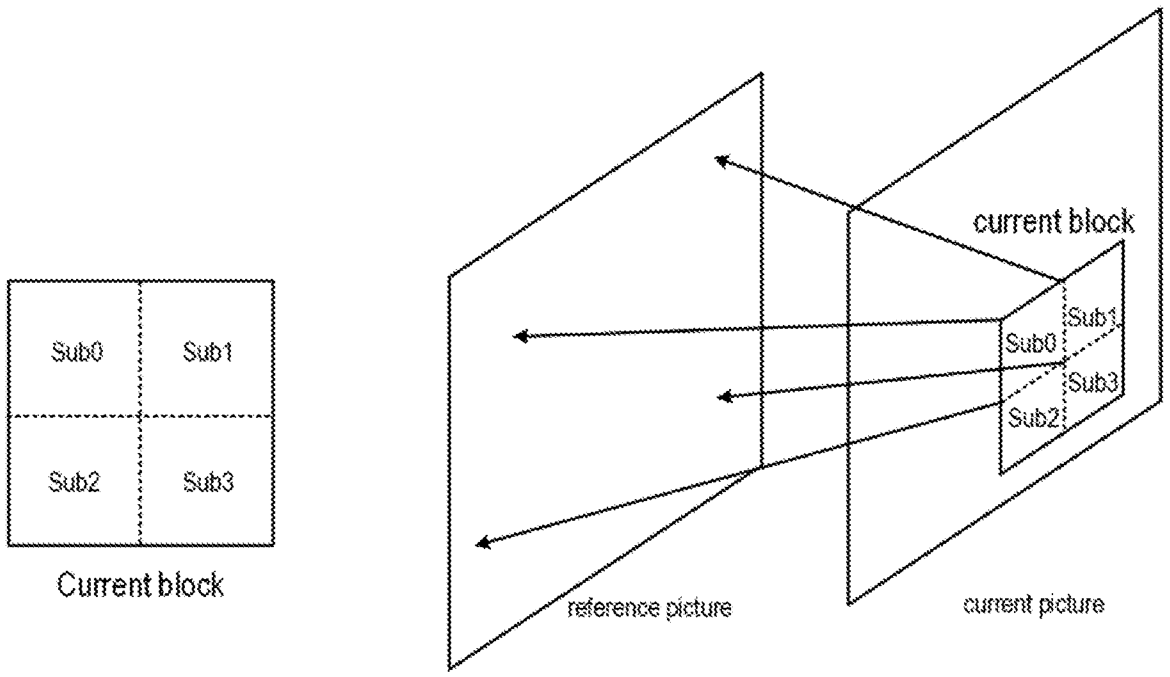
FIG. 21 shows an example of subblocks.
Figure 22:
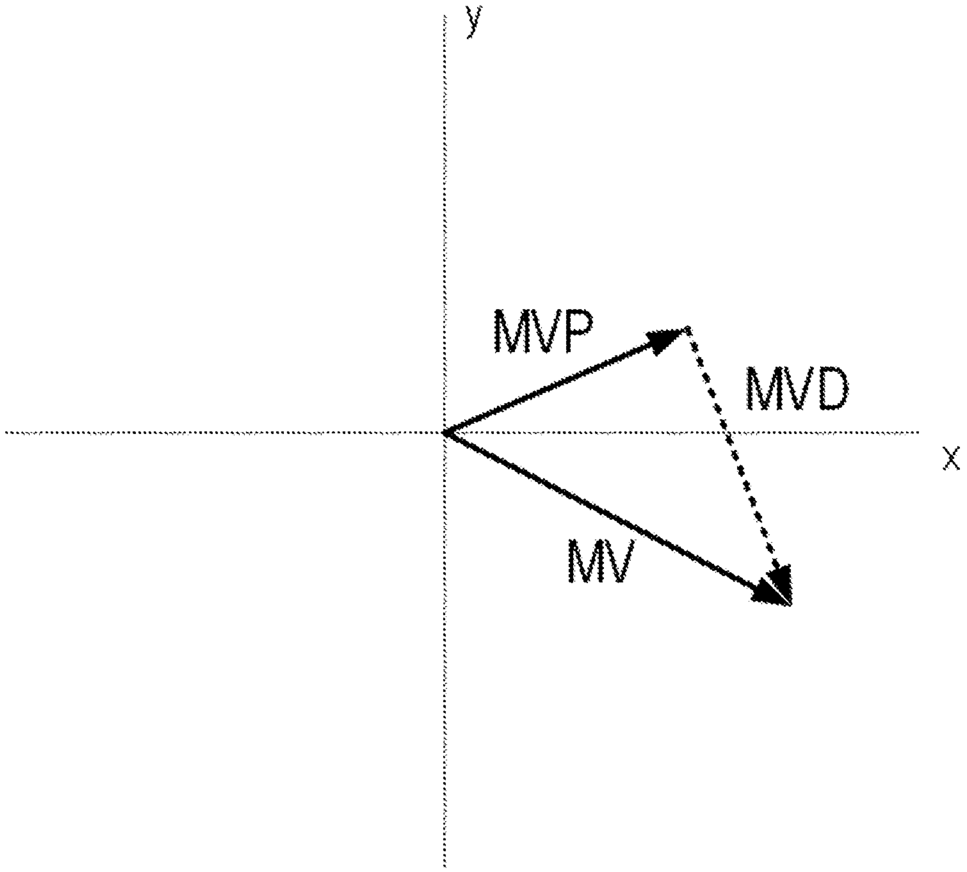
FIG. 22 shows an example of MVD derivation.
Figure 23A:
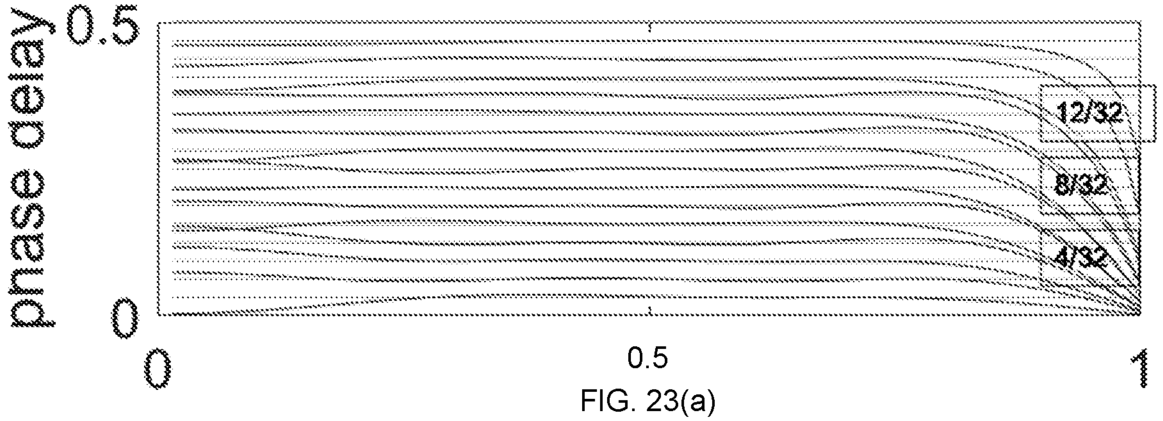
FIGS. 23(*a*) and 23(*b*) respectively show plots of phase delay response and magnitude of frequency response of a filter.
Figure 23B:
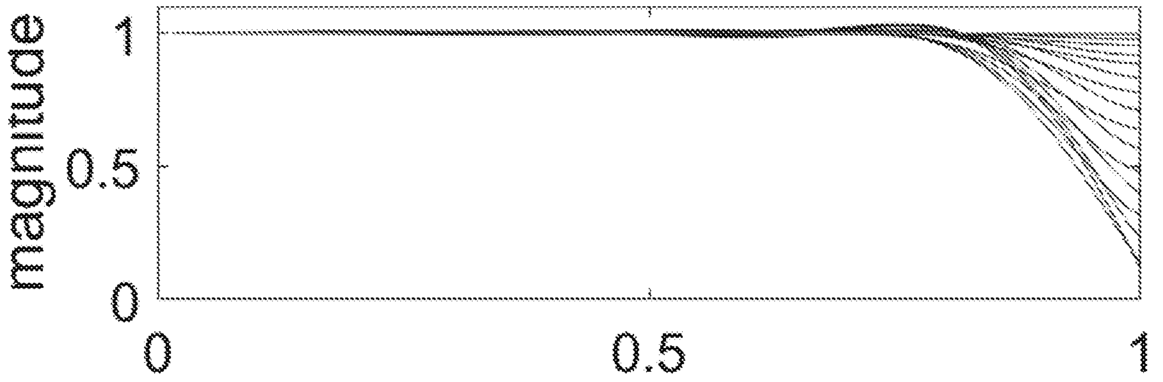
Figure 24A:
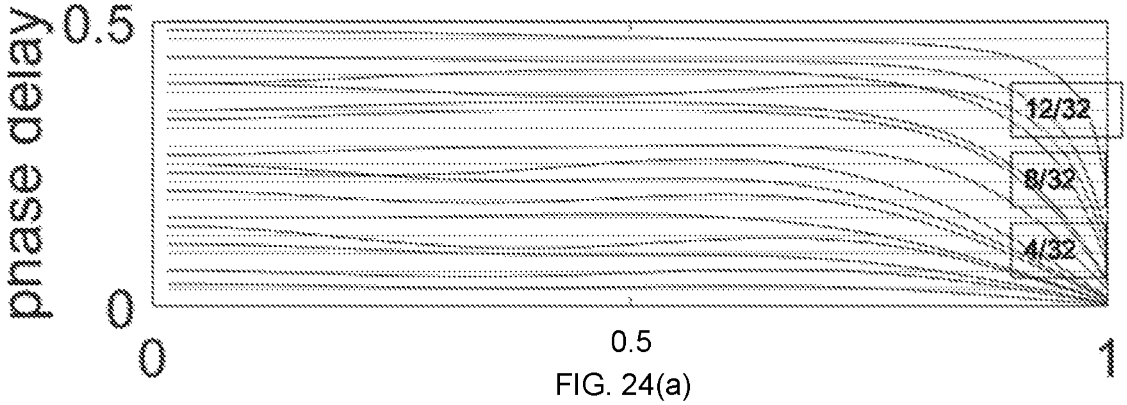
FIGS. 24(*a*) and 24(*b*) respectively show plots of phase delay response and magnitude of frequency response of a filter.
Figure 24B:
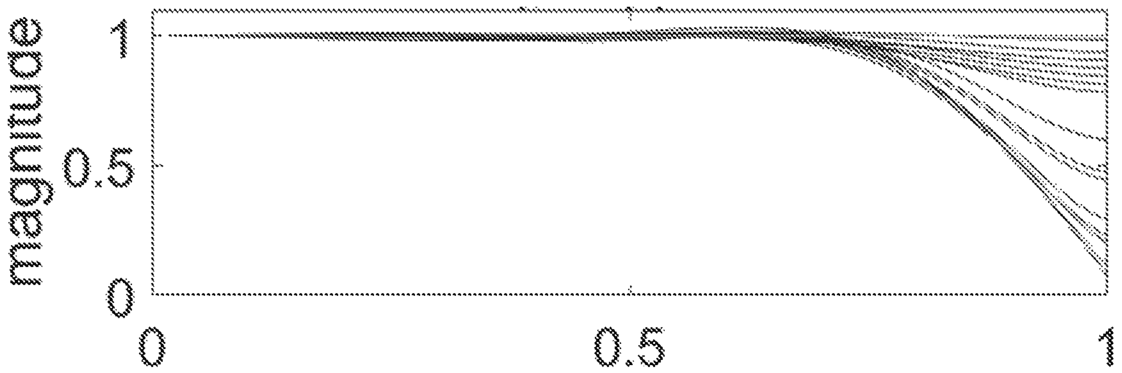
Figure 25A:
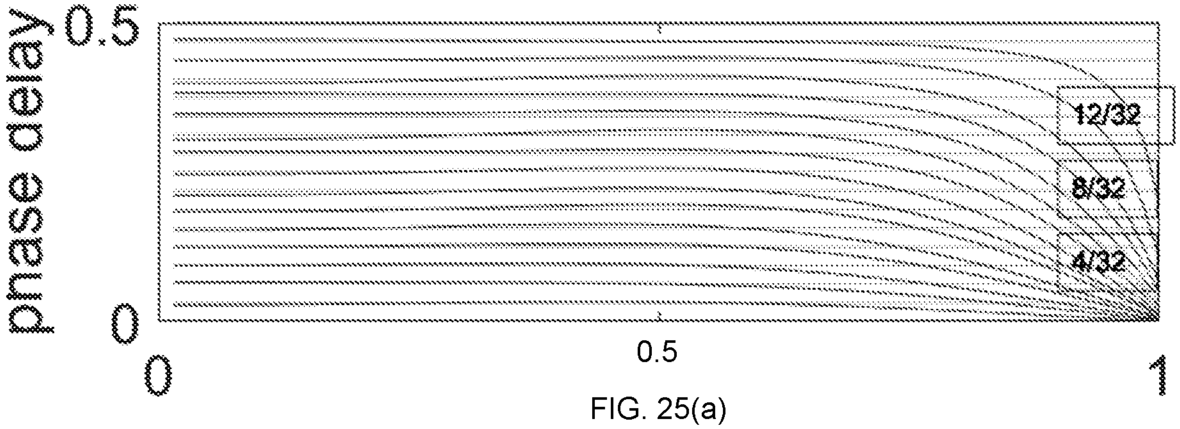
FIGS. 25(*a*) and 25(*b*) respectively show plots of phase delay response and magnitude of frequency response of a filter.
Figure 25B:
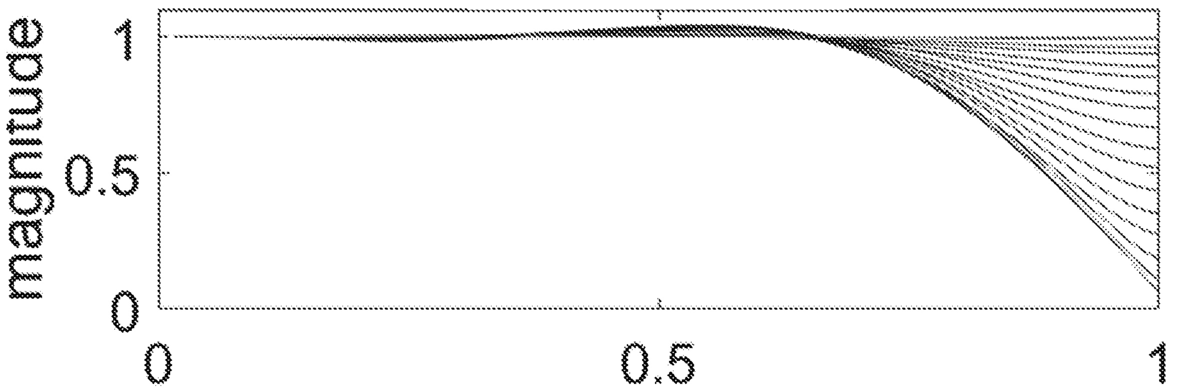
Figure 26A:
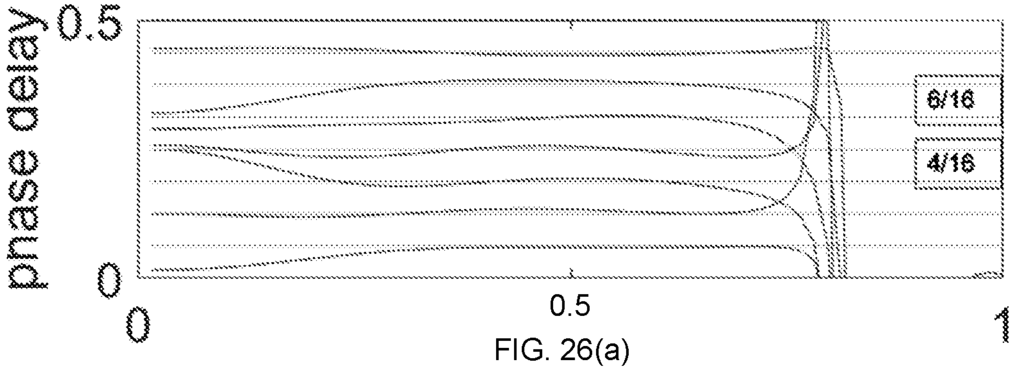
FIGS. 26(*a*) and 26(*b*) respectively show plots of phase delay response and magnitude of frequency response of a filter.
Figure 26B:
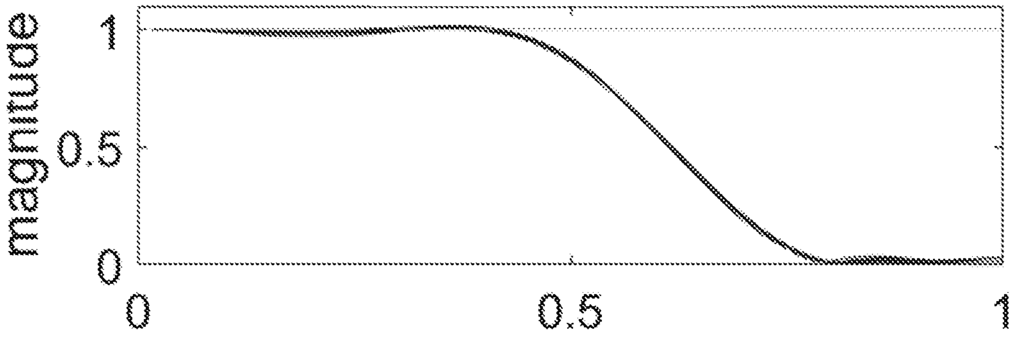
Figure 27A:
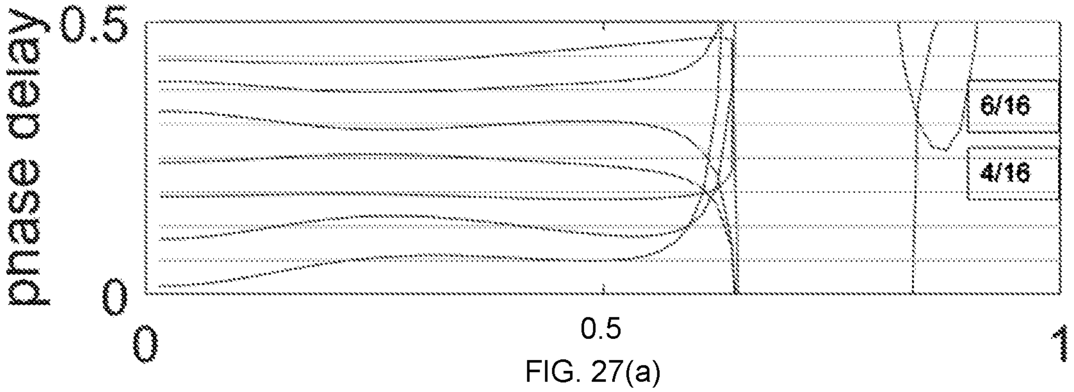
FIGS. 27(*a*) and 27(*b*) respectively show plots of phase delay response and magnitude of frequency response of a filter.
Figure 27B:
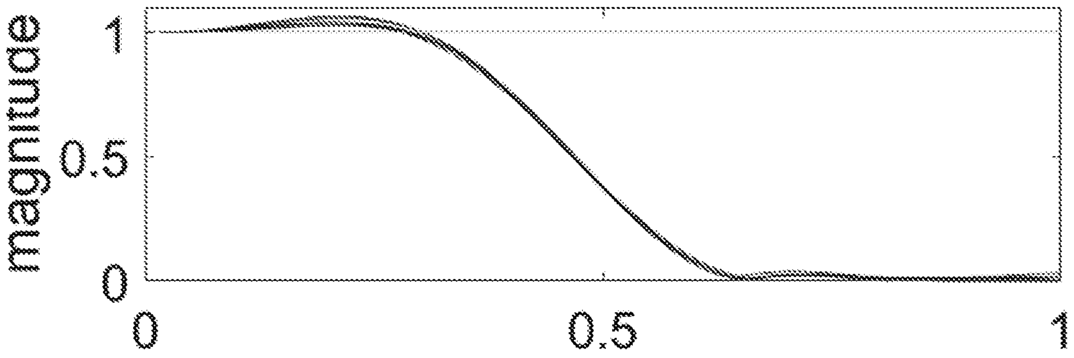
Figure 28A:
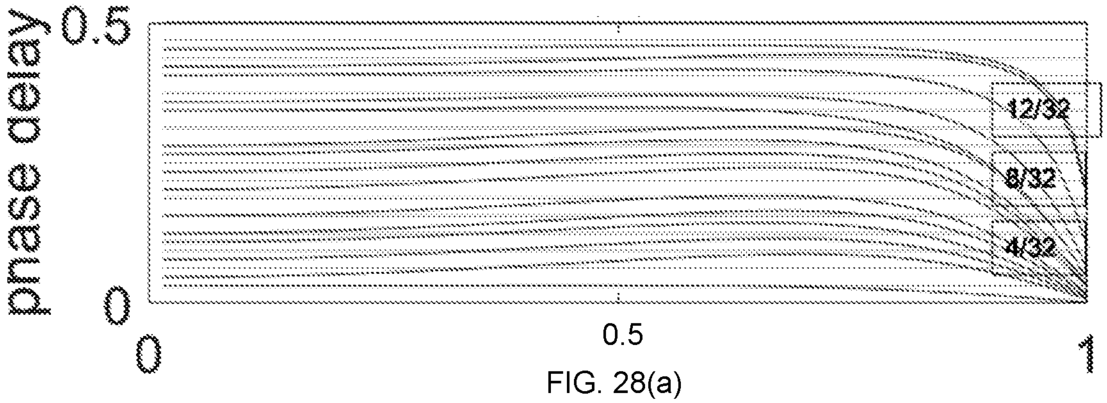
FIGS. 28(*a*) and 28(*b*) respectively show plots of phase delay response and magnitude of frequency response of a filter.
Figure 28B:
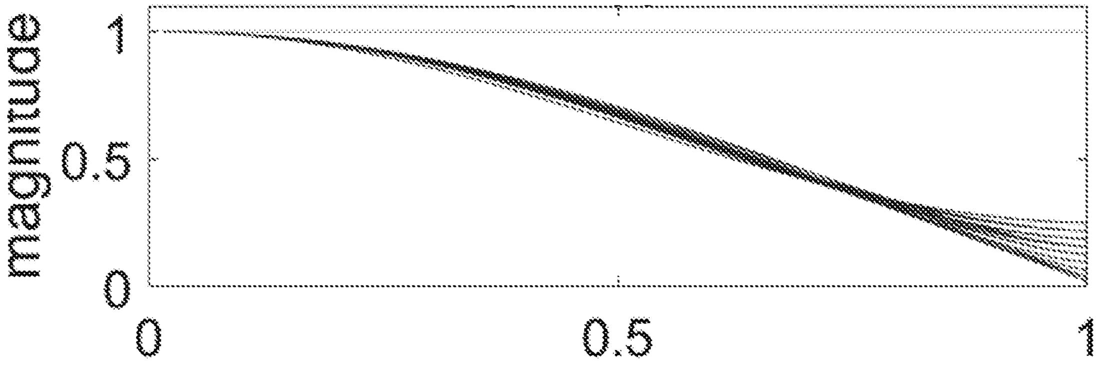
Figure 29A:
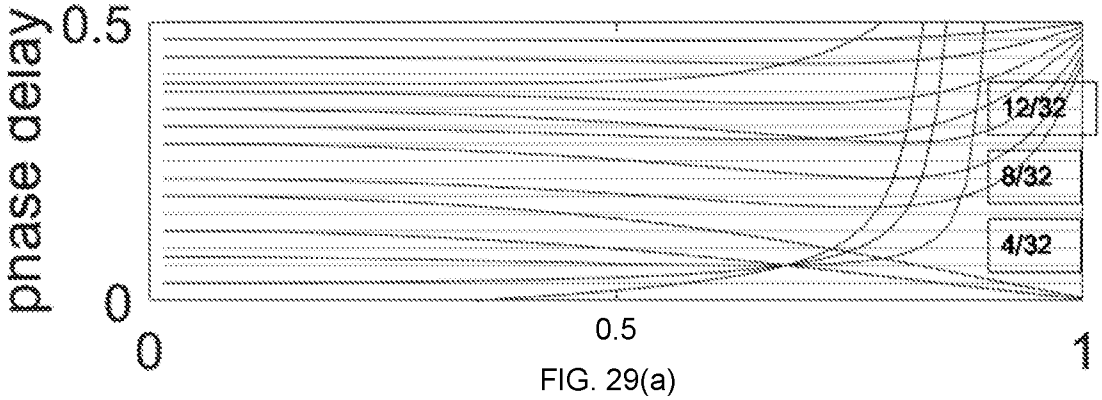
FIGS. 29(*a*) and 29(*b*) respectively show plots of phase delay response and magnitude of frequency response of a filter.
Figure 29B:
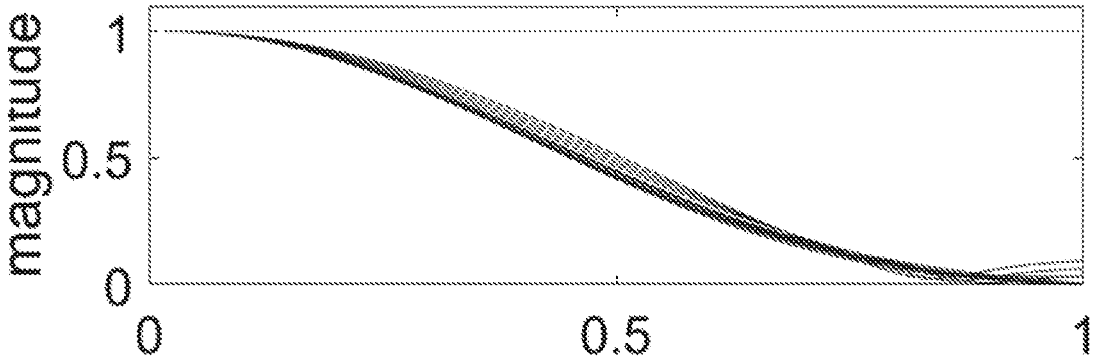

FIG. 14 is a block diagram of an apparatus 1400 for implementing the encoder 112, the decoder 114, or a component included in the encoder 112 or the decoder 114 (e.g., 249, 250 shown in FIG. 2, 366, 367 shown in FIG. 3), according to some embodiments. When apparatus 1400 implements a decoder, apparatus 1400 may be referred to as a "decoding apparatus 1400," and when apparatus 1400 implements an encoder, apparatus 1400 may be referred to as an "encoding apparatus 1400." As shown in FIG. 14, apparatus 1400 may comprise: processing circuitry (PC) 1402, which may include one or more processors (P) 1455 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., apparatus 1400 may be a distributed computing apparatus); at least one network interface 1448 comprising a transmitter (Tx) 1445 and a receiver (Rx) 1447 for enabling apparatus 1400 to transmit data to and receive data from other nodes connected to a network 110 (e.g., an Internet Protocol (IP) network) to which network interface 1448 is connected (directly or indirectly) (e.g., network interface 1448 may be wirelessly connected to the network 110, in which case network interface 448 is connected to an antenna arrangement); and a storage unit (a.k.a., "data storage system") 1408, which may include one or more non-volatile storage devices and/or one or more volatile storage devices. In embodiments where PC 1402 includes a programmable processor, a computer program product (CPP) 1441 may be provided. CPP 841 includes a computer readable medium (CRM) 1442 storing a computer program (CP) 1443 comprising computer readable instructions (CRI) 1444. CRM 1442 may be a non-transitory computer readable medium, such as, magnetic media (e.g., a hard disk), optical media, memory devices (e.g., random access memory, flash memory), and the like. In some embodiments, the CRI 1444 of computer program 1443 is configured such that when executed by PC 1402, the CRI causes apparatus 1400 to perform steps described herein (e.g., steps described herein with reference to the flow charts). In other embodiments, apparatus 1400 may be configured to perform steps described herein without the need for code. That is, for example, PC 1402 may consist merely of one or more ASICs. Hence, the features of the embodiments described herein may be implemented in hardware and/or software.

SUMMARY OF EMBODIMENTS

A1. A method (1200) for encoding or decoding a video, the video comprising a sequence of pictures which includes a first picture (e.g., a reference picture) and a second picture (e.g., a current picture), the method comprising:

obtaining (s1202) a first group of values of samples included in a first block, wherein the first block is included in the first picture;

selecting (s1204) from a set of filters a filter to use for generating a second group of values included in a second block, wherein the second block is included in the first picture or the second picture; and using the selected filter and the first group of values, generating (s1206) the second group of values, wherein the filter comprises a set of 6, 8, 10, or 12 coefficient values, and the set of coefficient values is selected from the following groups of coefficient values±2:

{1, −6, 256, 6, −1, 0}, {2, −11, 254, 14, −4, 1}, {4, −18, 252, 23, −6, 1}, {6, −24, 249, 32, −9, 2}, {6, −26, 244, 41, −12, 3}, {7, −30, 239, 53, −18, 5}, {8, −34, 235, 61, −19, 5}, {10, −38, 228, 72, −22, 6}, {10, −39, 220, 84, −26, 7}, {10, −40, 213, 94, −29, 8}, {11, −42, 205, 105, −32, 9}, {11, −42, 196, 116, −35, 10}, {11, −42, 186, 128, −37, 10}, {11, −41, 167, 148, −40, 11}, {11, −41, 158, 158, −41, 11}, {11, −40, 148, 167, −41, 11}, {10, −37, 128, 186, −42, 11}, {10, −35, 116, 196, −42, 11}, {9, −32, 105, 205, −42, 11}, {8, −29, 94, 213, −40, 10}, {7, −26, 84, 220, −39, 10}, {6, −22, 72, 228, −38, 10}, {5, −19, 61, 235, −34, 8}, {5, −18, 53, 239, −30, 7}, {3, −12, 41, 244, −26, 6}, {2, −9, 32, 249, −24, 6}, {1, −6, 23, 252, −18, 4}, {1, −4, 14, 254, −11, 2}, {0, −1, 6, 256, −6, 1}, {28, 46, 103, 49, 29, 1}, {26, 47, 100, 53, 28, 2}, {25, 46, 99, 55, 28, 3}, {26, 39, 105, 53, 29, 4}, {25, 39, 102, 56, 29, 5}, {23, 40, 99, 60, 28, 6}, {22, 40, 96, 63, 28, 7}, {20, 41, 93, 66, 29, 7}, {19, 40, 92, 68, 29, 8}, {18, 39, 91, 70, 29, 9}, {16, 40, 88, 73, 30, 9}, {16, 38, 87, 74, 31, 10}, {16, 36, 86, 75, 32, 11}, {14, 38, 82, 77, 34, 11}, {12, 38, 81, 79, 35, 11}, {12, 36, 80, 80, 36, 12}, {11, 35, 79, 81, 38, 12}, {11, 34, 77, 82, 38, 14}, {11, 32, 75, 86, 36, 16}, {10, 31, 74, 87, 38, 16}, {9, 30, 73, 88, 40, 16}, {9, 29, 70, 91, 39, 18}, {8, 29, 68, 92, 40, 19}, {7, 29, 66, 93, 41, 20}, {7, 28, 63, 96, 40, 22}, {6, 28, 60, 99, 40, 23}, {5, 29, 56, 102, 39, 25}, {4, 29, 53, 105, 39, 26}, {3, 28, 55, 99, 46, 25}, {2, 28, 53, 100, 47, 26}, {1, 29, 49, 103, 46, 28}, {0, 44, 160, 53, −2, 1}, {−2, 42, 160, 59, −4, 1}, {−2, 38, 159, 65, −5, 1}, {−1, 33, 159, 68, −4, 1}, {−2, 33, 154, 74, −4, 1}, {−1, 27, 155, 78, −4, 1}, {−2, 25, 153, 84, −5, 1}, {−2, 22, 151, 89, −5, 1}, {−1, 17, 151, 93, −6, 2}, {−2, 16, 147, 99, −5, 1}, {−1, 14, 142, 103, −3, 1}, {−1, 12, 139, 107, −2, 1}, {−1, 10, 135, 112, 0, 0}, {−1, 8, 132, 116, 1, 0}, {0, 3, 131, 122, −1, 1}, {0, 4, 124, 124, 4, 0}, {1, −1, 122, 131, 3, 0}, {0, 1, 116, 132, 8, −1}, {0, 0, 112, 135, 10, −1}, {1, −2, 107, 139, 12, −1}, {1, −3, 103, 142, 14, −1}, {1, −5, 99, 147, 16, −2}, {2, −6, 93, 151, 17, −1}, {1, −5, 89, 151, 22, −2}, {1, −5, 84, 153, 25, −2}, {1, −4, 78, 155, 27, −1}, {1, −4, 74, 154, 33, −2}, {1, −4, 68, 159, 33, −1}, {1, −5, 65, 159, 38, −2}, {1, −4, 59, 160, 42, −2}, {1, −2, 53, 160, 44, 0}, {−14, 64, 156, 64, −14, 0}, {−13, 59, 155, 68, −12, −1}, {−13, 56, 154, 71, −11, −1}, {−13, 52, 153, 76, −10, −2}, {−12, 47, 153, 79, −9, −2}, {−13, 45, 151, 84, −8, −3}, {−13, 39, 154, 88, −9, −3}, {−14, 34, 156, 94, −10, −4}, {−15, 33, 152, 99, −7, −6}, {−15, 30, 150, 103, −5, −7}, {−14, 26, 148, 107, −4, −7}, {−12, 23, 143, 110, −1, −7}, {−13, 18, 145, 116, −2, −8}, {−10, 15, 139, 118, 1, −7}, {−15, 19, 134, 122, 9, −13}, {−14, 18, 129, 123, 13, −13}, {−14, 18, 124, 124, 18, −14}, {−13, 13, 123, 129, 18, −14}, {−13, 9, 122, 134, 19, −15}, {−7, 1, 118, 139, 15, −10}, {−8, −2, 116, 145, 18, −13}, {−7, −1, 110, 143, 23, −12}, {−7, −4, 107, 148, 26, −14}, {−7, −5, 103, 150, 30, −15}, {−6, −7, 99, 152, 33, −15}, {−4, −10, 94, 156, 34, −14}, {−3, −9, 88, 154, 39, −13}, {−3, −8, 84, 151, 45, −13}, {−2, −9, 79, 153, 47, −12}, {−2, −10, 76, 153, 52, −13}, {−1, −11, 71, 154, 56, −13}, {−1, −12, 68, 155, 59, −13}, {−5, 64, 138, 64, −5, 0}, {−8, 66, 132, 73, −6, −1}, {−9, 62, 134, 76, −5, −2}, {−10, 59, 134, 80, −4, −3}, {−10, 57, 132, 82, −2, −3}, {−10, 53, 132, 85, 0, −4}, {−11, 50, 132, 89, 1, −5}, {−12, 47, 132, 93, 2, −6}, {−13, 45, 131, 96, 4, −7}, {−12, 40, 131, 99, 5, −7}, {−12, 39, 127, 101, 9, −8}, {−13, 36, 127, 105, 10, −9}, {−12, 33, 124, 107, 14, −10}, {−13, 30, 124, 111, 15, −11}, {−13, 29, 121, 112, 18, −11}, {−12, 25, 119, 115, 21, −12}, {−13, 24, 117, 117, 24, −13}, {−12, 21, 115, 119, 25, −12}, {−11, 18, 112, 121, 29, −13}, {−11, 15, 111, 124, 30, −13}, {−10, 14, 107, 124, 33, −12}, {−9, 10, 105, 127, 36, −13}, {−8, 9, 101, 127, 39, −12}, {−7, 5, 99, 131, 40,

-12}, {-7, 4, 96, 131, 45, -13}, {-6, 2, 93, 132, 47, -12}, {-5, 1, 89, 132, 50, -11}, {-4, 0, 85, 132, 53, -10}, {-3, -2, 82, 132, 57, -10}, {-3, -4, 80, 134, 59, -10}, {-2, -5, 76, 134, 62, -9}, {-1, -6, 73, 132, 66, -8}, {-1, 3, -7, 254, 11, -6, 3, -1}, {-1, 4, -12, 253, 16, -6, 3, -1}, {-2, 7, -18, 249, 28, -12, 6, -2}, {-2, 8, -23, 248, 33, -11, 4, -1}, {-3, 11, -28, 242, 47, -19, 8, -2}, {-3, 12, -33, 241, 51, -16, 5, -1}, {-4, 15, -38, 236, 62, -21, 8, -2}, {-5, 18, -43, 231, 72, -23, 8, -2}, {-6, 19, -44, 223, 84, -28, 12, -4}, {-4, 15, -40, 210, 99, -35, 15, -4}, {-3, 12, -36, 195, 117, -42, 18, -5}, {-4, 15, -40, 190, 124, -42, 18, -5}, {-4, 15, -41, 183, 133, -42, 16, -4}, {-4, 15, -42, 176, 142, -44, 18, -5}, {-5, 17, -42, 165, 153, -45, 18, -5}, {-5, 18, -45, 153, 165, -42, 17, -5}, {-5, 18, -44, 142, 176, -42, 15, -4}, {-4, 16, -42, 133, 183, -41, 15, -4}, {-5, 18, -42, 124, 190, -40, 15, -4}, {-5, 18, -42, 117, 195, -36, 12, -3}, {-4, 15, -35, 99, 210, -40, 15, -4}, {-4, 12, -28, 84, 223, -44, 19, -6}, {-2, 8, -23, 72, 231, -43, 18, -5}, {-2, 8, -21, 62, 236, -38, 15, -4}, {-1, 5, -16, 51, 241, -33, 12, -3}, {-2, 8, -19, 47, 242, -28, 11, -3}, {-1, 4, -11, 33, 248, -23, 8, -2}, {-2, 6, -12, 28, 249, -18, 7, -2}, {-1, 3, -6, 16, 253, -12, 4, -1}, {-1, 3, -6, 11, 254, -7, 3, -1}, {0, 29, 44, 105, 47, 30, 1, 0}, {1, 25, 49, 96, 55, 27, 3, 0}, {1, 24, 47, 96, 57, 27, 5, -1}, {0, 24, 45, 97, 58, 28, 5, -1}, {-1, 25, 42, 98, 58, 30, 5, -1}, {-1, 24, 41, 97, 60, 30, 6, -1}, {-2, 25, 38, 97, 62, 30, 8, -2}, {-2, 24, 37, 96, 64, 30, 9, -2}, {-2, 23, 36, 95, 66, 30, 10, -2}, {-2, 21, 37, 92, 69, 31, 10, -2}, {-2, 20, 36, 91, 71, 31, 11, -2}, {0, 16, 39, 85, 74, 32, 11, -1}, {-1, 17, 36, 86, 75, 32, 12, -1}, {0, 13, 39, 82, 77, 35, 10, 0}, {0, 12, 38, 81, 79, 35, 11, 0}, {0, 12, 36, 80, 80, 36, 12, 0}, {0, 11, 35, 79, 81, 38, 12, 0}, {0, 10, 35, 77, 82, 39, 13, 0}, {-1, 12, 32, 75, 86, 36, 17, -1}, {-1, 11, 32, 74, 85, 39, 16, 0}, {-2, 11, 31, 71, 91, 36, 20, -2}, {-2, 10, 31, 69, 92, 37, 21, -2}, {-2, 10, 30, 66, 95, 36, 23, -2}, {-2, 9, 30, 64, 96, 37, 24, -2}, {-2, 8, 30, 62, 97, 38, 25, -2}, {-1, 6, 30, 60, 97, 41, 24, -1}, {-1, 5, 30, 58, 98, 42, 25, -1}, {-1, 5, 28, 58, 97, 45, 24, 0}, {-1, 5, 27, 57, 96, 47, 24, 1}, {0, 3, 27, 55, 96, 49, 25, 1}, {0, 1, 30, 47, 105, 44, 29, 0}, {13, -38, 56, 194, 56, -38, 13, 0,}, {13, -38, 52, 193, 62, -38, 11, 1,}, {13, -36, 44, 193, 69, -37, 8, 2,}, {12, -34, 39, 192, 74, -36, 7, 2,}, {13, -33, 32, 192, 79, -36, 6, 3,}, {12, -30, 26, 190, 86, -36, 4, 4,}, {12, -29, 21, 188, 92, -35, 3, 4,}, {14, -28, 15, 185, 97, -35, 2, 6,}, {13, -26, 11, 182, 103, -34, 1, 6,}, {13, -23, 4, 180, 109, -34, 0, 7,}, {13, -23, 2, 175, 115, -31, -2, 7,}, {12, -20, -3, 172, 121, -30, -4, 8,}, {11, -18, -7, 168, 128, -28, -6, 8,}, {11, -16, -11, 164, 133, -27, -7, 9,}, {11, -15, -14, 159, 139, -25, -8, 9,}, {10, -13, -17, 155, 144, -23, -9, 9,}, {9, -11, -20, 150, 150, -20, -11, 9,}, {9, -9, -23, 144, 155, -17, -13, 10,}, {9, -8, -25, 139, 159, -14, -15, 11,}, {9, -7, -27, 133, 164, -11, -16, 11,}, {8, -6, -28, 128, 168, -7, -18, 11,}, {8, -4, -30, 121, 172, -3, -20, 12,}, {7, -2, -31, 115, 175, 2, -23, 13,}, {7, 0, -34, 109, 180, 4, -23, 13,}, {6, 1, -34, 103, 182, 11, -26, 13,}, {6, 2, -35, 97, 185, 15, -28, 14,}, {4, 3, -35, 92, 188, 21, -29, 12,}, {4, 4, -36, 86, 190, 26, -30, 12,}, {3, 6, -36, 79, 192, 32, -33, 13,}, {2, 7, -36, 74, 192, 39, -34, 12,}, {2, 8, -37, 69, 193, 44, -36, 13,}, {1, 11, -38, 62, 193, 52, -38, 13,}, {-21, 7, 74, 136, 74, 7, -21, 0,}, {-20, 5, 69, 140, 75, 8, -20, -1,}, {-19, 3, 66, 140, 78, 9, -19, -2,}, {-17, 1, 62, 141, 80, 8, -17, -2,}, {-16, 1, 59, 138, 82, 10, -15, -3,}, {-16, -1, 57, 138, 86, 11, -15, -4,}, {-11, -6, 57, 131, 91, 10, -13, -3,}, {-9, -8, 53, 131, 94, 10, -12,

-3,}, {-8, -9, 49, 131, 97, 11, -12, -3,}, {-13, -8, 50, 130, 100, 18, -15, -6,}, {-10, -9, 46, 128, 102, 17, -14, -4,}, {-11, -10, 44, 127, 106, 21, -15, -6,}, {-9, -12, 41, 126, 109, 21, -15, -5,}, {-10, -12, 40, 123, 111, 26, -15, -7,}, {-9, -13, 38, 120, 113, 29, -14, -8,}, {-8, -14, 35, 120, 115, 29, -14, -7,}, {-7, -13, 32, 116, 116, 32, -13, -7,}, {-7, -14, 29, 115, 120, 35, -14, -8,}, {-8, -14, 29, 113, 120, 38, -13, -9,}, {-7, -15, 26, 111, 123, 40, -12, -10,}, {-5, -15, 21, 109, 126, 41, -12, -9,}, {-6, -15, 21, 106, 127, 44, -10, -11,}, {-4, -14, 17, 102, 128, 46, -9, -10,}, {-6, -15, 18, 100, 130, 50, -8, -13,}, {-3, -12, 11, 97, 131, 49, -9, -8,}, {-3, -12, 10, 94, 131, 53, -8, -9,}, {-3, -13, 10, 91, 131, 57, -6, -11,}, {-4, -15, 11, 86, 138, 57, -1, -16,}, {-3, -15, 10, 82, 138, 59, 1, -16,}, {-2, -17, 8, 80, 141, 62, 1, -17,}, {-2, -19, 9, 78, 140, 66, 3, -19,}, {-1, -20, 8, 75, 140, 69, 5, -20,}, {-4, -20, 64, 167, 73, -19, -5, 0}, {-1, -20, 58, 164, 77, -19, -4, 1}, {-1, -20, 53, 165, 81, -18, -5, 1}, {0, -19, 49, 161, 84, -15, -5, 1}, {0, -19, 45, 160, 89, -14, -6, 1}, {1, -20, 42, 157, 95, -13, -8, 2}, {1, -19, 37, 157, 98, -12, -8, 2}, {1, -18, 33, 154, 103, -10, -9, 2}, {1, -18, 31, 151, 107, -8, -11, 3}, {1, -19, 26, 152, 113, -7, -12, 2}, {1, -19, 23, 151, 116, -6, -12, 2}, {3, -17, 18, 145, 120, -4, -13, 4}, {3, -17, 16, 142, 123, -1, -14, 4}, {4, -17, 11, 141, 127, 0, -14, 4}, {4, -17, 9, 137, 131, 4, -16, 4}, {4, -16, 4, 131, 137, 9, -17, 4}, {4, -14, 0, 127, 141, 11, -17, 4}, {4, -14, -1, 123, 142, 16, -17, 3}, {4, -13, -4, 120, 145, 18, -17, 3}, {2, -12, -6, 116, 151, 23, -19, 1}, {2, -12, -7, 113, 152, 26, -19, 1}, {3, -11, -8, 107, 151, 31, -18, 1}, {2, -9, -10, 103, 154, 33, -18, 1}, {2, -8, -12, 98, 157, 37, -19, 1}, {2, -8, -13, 95, 157, 42, -20, 1}, {1, -6, -14, 89, 160, 45, -19, 0}, {1, -5, -15, 84, 161, 49, -19, 0}, {1, -5, -18, 81, 165, 53, -20, -1}, {1, -4, -19, 77, 164, 58, -20, -1}, {0, -5, -19, 73, 167, 64, -20, -4}, {-15, 9, 75, 118, 75, 9, -15, 0}, {-14, 7, 70, 123, 75, 9, -13, -1}, {-18, 7, 69, 125, 79, 14, -18, -2}, {-17, 5, 66, 126, 81, 14, -16, -3}, {-16, 3, 63, 127, 83, 15, -16, -3}, {-17, 3, 60, 128, 85, 17, -16, -4}, {-16, 3, 56, 127, 86, 19, -14, -5}, {-15, 0, 56, 124, 90, 21, -15, -5}, {-16, 1, 53, 124, 90, 25, -15, -6}, {-15, 0, 51, 121, 93, 26, -13, -7}, {-16, -2, 52, 118, 97, 29, -13, -9}, {-15, -4, 51, 116, 99, 31, -13, -9}, {-15, -4, 47, 116, 102, 31, -10, -11}, {-15, -4, 45, 114, 103, 34, -9, -12}, {-14, -5, 43, 112, 104, 37, -9, -12}, {-13, -7, 42, 110, 106, 39, -9, -12}, {-13, -9, 41, 109, 109, 41, -9, -13}, {-12, -9, 39, 106, 110, 42, -7, -13}, {-12, -9, 37, 104, 112, 43, -5, -14}, {-12, -9, 34, 103, 114, 45, -4, -15}, {-11, -10, 31, 102, 116, 47, -4, -15}, {-9, -13, 31, 99, 116, 51, -4, -15}, {-9, -13, 29, 97, 118, 52, -2, -16}, {-7, -13, 26, 93, 121, 51, 0, -15}, {-6, -15, 25, 90, 124, 53, 1, -16}, {-5, -15, 21, 90, 124, 56, 0, -15}, {-5, -14, 19, 86, 127, 56, 3, -16}, {-4, -16, 17, 85, 128, 60, 3, -17}, {-3, -16, 15, 83, 127, 63, 3, -16}, {-3, -16, 14, 81, 126, 66, 5, -17}, {-2, -18, 14, 79, 125, 69, 7, -18}, {-1, -13, 9, 75, 123, 70, 7, -14}, {0, 1, -2, 3, -7, 255, 8, -3, 2, -1, 0, 0}, {-1, 3, -4, 6, -14, 254, 17, -8, 5, -3, 1, 0}, {-1, 3, -5, 9, -21, 253, 25, -10, 5, -3, 1, 0}, {-1, 4, -8, 13, -26, 249, 34, -14, 8, -4, 1, 0}, {-2, 6, -10, 16, -32, 246, 44, -18, 9, -4, 1, 0}, {-1, 4, -9, 18, -39, 235, 65, -26, 13, -6, 3, -1}, {-2, 6, -12, 22, -44, 230, 75, -28, 14, -7, 3, -1}, {-2, 6, -12, 23, -47, 224, 85, -31, 15, -7, 3, -1}, {-2, 7, -13, 23, -48, 216, 97, -36, 18, -9, 4, -1}, {-2, 6, -12, 23, -49, 209, 106, -37, 19, -10, 4, -1}, {-3, 8, -14, 26, -52, 200, 119, -42, 22, -12, 6, -2}, {-2, 6, -12, 24, -51, 191, 129, -43, 22,

−12, 6, −2}, {−2, 7, −14, 25, −50, 180, 141, −46, 23, −12, 6, −2}, {−2, 6, −12, 24, −50, 171, 151, −47, 23, −12, 6, −2}, {−2, 6, −12, 23, −47, 151, 171, −50, 24, −12, 6, −2}, {−2, 6, −12, 23, −46, 141, 180, −50, 25, −14, 7, −2}, {−2, 6, −12, 22, −43, 129, 191, −51, 24, −12, 6, −2}, {−2, 6, −12, 22, −42, 119, 200, −52, 26, −14, 8, −3}, {−1, 4, −10, 19, −37, 106, 209, −49, 23, −12, 6, −2}, {−1, 4, −9, 18, −36, 97, 216, −48, 23, −13, 7, −2}, {−1, 3, −7, 15, −31, 85, 224, −47, 23, −12, 6, −2}, {−1, 3, −7, 14, −28, 75, 230, −44, 22, −12, 6, −2}, {−1, 3, −6, 13, −26, 65, 235, −39, 18, −9, 4, −1}, {0, 1, −4, 9, −18, 44, 246, −32, 16, −10, 6, −2}, {0, 1, −4, 8, −14, 34, 249, −26, 13, −8, 4, −1}, {0, 1, −3, 5, −10, 25, 253, −21, 9, −5, 3, −1}, {0, 1, −3, 5, −8, 17, 254, −14, 6, −4, 3, −1}, {0, 0, −1, 2, −3, 8, 255, −7, 3, −2, 1, 0}, {0, 10, −12, −19, 70, 158, 70, −19, −12, 10, 0, 0}, {0, 10, −9, −22, 62, 156, 79, −17, −13, 9, 1, 0}, {−1, 10, −8, −22, 54, 155, 87, −13, −16, 9, 2, −1}, {−2, 10, −5, −23, 46, 152, 95, −9, −18, 9, 2, −1}, {−2, 9, −4, −23, 39, 150, 103, −6, −20, 8, 4, −2}, {−2, 8, −1, −24, 33, 144, 111, −2, −20, 6, 5, −2}, {−3, 9, −1, −24, 26, 142, 117, 4, −22, 5, 5, −2}, {−3, 8, 0, −23, 20, 137, 123, 10, −23, 4, 5, −2}, {−2, 6, 3, −25, 16, 130, 130, 16, −25, 3, 6, −2}, {−2, 5, 4, −23, 10, 123, 137, 20, −23, 0, 8, −3}, {−2, 5, 5, −22, 4, 117, 142, 26, −24, −1, 9, −3}, {−2, 5, 6, −20, −2, 111, 144, 33, −24, −1, 8, −2}, {−2, 4, 8, −20, −6, 103, 150, 39, −23, −4, /9, −2}, {−1, 2, 9, −18, −9, 95, 152, 46, −23, −5, 10, −2}, {−1, 2, 9, −16, −13, 87, 155, 54, −22, −8, 10, −1}, {0, 1, 9, −13, −17, 79, 156, 62, −22, −9, 10, 0}, {4, −7, −17, 13, 73, 124, 73, 13, −17, −7, 4, 0}, {3, −7, −17, 9, 72, 122, 81, 15, −16, −9, 3, 0}, {3, −5, −16, 6, 66, 120, 85, 18, −15, −10, 3, 1}, {3, −6, −17, 3, 64, 120, 90, 23, −15, −11, 1, 1}, {2, −3, −15, 0, 58, 117, 93, 25, −13, −10, 1, 1}, {4, −4, −16, −2, 54, 116, 96, 31, −14, −12, 0, 3}, {4, −3, −14, −6, 49, 114, 101, 32, −12, −12, 0, 3}, {4, −3, −13, −7, 45, 110, 103, 38, −11, −12, −2, 4}, {2, 0, −14, −9, 42, 107, 107, 42, −9, −14, 0, 2}, {4, −2, −12, −11, 38, 103, 110, 45, −7, −13, −3, 4}, {3, 0, −12, −12, 32, 101, 114, 49, −6, −14, −3, 4}, {3, 0, −12, −14, 31, 96, 116, 54, −2, −16, −4, 4}, {1, 1, −10, −13, 25, 93, 117, 58, 0, −15, −3, 2}, {1, 1, −11, −15, 23, 90, 120, 64, 3, −17, −6, 3}, {1, 3, −10, −15, 18, 85, 120, 66, 6, −16, −5, 3}, {0, 3, −9, −16, 15, 81, 122, 72, 9, −17, −7, 3}, {5, −5, −17, 9, 78, 116, 78, 9, −17, −5, 5, 0}, {5, −4, −18, 7, 73, 116, 82, 14, −18, −6, 4, 1}, {5, −4, −17, 4, 69, 115, 86, 17, −17, −7, 4, 1}, {5, −3, −17, 1, 64, 115, 90, 21, −17, −8, 3, 2}, {4, −2, −15, −2, 59, 114, 93, 24, −15, −8, 2, 2}, {4, −1, −15, −5, 55, 113, 96, 29, −15, −10, 3, 2}, {4, 0, −15, −7, 51, 110, 100, 33, −14, −11, 2, 3}, {3, 1, −13, −9, 45, 108, 104, 36, −12, −11, 1, 3}, {3, 1, −13, −10, 42, 105, 105, 42, −10, −13, 1, 3}, {3, 1, −11, −12, 36, 104, 108, 45, −9, −13, 1, 3}, {3, 2, −11, −14, 33, 100, 110, 51, −7, −15, 0, 4}, {2, 3, −10, −15, 29, 96, 113, 55, −5, −15, −1, 4}, {2, 2, −8, −15, 24, 93, 114, 59, −2, −15, −2, 4}, {2, 3, −8, −17, 21, 90, 115, 64, 1, −17, −3, 5}, {1, 4, −7, −17, 17, 86, 115, 69, 4, −17, −4, 5}, {1, 4, −6, −18, 14, 82, 116, 73, 7, −18, −4, 5}, {−1, 9, −10, −21, 74, 154, 74, −21, −10, 9, −1, 0}, {−2, 9, −8, −22, 65, 155, 81, −18, −12, 9, 0, −1}, {−2, 8, −5, −24, 57, 153, 90, −15, −14, 9, 0, −1}, {−1, 8, −5, −25, 52, 148, 97, −10, −17, 8, 2, −1}, {−2, 8, −5, −23, 45, 144, 104, −3, −20, 6, 4, −2}, {−2, 6, 0, −25, 35, 144, 112, −2, −20, 7, 3, −2}, {−2, 6, 1, −25, 28, 140, 119, 3, −22, 6, 4, −2}, {−1, 3, 4, −23, 18, 137, 126, 6, −21, 6, 2, −1}, {−1, 2, 6, −22, 10, 133, 133, 10, −22, 6, 2, −1}, {−1, 2, 6, −21, 6, 126, 137, 18, −23, 4, 3, −1}, {−2, 4, 6, −22, 3, 119, 140, 28, −25, 1, 6, −2}, {−2, 3, 7, −20, −2, 112, 144, 35, −25, 0, 6, −2}, {−2, 4, 6, −20, −3, 104, 144, 45, −23, −5, 8, −2}, {−1, 2, 8, −17, −10, 97, 148, 52, −25, −5, 8, −1}, {−1, 0, 9, −14, −15, 90, 153, 57, −24, −5, 8, −2}, {−1, 0, 9, −12, −18, 81, 155, 65, −22, −8, 9, −2}, {−3, −14, 10, 77, 116, 77, 10, −14, −3, 0}, {−4, −15, 8, 73, 116, 82, 14, −15, −5, 2}, {−3, −15, 5, 69, 115, 86, 18, −15, −6, 2}, {−2, −15, 2, 65, 114, 89, 22, −14, −7, 2}, {−1, −14, −1, 60, 113, 93, 26, −14, −8, 2}, {−1, −14, −3, 56, 112, 96, 30, −13, −9, 2}, {0, −13, −5, 51, 110, 100, 34, −12, −10, 1}, {0, −13, −7, 47, 108, 103, 38, −10, −11, 1}, {1, −12, −9, 43, 105, 105, 43, −9, −12, 1}, {1, −11, −10, 38, 103, 108, 47, −7, −13, 0}, {1, −10, −12, 34, 100, 110, 51, −5, −13, 0}, {2, −9, −13, 30, 96, 112, 56, −3, −14, −1}, {2, −8, −14, 26, 93, 113, 60, −1, −14, −1}, {2, −7, −14, 22, 89, 114, 65, 2, −15, −2}, {2, −6, −15, 18, 86, 115, 69, 5, −15, −3}, {2, −5, −15, 14, 82, 116, 73, 8, −15, −4}, {6, −10, −19, 74, 154, 74, −19, −10, 6, 0}, {8, −8, −22, 66, 153, 82, −18, −13, 8, 0}, {7, −6, −24, 58, 152, 90, −14, −15, 8, 0}, {7, −5, −25, 51, 150, 97, −11, −17, 8, 1}, {6, −2, −26, 43, 147, 105, −7, −19, 7, 2}, {6, −1, −26, 35, 144, 112, −2, −21, 7, 2}, {5, 1, −26, 28, 140, 118, 3, −22, 6, 3}, {5, 2, −26, 22, 135, 125, 9, −24, 5, 3}, {4, 4, −25, 15, 130, 130, 15, −25, 4, 4}, {3, 5, −24, 9, 125, 135, 22, −26, 2, 5}, {3, 6, −22, 3, 118, 140, 28, −26, 1, 5}, {2, 7, −21, −2, 112, 144, 35, −26, −1, 6}, {2, 7, −19, −7, 105, 147, 43, −26, −2, 6}, {1, 8, −17, −11, 97, 150, 51, −25, −5, 7}, {0, 8, −15, −14, 90, 152, 58, −24, −6, 7}, {0, 8, −13, −18, 82, 153, 66, −22, −8, 8}, {0, 0, 0, 0, 256, 0, 0, 0, 0, 0}, {2, −3, 6, −14, 254, 16, −7, 4, −2, 0}, {3, −6, 12, −26, 249, 34, −14, 7, −4, 1}, {4, −9, 17, −36, 241, 54, −22, 11, −6, 2}, {5, −11, 20, −43, 230, 75, −29, 15, −8, 2}, {5, −12, 23, −48, 216, 96, −36, 18, −9, 3}, {5, −13, 25, −51, 200, 118, −42, 21, −11, 4}, {5, −13, 25, −51, 181, 140, −46, 23, −12, 4}, {5, −13, 25, −50, 161, 161, −50, 25, −13, 5}, {4, −12, 23, −46, 140, 181, −51, 25, −13, 5}, {4, −11, 21, −42, 118, 200, −51, 25, −13, 5}, {3, −9, 18, −36, 96, 216, −48, 23, −12, 5}, {2, −8, 15, −29, 75, 230, −43, 20, −11, 5}, {2, −6, 11, −22, 54, 241, −36, 17, −9, 4}, {1, −4, 7, −14, 34, 249, −26, 12, −6, 3}, {0, −2, 4, −7, 16, 254, −14, 6, −3, 2}, {−2, −14, 10, 76, 116, 76, 10, −14, −2, 0}, {−2, −14, 7, 73, 115, 81, 13, −14, −3, 0}, {−2, −13, 4, 68, 115, 85, 17, −14, −4, 0}, {−1, −13, 1, 64, 114, 89, 20, −14, −4, 0}, {−1, −13, −1, 59, 114, 93, 24, −13, −6, 0}, {0, −12, −3, 54, 111, 96, 28, −12, −6, 0}, {0, −10, −7, 51, 109, 99, 32, −11, −8, 1}, {1, −12, −6, 45, 107, 103, 36, −10, −8, 0}, {1, −9, −9, 41, 104, 104, 41, −9, −9, 1}, {0, −8, −10, 36, 103, 107, 45, −6, −12, 1}, {1, −8, −11, 32, 99, 109, 51, −7, −10, 0}, {0, −6, −12, 28, 96, 111, 54, −3, −12, 0}, {0, −6, −13, 24, 93, 114, 59, −1, −13, −1}, {0, −4, −14, 20, 89, 114, 64, 1, −13, −1}, {0, −4, −14, 17, 85, 115, 68, 4, −13, −2}, {0, −3, −14, 13, 81, 115, 73, 7, −14, −2}, {0, 0, 0, 0, 256, 0, 0, 0, 0, 0}, {3, −6, 9, −16, 253, 19, −11, 6, −2, 1}, {3, −7, 13, −27, 248, 36, −16, 8, −4, 2}, {3, −7, 16, −36, 240, 53, −21, 10, −4, 2}, {3, −8, 19, −44, 231, 72, −26, 12, −5, 2}, {5, −11, 22, −49, 217, 94, −34, 16, −8, 4}, {5, −12, 24, −52, 202, 114, −38, 19, −11, 5}, {6, −14, 26, −52, 182, 136, −43, 22, −13, 6}, {6, −13, 24, −50, 161, 161, −50, 24, −13, 6}, {6, −13, 22, −43, 136, 182, −52, 26, −14, 6}, {5, −11, 19, −38, 114, 202, −52, 24, −12, 5}, {4, −8, 16, −34, 94, 217, −49, 22, −11, 5}, {2, −5, 12, −26, 72, 231, −44, 19, −8, 3}, {2, −4, 10, −21, 53, 240, −36, 16, −7, 3}, {2, −4, 8, −16, 36, 248, −27, 13, −7, 3}, or {1, −2, 6, −11, 19, 253, −16, 9, −6, 3}.

A2. The method of embodiment of A1, wherein the samples having the first group of values are located at non-fractional sample positions, and the samples having the second group of values are located at fractional sample positions.

A3. The method of embodiment A1 or A2, wherein the samples having the first group of values includes a first sample located at a non-fractional sample position, the samples having the second group of values includes a second sample located at a fractional sample position, the fractional sample position is determined based at least on the non-fractional sample position and a fraction value, and the fraction value is associated with one set of 6, 8, 10, or 12 coefficient values selected from the groups of coefficient values ±2.

A4. The method of embodiment A3, wherein the fractional sample position=the non-fractional sample position+(the fraction value×a distance between samples).

A5. The method of embodiment A3 or A4, wherein the fraction value is any of 0/16, 1/16, 2/16, 3/16, . . . , 15/16, 0/32, 1/32, 2/32, 3/32, . . . , and 31/32.

A6. The method of any one of embodiments A1-A5, the method comprising performing one or more of a motion compensated prediction, an inter prediction, and an intra prediction using the first group of values of samples included in the first block, wherein performing one or more of the motion compensated prediction, the inter prediction, and the intra prediction comprises interpolating the first group of values using the filter.

A7. The method of any one of embodiments A1-A6, the method comprising down-sampling or up-sampling the first picture using the first group of values of samples included in the first block, wherein the down-sampling or the up-sampling comprises interpolating the first group of values using the filter.

A7a. The method of embodiment A6 or A7, wherein the motion compensated prediction is a motion compensated down-sampling.

A8. The method of any one of embodiments A1-A7a, wherein a length of the filter is 6-taps, the set of 6, 8, 10, or 12 coefficient values is a set of 6 coefficient values, the set of 6 coefficient values is selected from first groups of coefficient values ±2, and the first groups of coefficient values comprise:

{1, −6, 256, 6, −1, 0}, {2, −11, 254, 14, −4, 1}, {4, −18, 252, 23, −6, 1}, {6, −24, 249, 32, −9, 2}, {6, −26, 244, 41, −12, 3}, {7, −30, 239, 53, −18, 5}, {8, −34, 235, 61, −19, 5}, {10, −38, 228, 72, −22, 6}, {10, −39, 220, 84, −26, 7}, {10, −40, 213, 94, −29, 8}, {11, −42, 205, 105, −32, 9}, {11, −42, 196, 116, −35, 10}, {11, −42, 186, 128, −37, 10}{11, −41, 167, 148, −40, 11}, {11, −41, 158, 158, −41, 11}, {11, −40, 148, 167, −41, 11}, {10, −37, 128, 186, −42, 11}, {10, −35, 116, 196, −42, 11}, {9, −32, 105, 205, −42, 11}, {8, −29, 94, 213, −40, 10}, {7, −26, 84, 220, −39, 10}, {6, −22, 72, 228, −38, 10}, {5, −19, 61, 235, −34, 8}, {5, −18, 53, 239, −30, 7}, {3, −12, 41, 244, −26, 6}, {2, −9, 32, 249, −24, 6}, {1, −6, 23, 252, −18, 4}, {1, −4, 14, 254, −11, 2}, {0, −1, 6, 256, −6, 1}, wherein each of the first groups of coefficient values is associated with a particular fraction value, and the second group of values of the second block is generated based on the first group of values of the first block and a particular fraction value associated with any one of the first groups coefficient values.

A9. The method of any one of embodiments A1-A7a, wherein a length of the filter is 6-taps, the set of 6, 8, 10, or 12 coefficient values is a set of 6 coefficient values, the set of 6 coefficient values is selected from first groups of coefficient values ±2, and the first groups of coefficient values comprise:

{28, 46, 103, 49, 29, 1}, {26, 47, 100, 53, 28, 2}, {25, 46, 99, 55, 28, 3}, {26, 39, 105, 53, 29, 4}, {25, 39, 102, 56, 29, 5}, {23, 40, 99, 60, 28, 6}, {22, 40, 96, 63, 28, 7}, {20, 41, 93, 66, 29, 7}, {19, 40, 92, 68, 29, 8}, {18, 39, 91, 70, 29, 9}, {16, 40, 88, 73, 30, 9}, {16, 38, 87, 74, 31, 10}, {16, 36, 86, 75, 32, 11}, {14, 38, 82, 77, 34, 11}, {12, 38, 81, 79, 35, 11}, {12, 36, 80, 80, 36, 12}, {11, 35, 79, 81, 38, 12}, {11, 34, 77, 82, 38, 14}, {11, 32, 75, 86, 36, 16}, {10, 31, 74, 87, 38, 16}, {9, 30, 73, 88, 40, 16}, {9, 29, 70, 91, 39, 18}, {8, 29, 68, 92, 40, 19}, {7, 29, 66, 93, 41, 20}, {7, 28, 63, 96, 40, 22}, {6, 28, 60, 99, 40, 23}, {5, 29, 56, 102, 39, 25}, {4, 29, 53, 105, 39, 26}, {3, 28, 55, 99, 46, 25}, {2, 28, 53, 100, 47, 26}, {1, 29, 49, 103, 46, 28}, wherein each of the first groups of coefficient values is associated with a particular fraction value, and the second group of values of the second block is generated based on the first group of values of the first block and a particular fraction value associated with any one of the first groups coefficient values.

A10. The method of any one of embodiments A1-A7a, wherein a length of the filter is 6-taps, the set of 6, 8, 10, or 12 coefficient values is a set of 6 coefficient values, the set of 6 coefficient values is selected from first groups of coefficient values ±2, and the first groups of coefficient values comprise:

{0, 44, 160, 53, −2, 1}, {−2, 42, 160, 59, −4, 1}, {−2, 38, 159, 65, −5, 1}, {−1, 33, 159, 68, −4, 1}, {−2, 33, 154, 74, −4, 1}, {−1, 27, 155, 78, −4, 1}, {−2, 25, 153, 84, −5, 1}, {−2, 22, 151, 89, −5, 1}, {−1, 17, 151, 93, −6, 2}, {−2, 16, 147, 99, −5, 1}, {−1, 14, 142, 103, −3, 1}, {−1, 12, 139, 107, −2, 1}, {−1, 10, 135, 112, 0, 0}, {−1, 8, 132, 116, 1, 0}, {0, 3, 131, 122, −1, 1}, {0, 4, 124, 124, 4, 0}, {1, −1, 122, 131, 3, 0}, {0, 1, 116, 132, 8, −1}, {0, 0, 112, 135, 10, −1}, {1, −2, 107, 139, 12, −1}, {1, −3, 103, 142, 14, −1}, {1, −5, 99, 147, 16, −2}, {2, −6, 93, 151, 17, −1}, {1, −5, 89, 151, 22, −2}, {1, −5, 84, 153, 25, −2}, {1, −4, 78, 155, 27, −1}, {1, −4, 74, 154, 33, −2}, {1, −4, 68, 159, 33, −1}, {1, −5, 65, 159, 38, −2}, {1, −4, 59, 160, 42, −2}, {1, −2, 53, 160, 44, 0}, wherein each of the first groups of coefficient values is associated with a particular fraction value, and the second group of values of the second block is generated based on the first group of values of the first block and a particular fraction value associated with any one of the first groups coefficient values.

A11. The method of any one of embodiments A1-A7a, wherein a length of the filter is 6-taps, the set of 6, 8, 10, or 12 coefficient values is a set of 6 coefficient values, the set of 6 coefficient values is selected from first groups of coefficient values ±2, and the first groups of coefficient values comprise:

{−14, 64, 156, 64, −14, 0}, {−13, 59, 155, 68, −12, −1}, {−13, 56, 154, 71, −11, −1}, {−13, 52, 153, 76, −10, −2}, {−12, 47, 153, 79, −9, −2}, {−13, 45, 151, 84, −8, −3}, {−13, 39, 154, 88, −9, −3}, {−14, 34, 156, 94, −10, −4}, {−15, 33, 152, 99, −7, −6}, {−15, 30, 150, 103, −5, −7}, {−14, 26, 148, 107, −4, −7}, {−12, 23, 143, 110, −1, −7}, {−13, 18, 145, 116, −2, −8}, {−10, 15, 139, 118, 1, −7}, {−15, 19, 134, 122, 9, −13}, {−14, 18, 129, 123, 13, −13}, {−14, 18, 124, 124, 18, −14}, {−13, 13, 123, 129, 18, −14}, {−13, 9, 122, 134, 19, −15}, {−7, 1, 118, 139, 15, −10}, {−8, −2, 116, 145, 18, −13}, {−7, −1, 110, 143, 23, −12}, {−7, −4, 107, 148, 26, −14}, {−7, −5, 103, 150, 30, −15}, {−6, −7, 99, 152, 33, −15}, {−4, −10, 94, 156, 34, −14}, {−3, −9, 88, 154, 39, −13}, {−3, −8, 84, 151, 45, −13}, {−2, −9, 79, 153, 47, −12}, {−2, −10, 76, 153, 52, −13}, {−1, −11, 71, 154, 56, −13}, {−1, −12, 68, 155, 59, −13}, wherein each of the first groups of coefficient values is associated with a particular fraction value, and the second group of values of the second block is generated based on the first group of values of the first block and a particular fraction value associated with any one of the first groups coefficient values.

A12. The method of any one of embodiments A1-A7a, wherein a length of the filter is 6-taps, the set of 6, 8, 10, or 12 coefficient values is a set of 6 coefficient values, the set of 6 coefficient values is selected from first groups of coefficient values ±2, and the first groups of coefficient values comprise:

{−5, 64, 138, 64, −5, 0}, {−8, 66, 132, 73, −6, −1}, {−9, 62, 134, 76, −5, −2}, {−10, 59, 134, 80, −4, −3}, {−10, 57, 132, 82, −2, −3}, {−10, 53, 132, 85, 0, −4}, {−11, 50, 132, 89, 1, −5}, {−12, 47, 132, 93, 2, −6}, {−13, 45, 131, 96, 4, −7}, {−12, 40, 131, 99, 5, −7}, {−12, 39, 127, 101, 9, −8}, {−13, 36, 127, 105, 10, −9}, {−12, 33, 124, 107, 14, −10}, {−13, 30, 124, 111, 15, −11}, {−13, 29, 121, 112, 18, −11}, {−12, 25, 119, 115, 21, −12}, {−13, 24, 117, 117, 24, −13}, {−12, 21, 115, 119, 25, −12}, {−11, 18, 112, 121, 29, −13}, {−11, 15, 111, 124, 30, −13}, {−10, 14, 107, 124, 33, −12}, {−9, 10, 105, 127, 36, −13}, {−8, 9, 101, 127, 39, −12}, {−7, 5, 99, 131, 40, −12}, {−7, 4, 96, 131, 45, −13}, {−6, 2, 93, 132, 47, −12}, {−5, 1, 89, 132, 50, −11}, {−4, 0, 85, 132, 53, −10}, {−3, −2, 82, 132, 57, −10}, {−3, −4, 80, 134, 59, −10}, {−2, −5, 76, 134, 62, −9}, {−1, −6, 73, 132, 66, −8}, wherein each of the first groups of coefficient values is associated with a particular fraction value, and the second group of values of the second block is generated based on the first group of values of the first block and a particular fraction value associated with any one of the first groups coefficient values.

A13. The method of any one of embodiments A1-A7a, wherein a length of the filter is 8-taps, the set of 6, 8, 10, or 12 coefficient values is a set of 8 coefficient values, the set of 8 coefficient values is selected from first groups of coefficient values ±2, and the first groups of coefficient values comprise:

{−1, 3, −7, 254, 11, −6, 3, −1}, {−1, 4, −12, 253, 16, −6, 3, −1}, {−2, 7, −18, 249, 28, −12, 6, −2}, {−2, 8, −23, 248, 33, −11, 4, −1}, {−3, 11, −28, 242, 47, −19, 8, −2}, {−3, 12, −33, 241, 51, −16, 5, −1}, {−4, 15, −38, 236, 62, −21, 8, −2}, {−5, 18, −43, 231, 72, −23, 8, −2}, {−6, 19, −44, 223, 84, −28, 12, −4}, {−4, 15, −40, 210, 99, −35, 15, −4}, {−3, 12, −36, 195, 117, −42, 18, −5}, {−4, 15, −40, 190, 124, −42, 18, −5}, {−4, 15, −41, 183, 133, −42, 16, −4}, {−4, 15, −42, 176, 142, −44, 18, −5}, {−5, 17, −42, 165, 153, −45, 18, −5}, {−5, 18, −45, 153, 165, −42, 17, −5}, {−5, 18, −44, 142, 176, −42, 15, −4}, {−4, 16, −42, 133, 183, −41, 15, −4}, {−5, 18, −42, 124, 190, −40, 15, −4}, {−5, 18, −42, 117, 195, −36, 12, −3}, {−4, 15, −35, 99, 210, −40, 15, −4}, {−4, 12, −28, 84, 223, −44, 19, −6}, {−2, 8, −23, 72, 231, −43, 18, −5}, {−2, 8, −21, 62, 236, −38, 15, −4}, {−1, 5, −16, 51, 241, −33, 12, −3}, {−2, 8, −19, 47, 242, −28, 11, −3}, {−1, 4, −11, 33, 248, −23, 8, −2}, {−2, 6, −12, 28, 249, −18, 7, −2}, {−1, 3, −6, 16, 253, −12, 4, −1}, {−1, 3, −6, 11, 254, −7, 3, −1}, wherein each of the first groups of coefficient values is associated with a particular fraction value, and the second group of values of the second block is generated based on the first group of values of the first block and a particular fraction value associated with any one of the first groups coefficient values.

A14. The method of any one of embodiments A1-A7a, wherein a length of the filter is 8-taps, the set of 6, 8, 10, or 12 coefficient values is a set of 8 coefficient values, the set of 8 coefficient values is selected from first groups of coefficient values ±2, and the first groups of coefficient values comprise:

{0, 29, 44, 105, 47, 30, 1, 0}, {1, 25, 49, 96, 55, 27, 3, 0}, {1, 24, 47, 96, 57, 27, 5, −1}, {0, 24, 45, 97, 58, 28, 5, −1}, {−1, 25, 42, 98, 58, 30, 5, −1}, {−1, 24, 41, 97, 60, 30, 6, −1}, {−2, 25, 38, 97, 62, 30, 8, −2}, {−2, 24, 37, 96, 64, 30, 9, −2}, {−2, 23, 36, 95, 66, 30, 10, −2}, {−2, 21, 37, 92, 69, 31, 10, −2}, {−2, 20, 36, 91, 71, 31, 11, −2}, {0, 16, 39, 85, 74, 32, 11, −1}, {−1, 17, 36, 86, 75, 32, 12, −1}, {0, 13, 39, 82, 77, 35, 10, 0}, {0, 12, 38, 81, 79, 35, 11, 0}, {0, 12, 36, 80, 80, 36, 12, 0}, {0, 11, 35, 79, 81, 38, 12, 0}, {0, 10, 35, 77, 82, 39, 13, 0}, {−1, 12, 32, 75, 86, 36, 17, −1}, {−1, 11, 32, 74, 85, 39, 16, 0}, {−2, 11, 31, 71, 91, 36, 20, −2}, {−2, 10, 31, 69, 92, 37, 21, −2}, {−2, 10, 30, 66, 95, 36, 23, −2}, {−2, 9, 30, 64, 96, 37, 24, −2}, {−2, 8, 30, 62, 97, 38, 25, −2}, {−1, 6, 30, 60, 97, 41, 24, −1}, {−1, 5, 30, 58, 98, 42, 25, −1}, {−1, 5, 28, 58, 97, 45, 24, 0}, {−1, 5, 27, 57, 96, 47, 24, 1}, {0, 3, 27, 55, 96, 49, 25, 1}, {0, 1, 30, 47, 105, 44, 29, 0}, wherein each of the first groups of coefficient values is associated with a particular fraction value, and the second group of values of the second block is generated based on the first group of values of the first block and a particular fraction value associated with any one of the first groups coefficient values.

A15. The method of any one of embodiments A1-A7a, wherein a length of the filter is 8-taps, the set of 6, 8, 10, or 12 coefficient values is a set of 8 coefficient values, the set of 8 coefficient values is selected from first groups of coefficient values ±2, and the first groups of coefficient values comprise:

{13, −38, 56, 194, 56, −38, 13, 0,}, {13, −38, 52, 193, 62, −38, 11, 1,}, {13, −36, 44, 193, 69, −37, 8, 2,}, {12, −34, 39, 192, 74, −36, 7, 2,}, {13, −33, 32, 192, 79, −36, 6, 3,}, {12, −30, 26, 190, 86, −36, 4, 4,}, {12, −29, 21, 188, 92, −35, 3, 4,}, {14, −28, 15, 185, 97, −35, 2, 6,}, {13, −26, 11, 182, 103, −34, 1, 6,}, {13, −23, 4, 180, 109, −34, 0, 7,}, {13, −23, 2, 175, 115, −31, −2, 7,}, {12, −20, −3, 172, 121, −30, −4, 8,}, {11, −18, −7, 168, 128, −28, −6, 8,}, {11, −16, −11, 164, 133, −27, −7, 9,}, {11, −15, −14, 159, 139, −25, −8, 9,}, {10, −13, −17, 155, 144, −23, −9, 9,}, {9, −11, −20, 150, 150, −20, −11, 9,}, {9, −9, −23, 144, 155, −17, −13, 10,}, {9, −8, −25, 139, 159, −14, −15, 11,}, {9, −7, −27, 133, 164, −11, −16, 11,}, {8, −6, −28, 128, 168, −7, −18, 11,}, {8, −4, −30, 121, 172, −3, −20, 12,}, {7, −2, −31, 115, 175, 2, −23, 13,}, {7, 0, −34, 109, 180, 4, −23, 13,}, {6, 1, −34, 103, 182, 11, −26, 13,}, {6, 2, −35, 97, 185, 15, −28, 14,}, {4, 3, −35, 92, 188, 21, −29, 12,}, {4, 4, −36, 86, 190, 26, −30, 12,}, {3, 6, −36, 79, 192, 32, −33, 13,}, {2, 7, −36, 74, 192, 39, −34, 12,}, {2, 8, −37, 69, 193, 44, −36, 13,}, {1, 11, −38, 62, 193, 52, −38, 13,}, wherein each of the first groups of coefficient values is associated with a particular fraction value, and the second group of values of the second block is generated based on the first group of values of the first block and a particular fraction value associated with any one of the first groups coefficient values.

A16. The method of any one of embodiments A1-A7a, wherein a length of the filter is 8-taps, the set of 6, 8, 10, or 12 coefficient values is a set of 8 coefficient values, the set of 8 coefficient values is selected from first groups of coefficient values ±2, and the first groups of coefficient values comprise:

{−21, 7, 74, 136, 74, 7, −21, 0,}, {−20, 5, 69, 140, 75, 8, −20, −1,}, {−19, 3, 66, 140, 78, 9, −19, −2,}, {−17, 1, 62, 141, 80, 8, −17, −2,}, {−16, 1, 59, 138, 82, 10, −15, −3,}, {−16, −1, 57, 138, 86, 11, −15, −4,}, {−11, −6, 57, 131, 91, 10, −13, −3,}, {−9, −8, 53, 131, 94, 10, −12, −3,}, {−8, −9, 49, 131, 97, 11, −12, −3,}, {−13, −8, 50, 130, 100, 18, −15, −6,}, {−10, −9, 46, 128, 102, 17, −14, −4,}, {−11, −10, 44, 127, 106, 21, −15, −6,}, {−9, −12, 41, 126, 109, 21, −15, −5,}, {−10, −12, 40, 123, 111, 26, −15, −7,}, {−9, −13, 38, 120, 113, 29, −14, −8,}, {−8, −14, 35, 120, 115, 29, −14, −7,}, {−7, −13, 32, 116, 116, 32, −13, −7,}, {−7, −14, 29, 115, 120, 35, −14, −8,}, {−8, −14, 29, 113, 120, 38, −13, −9,}, {−7, −15, 26, 111, 123, 40, −12, −10,}, {−5, −15, 21, 109, 126, 41, −12, −9,}, {−6, −15, 21, 106, 127, 44, −10, −11,}, {−4, −14, 17, 102, 128, 46, −9, −10,}, {−6, −15, 18, 100, 130, 50, −8, −13,}, {−3, −12, 11, 97, 131, 49, −9, −8,}, {−3, −12, 10, 94, 131, 53, −8, −9,}, {−3, −13, 10, 91, 131, 57, −6, −11,}, {−4, −15, 11, 86, 138, 57, −1, −16,}, {−3, −15, 10, 82, 138, 59, 1, −16,}, {−2, −17, 8, 80, 141, 62, 1, −17,}, {−2, −19, 9, 78, 140, 66, 3, −19,}, {−1, −20, 8, 75, 140, 69, 5, −20,}, wherein each of the first groups of coefficient values is associated with a particular fraction value, and the second group of values of the second block is generated based on the first group of values of the first block and a particular fraction value associated with any one of the first groups coefficient values.

A17. The method of any one of embodiments A1-A7a, wherein a length of the filter is 8-taps, the set of 6, 8, 10, or 12 coefficient values is a set of 8 coefficient values, the set of 8 coefficient values is selected from first groups of coefficient values ±2, and the first groups of coefficient values comprise:

{−4, −20, 64, 167, 73, −19, −5, 0}, {−1, −20, 58, 164, 77, −19, −4, 1}, {−1, −20, 53, 165, 81, −18, −5, 1}, {0, −19, 49, 161, 84, −15, −5, 1}, {0, −19, 45, 160, 89, −14, −6, 1}, {1, −20, 42, 157, 95, −13, −8, 2}, {1, −19, 37, 157, 98, −12, −8, 2}, {1, −18, 33, 154, 103, −10, −9, 2}, {1, −18, 31, 151, 107, −8, −11, 3}, {1, −19, 26, 152, 113, −7, −12, 2}, {1, −19, 23, 151, 116, −6, −12, 2}, {3, −17, 18, 145, 120, −4, −13, 4}, {3, −17, 16, 142, 123, −1, −14, 4}, {4, −17, 11, 141, 127, 0, −14, 4}, {4, −17, 9, 137, 131, 4, −16, 4}, {4, −16, 4, 131, 137, 9, −17, 4}, {4, −14, 0, 127, 141, 11, −17, 4}, {4, −14, −1, 123, 142, 16, −17, 3}, {4, −13, −4, 120, 145, 18, −17, 3}, {2, −12, −6, 116, 151, 23, −19, 1}, {2, −12, −7, 113, 152, 26, −19, 1}, {3, −11, −8, 107, 151, 31, −18, 1}, {2, −9, −10, 103, 154, 33, −18, 1}, {2, −8, −12, 98, 157, 37, −19, 1}, {2, −8, −13, 95, 157, 42, −20, 1}, {1, −6, −14, 89, 160, 45, −19, 0}, {1, −5, −15, 84, 161, 49, −19, 0}, {1, −5, −18, 81, 165, 53, −20, −1}, {1, −4, −19, 77, 164, 58, −20, −1}, {0, −5, −19, 73, 167, 64, −20, −4}, wherein each of the first groups of coefficient values is associated with a particular fraction value, and the second group of values of the second block is generated based on the first group of values of the first block and a particular fraction value associated with any one of the first groups coefficient values.

A18. The method of any one of embodiments A1-A7a, wherein a length of the filter is 8-taps, the set of 6, 8, 10, or 12 coefficient values is a set of 8 coefficient values, the set of 8 coefficient values is selected from first groups of coefficient values ±2, and the first groups of coefficient values comprise:

{−15, 9, 75, 118, 75, 9, −15, 0}, {−14, 7, 70, 123, 75, 9, −13, −1}, {−18, 7, 69, 125, 79, 14, −18, −2}, {−17, 5, 66, 126, 81, 14, −16, −3}, {−16, 3, 63, 127, 83, 15, −16, −3}, {−17, 3, 60, 128, 85, 17, −16, −4}, {−16, 3, 56, 127, 86, 19, −14, −5}, {−15, 0, 56, 124, 90, 21, −15, −5}, {−16, 1, 53, 124, 90, 25, −15, −6}, {−15, 0, 51, 121, 93, 26, −13, −7}, {−16, −2, 52, 118, 97, 29, −13, −9}, {−15, −4, 51, 116, 99, 31, −13, −9}, {−15, −4, 47, 116, 102, 31, −10, −11}, {−15, −4, 45, 114, 103, 34, −9, −12}, {−14, −5, 43, 112, 104, 37, −9, −12}, {−13, −7, 42, 110, 106, 39, −9, −12}, {−13, −9, 41, 109, 109, 41, −9, −13}, {−12, −9, 39, 106, 110, 42, −7, −13}, {−12, −9, 37, 104, 112, 43, −5, −14}, {−12, −9, 34, 103, 114, 45, −4, −15}, {−11, −10, 31, 102, 116, 47, −4, −15}, {−9, −13, 31, 99, 116, 51, −4, −15}, {−9, −13, 29, 97, 118, 52, −2, −16}, {−7, −13, 26, 93, 121, 51, 0, −15}, {−6, −15, 25, 90, 124, 53, 1, −16}, {−5, −15, 21, 90, 124, 56, 0, −15}, {−5, −14, 19, 86, 127, 56, 3, −16}, {−4, −16, 17, 85, 128, 60, 3, −17}, {−3, −16, 15, 83, 127, 63, 3, −16}, {−3, −16, 14, 81, 126, 66, 5, −17}, {−2, −18, 14, 79, 125, 69, 7, −18}, {−1, −13, 9, 75, 123, 70, 7, −14}, wherein each of the first groups of coefficient values is associated with a particular fraction value, and the second group of values of the second block is generated based on the first group of values of the first block and a particular fraction value associated with any one of the first groups coefficient values.

A19. The method of any one of embodiments A1-A7a, wherein a length of the filter is 12-taps, the set of 6, 8, 10, or 12 coefficient values is a set of 12 coefficient values, the set of 12 coefficient values is selected from first groups of coefficient values ±2, and the first groups of coefficient values comprise:

{0, 1, −2, 3, −7, 255, 8, −3, 2, −1, 0, 0}, {−1, 3, −4, 6, −14, 254, 17, −8, 5, −3, 1, 0}, {−1, 3, −5, 9, −21, 253, 25, −10, 5, −3, 1, 0}, {−1, 4, −8, 13, −26, 249, 34, −14, 8, −4, 1, 0}, {−2, 6, −10, 16, −32, 246, 44, −18, 9, −4, 1, 0}, {−1, 4, −9, 18, −39, 235, 65, −26, 13, −6, 3, −1}, {−2, 6, −12, 22, −44, 230, 75, −28, 14, −7, 3, −1}, {−2, 6, −12, 23, −47, 224, 85, −31, 15, −7, 3, −1}, {−2, 7, −13, 23, −48, 216, 97, −36, 18, −9, 4, −1}, {−2, 6, −12, 23, −49, 209, 106, −37, 19, −10, 4, −1}, {−3, 8, −14, 26, −52, 200, 119, −42, 22, −12, 6, −2}, {−2, 6, −12, 24, −51, 191, 129, −43, 22, −12, 6, −2}, {−2, 7, −14, 25, −50, 180, 141, −46, 23, −12, 6, −2}, {−2, 6, −12, 24, −50, 171, 151, −47, 23, −12, 6, −2}, {−2, 6, −12, 23, −47, 151, 171, −50, 24, −12, 6, −2}, {−2, 6, −12, 23, −46, 141, 180, −50, 25, −14, 7, −2}, {−2, 6, −12, 22, −43, 129, 191, −51, 24, −12, 6, −2}, {−2, 6, −12, 22, −42, 119, 200, −52, 26, −14, 8, −3}, {−1, 4, −10, 19, −37, 106, 209, −49, 23, −12, 6, −2}, {−1, 4, −9, 18, −36, 97, 216, −48, 23, −13, 7, −2}, {−1, 3, −7, 15, −31, 85, 224, −47, 23, −12, 6, −2}, {−1, 3, −7, 14, −28, 75, 230, −44, 22, −12, 6, −2}, {−1, 3, −6, 13, −26, 65, 235, −39, 18, −9, 4, −1}, {0, 1, −4, 9, −18, 44, 246, −32, 16, −10, 6, −2}, {0, 1, −4, 8, −14, 34, 249, −26, 13, −8, 4, −1}, {0, 1, −3, 5, −10, 25, 253, −21, 9, −5, 3, −1}, {0, 1, −3, 5, −8, 17, 254, −14, 6, −4, 3, −1}, {0, 0, −1, 2, −3, 8, 255, −7, 3, −2, 1, 0}, wherein each of the first groups of coefficient values is associated with a particular fraction value, and the second group of values of the second block is generated based on the first group of values of the first block and a particular fraction value associated with any one of the first groups coefficient values.

A20. The method of any one of embodiments A1-A7a, the method comprising down-sampling a width and/or a height of the first picture at a factor of 1.5 using the first group of values of samples included in the first block, wherein the down-sampling comprises interpolating the first group of values using the filter, a length of the filter is 12-taps, the set of 6, 8, 10, or 12 coefficient values is a set of 12 coefficient values, the set of 12 coefficient values is selected from first groups of coefficient values ±2, and the first groups of coefficient values comprise:

{0, 10, −12, −19, 70, 158, 70, −19, −12, 10, 0, 0}, {0, 10, −9, −22, 62, 156, 79, −17, −13, 9, 1, 0}, {−1, 10, −8, −22, 54, 155, 87, −13, −16, 9, 2, −1}, {−2, 10, −5, −23, 46, 152, 95, −9, −18, 9, 2, −1}, {−2, 9, −4, −23, 39, 150, 103, −6, −20, 8, 4, −2}, {−2, 8, −1, −24, 33, 144, 111, −2, −20, 6, 5, −2}, {−3, 9, −1, −24, 26, 142, 117, 4, −22, 5, 5, −2}, {−3, 8, 0, −23, 20, 137, 123, 10, −23, 4, 5, −2}, {−2, 6, 3, −25, 16, 130, 130, 16, −25, 3, 6, −2}, {−2, 5, 4, −23, 10, 123, 137, 20, −23, 0, 8, −3}, {−2, 5, 5, −22, 4, 117, 142, 26, −24, −1, 9, −3}, {−2, 5, 6, −20, −2, 111, 144, 33, −24, −1, 8, −2}, {−2, 4, 8, −20, −6, 103, 150, 39, −23, −4, /9, −2}, {−1, 2, 9, −18, −9, 95, 152, 46, −23, −5, 10, −2}, {−1, 2, 9, −16, −13, 87, 155, 54, −22, −8, 10, −1}, {0, 1, 9, −13, −17, 79, 156, 62, −22, −9, 10, 0}, wherein each of the first groups of coefficient values is associated with a particular fraction value, and the second group of values of the second block is generated based on the first group of values of the first block and a particular fraction value associated with any one of the first groups coefficient values.

A21. The method of any one of embodiments A1-A7a, the method comprising down-sampling a width and/or a height of the first picture at a factor of 2 using the first group of values of samples included in the first block, wherein the down-sampling comprises interpolating the first group of values using the filter, a length of the filter is 12-taps, the set of 6, 8, 10, or 12 coefficient values is a set of 12 coefficient values, the set of 12 coefficient values is selected from first groups of coefficient values ±2, and the first groups of coefficient values comprise:

{4, −7, −17, 13, 73, 124, 73, 13, −17, −7, 4, 0}, {3, −7, −17, 9, 72, 122, 81, 15, −16, −9, 3, 0}, {3, −5, −16, 6, 66, 120, 85, 18, −15, −10, 3, 1}, {3, −6, −17, 3, 64, 120, 90, 23, −15, −11, 1, 1}, {2, −3, −15, 0, 58, 117, 93, 25, −13, −10, 1, 1}, {4, −4, −16, −2, 54, 116, 96, 31, −14, −12, 0, 3}, {4, −3, −14, −6, 49, 114, 101, 32, −12, −12, 0, 3}, {4, −3, −13, −7, 45, 110, 103, 38, −11, −12, −2, 4}, {2, 0, −14, −9, 42, 107, 107, 42, −9, −14, 0, 2}, {4, −2, −12, −11, 38, 103, 110, 45, −7, −13, −3, 4}, {3, 0, −12, −12, 32, 101, 114, 49, −6, −14, −3, 4}, {3, 0, −12, −14, 31, 96, 116, 54, −2, −16, −4, 4}, {1, 1, −10, −13, 25, 93, 117, 58, 0, −15, −3, 2}, {1, 1, −11, −15, 23, 90, 120, 64, 3, −17, −6, 3}, {1, 3, −10, −15, 18, 85, 120, 66, 6, −16, −5, 3}, {0, 3, −9, −16, 15, 81, 122, 72, 9, −17, −7, 3}, wherein each of the first groups of coefficient values is associated with a particular fraction value, and the second group of values of the second block is generated based on the first group of values of the first block and a particular fraction value associated with any one of the first groups coefficient values.

A21$_{a1}$. The method of any one of embodiments A1-A7a, the method comprising down-sampling the first picture at a factor of 2 using the first group of values of samples included in the first block, wherein the down-sampling comprises interpolating the first group of values using the filter, a length of the filter is 12-taps, the set of 6, 8, 10, or 12 coefficient values is a set of 12 coefficient values, the set of 12 coefficient values is selected from first groups of coefficient values ±2, and the first groups of coefficient values comprise:

{5, −5, −17, 9, 78, 116, 78, 9, −17, −5, 5, 0}, {5, −4, −18, 7, 73, 116, 82, 14, −18, −6, 4, 1}, {5, −4, −17, 4, 69, 115, 86, 17, −17, −7, 4, 1}, {5, −3, −17, 1, 64, 115, 90, 21, −17, −8, 3, 2}, {4, −2, −15, −2, 59, 114, 93, 24, −15, −8, 2, 2}, {4, −1, −15, −5, 55, 113, 96, 29, −15, −10, 3, 2}, {4, 0, −15, −7, 51, 110, 100, 33, −14, −11, 2, 3}, {3, 1, −13, −9, 45, 108, 104, 36, −12, −11, 1, 3}, {3, 1, −13, −10, 42, 105, 105, 42, −10, −13, 1, 3}, {3, 1, −11, −12, 36, 104, 108, 45, −9, −13, 1, 3}, {3, 2, −11, −14, 33, 100, 110, 51, −7, −15, 0, 4}, {2, 3, −10, −15, 29, 96, 113, 55, −5, −15, −1, 4}, {2, 2, −8, −15, 24, 93, 114, 59, −2, −15, −2, 4}, {2, 3, −8, −17, 21, 90, 115, 64, 1, −17, −3, 5}, {1, 4, −7, −17, 17, 86, 115, 69, 4, −17, −4, 5}, {1, 4, −6, −18, 14, 82, 116, 73, 7, −18, −4, 5}.

A21$_{a2}$. The method of any one of embodiments A12, A21, and A21$_{a1}$, the method comprising:

determining whether to perform the down-sampling based on a ratio between the first picture and the second picture, wherein the ratio between the first picture and the second picture is one of a ratio between a resolution of the first picture and a resolution of the second picture, a ratio between a width of the first picture and a width of the second picture, or a ratio between a height of the first picture and a height of the second picture.

$A21_{a3}$. The method of embodiment $A21_{a2}$, wherein determining whether to perform the down-sampling based on the ratio comprises:

determining whether the ratio is substantially equal to a predefined value (e.g., 2) or is greater than or equal to a threshold value (e.g., 1.75); and determining to perform the down-sampling in case the ratio is substantially equal to the predefined value (e.g., 1.5) or greater than or equal to the threshold value.

$A21_{b1}$. The method of any one of embodiments A1-A7a, the method comprising down-sampling the first picture at a factor of 1.5 using the first group of values of samples included in the first block, wherein the down-sampling comprises interpolating the first group of values using the filter, a length of the filter is 12-taps, the set of 6, 8, 10, or 12 coefficient values is a set of 12 coefficient values, the set of 12 coefficient values is selected from first groups of coefficient values ±2, and the first groups of coefficient values comprise:

{−1, 9, −10, −21, 74, 154, 74, −21, −10, 9, −1, 0}, {−2, 9, −8, −22, 65, 155, 81, −18, −12, 9, 0, −1}, {−2, 8, −5, −24, 57, 153, 90, −15, −14, 9, 0, −1}, {−1, 8, −5, −25, 52, 148, 97, −10, −17, 8, 2, −1}, {−2, 8, −5, −23, 45, 144, 104, −3, −20, 6, 4, −2}, {−2, 6, 0, −25, 35, 144, 112, −2, −20, 7, 3, −2}, {−2, 6, 1, −25, 28, 140, 119, 3, −22, 6, 4, −2}, {−1, 3, 4, −23, 18, 137, 126, 6, −21, 6, 2, −1}, {−1, 2, 6, −22, 10, 133, 133, 10, −22, 6, 2, −1}, {−1, 2, 6, −21, 6, 126, 137, 18, −23, 4, 3, −1}, {−2, 4, 6, −22, 3, 119, 140, 28, −25, 1, 6, −2}, {−2, 3, 7, −20, −2, 112, 144, 35, −25, 0, 6, −2}, {−2, 4, 6, −20, −3, 104, 144, 45, −23, −5, 8, −2}, {−1, 2, 8, −17, −10, 97, 148, 52, −25, −5, 8, −1}, {−1, 0, 9, −14, −15, 90, 153, 57, −24, −5, 8, −2}, {−1, 0, 9, −12, −18, 81, 155, 65, −22, −8, 9, −2}.

$A21_{b2}$. The method of any one of embodiments A11, A20, and $A21_{b1}$ the method comprising:

determining whether to perform the down-sampling based on a ratio between the first picture and the second picture, wherein the ratio between the first picture and the second picture is one of a ratio between a resolution of the first picture and a resolution of the second picture, a ratio between a width of the first picture and a width of the second picture, or a ratio between a height of the first picture and a height of the second picture.

$A21_{b3}$. The method of embodiment $A21_{b2}$, wherein determining whether to perform the down-sampling based on the ratio comprises:

determining whether the ratio is substantially equal to a predefined value (e.g., 1.5) or is within a predefined range of values (e.g., between 1.25 and 1.75); and determining to perform the down-sampling in case the ratio is substantially equal to the predefined value (e.g., 1.5) or within the predefined range of values.

$A21_{c1}$. The method of any one of embodiments A1-A7a, the method comprising down-sampling the first picture at a factor of 2 using the first group of values of samples included in the first block, wherein the down-sampling comprises interpolating the first group of values using the filter, a length of the filter is 10-taps, the set of 6, 8, 10, or 12 coefficient values is a set of 10 coefficient values, the set of 10 coefficient values is selected from first groups of coefficient values ±2, and the first groups of coefficient values comprise:

{−3, −14, 10, 77, 116, 77, 10, −14, −3, 0}, {−4, −15, 8, 73, 116, 82, 14, −15, −5, 2}, {−3, −15, 5, 69, 115, 86, 18, −15, −6, 2}, {−2, −15, 2, 65, 114, 89, 22, −14, −7, 2}, {−1, −14, −1, 60, 113, 93, 26, −14, −8, 2}, {−1, −14, −3, 56, 112, 96, 30, −13, −9, 2}, {0, −13, −5, 51, 110, 100, 34, −12, −10, 1}, {0, −13, −7, 47, 108, 103, 38, −10, −11, 1}, {1, −12, −9, 43, 105, 105, 43, −9, −12, 1}, {1, −11, −10, 38, 103, 108, 47, −7, −13, 0}, {1, −10, −12, 34, 100, 110, 51, −5, −13, 0}, {2, −9, −13, 30, 96, 112, 56, −3, −14, −1}, {2, −8, −14, 26, 93, 113, 60, −1, −14, −1}, {2, −7, −14, 22, 89, 114, 65, 2, −15, −2}, {2, −6, −15, 18, 86, 115, 69, 5, −15, −3}, {2, −5, −15, 14, 82, 116, 73, 8, −15, −4}.

$A21_{c2}$. The method of embodiment $A21_{c1}$, the method comprising:

determining whether to perform the down-sampling based on a ratio between the first picture and the second picture, wherein the ratio between the first picture and the second picture is one of a ratio between a resolution of the first picture and a resolution of the second picture, a ratio between a width of the first picture and a width of the second picture, or a ratio between a height of the first picture and a height of the second picture.

$A21_{c3}$. The method of embodiment $A21_{c2}$, wherein determining whether to perform the down-sampling based on the ratio comprises:

determining whether the ratio is substantially equal to a predefined value (e.g., 2) or is greater than or equal to a threshold value (e.g., 1.75); and determining to perform the down-sampling in case the ratio is substantially equal to the predefined value (e.g., 2) or is greater than or equal to the threshold value.

$A21_{d1}$. The method of any one of embodiments A1-A7a, the method comprising down-sampling the first picture at a factor of 1.5 using the first group of values of samples included in the first block, wherein the down-sampling comprises interpolating the first group of values using the filter, a length of the filter is 10-taps, the set of 6, 8, 10, or 12 coefficient values is a set of 10 coefficient values, the set of 10 coefficient values is selected from first groups of coefficient values ±2, and the first groups of coefficient values comprise:

{6, −10, −19, 74, 154, 74, −19, −10, 6, 0}, {8, −8, −22, 66, 153, 82, −18, −13, 8, 0}, {7, −6, −24, 58, 152, 90, −14, −15, 8, 0}, {7, −5, −25, 51, 150, 97, −11, −17, 8, 1}, {6, −2, −26, 43, 147, 105, −7, −19, 7, 2}, {6, −1, −26, 35, 144, 112, −2, −21, 7, 2}, {5, 1, −26, 28, 140, 118, 3, −22, 6, 3}, {5, 2, −26, 22, 135, 125, 9, −24, 5, 3}, {4, 4, −25, 15, 130, 130, 15, −25, 4, 4}, {3, 5, −24, 9, 125, 135, 22, −26, 2, 5}, {3, 6, −22, 3, 118, 140, 28, −26, 1, 5}, {2, 7, −21, −2, 112, 144, 35, −26, −1, 6}, {2, 7, −19, −7, 105, 147, 43, −26, −2, 6}, {1, 8, −17, −11, 97, 150, 51, −25, −5, 7}, {0, 8, −15, −14, 90, 152, 58, −24, −6, 7}, {0, 8, −13, −18, 82, 153, 66, −22, −8, 8}.

$A21_{d2}$. The method of embodiment $A21_{d1}$, the method comprising:

determining whether to perform the down-sampling based on a ratio between the first picture and the second picture, wherein the ratio between the first picture and the second picture is one of a ratio between a resolution of the first picture and a resolution of the second picture, a ratio between a width of the first picture and a width of the second picture, or a ratio between a height of the first picture and a height of the second picture.

$A21_{d3}$. The method of embodiment $A21_{d2}$, wherein determining whether to perform the down-sampling based on the ratio comprises:

determining whether the ratio is substantially equal to a predefined value (e.g., 1.5) or is within a predefined range of values (e.g., between 1.25 and 1.75); and determining to perform the down-sampling in case the ratio is substantially equal to the predefined value (e.g., 1.5) or within the predefined range of values.

$A21_{e1}$. The method of any one of embodiments A1-A7a, the method comprising up-sampling the first picture using the first group of values of samples included in the first block, wherein the up-sampling comprises interpolating the first group of values using the filter, a length of the filter is 10-taps, the set of 6, 8, 10, or 12 coefficient values is a set of 10 coefficient values, the set of 10 coefficient values is selected from first groups of coefficient values ±2, and the first groups of coefficient values comprise:

{0, 0, 0, 0, 256, 0, 0, 0, 0, 0}, {2, −3, 6, −14, 254, 16, −7, 4, −2, 0}, {3, −6, 12, −26, 249, 34, −14, 7, −4, 1}, {4, −9, 17, −36, 241, 54, −22, 11, −6, 2}, {5, −11, 20, −43, 230, 75, −29, 15, −8, 2}, {5, −12, 23, −48, 216, 96, −36, 18, −9, 3}, {5, −13, 25, −51, 200, 118, −42, 21, −11, 4}, {5, −13, 25, −51, 181, 140, −46, 23, −12, 4}, {5, −13, 25, −50, 161, 161, −50, 25, −13, 5}, {4, −12, 23, −46, 140, 181, −51, 25, −13, 5}, {4, −11, 21, −42, 118, 200, −51, 25, −13, 5}, {3, −9, 18, −36, 96, 216, −48, 23, −12, 5}, {2, −8, 15, −29, 75, 230, −43, 20, −11, 5}, {2, −6, 11, −22, 54, 241, −36, 17, −9, 4}, {1, −4, 7, −14, 34, 249, −26, 12, −6, 3}, {0, −2, 4, −7, 16, 254, −14, 6, −3, 2}.

$A21_{e2}$. The method of embodiment $A21_{e1}$, the method comprising:

determining whether to perform the up-sampling based on a ratio between the first picture and the second picture, wherein the ratio between the first picture and the second picture is one of a ratio between a resolution of the first picture and a resolution of the second picture, a ratio between a width of the first picture and a width of the second picture, or a ratio between a height of the first picture and a height of the second picture.

$A21_{e3}$. The method of embodiment $A21_{e2}$, wherein determining whether to perform the up-sampling based on the ratio comprises:

determining whether the ratio is less than a predefined value (e.g., 1 or 1.25); and determining to perform the up-sampling in case the ratio is less than the predefined value.

$A21_{f1}$. The method of any one of embodiments A1-A7a, the method comprising down-sampling the first picture at a factor of 2 using the first group of values of samples included in the first block, wherein the down-sampling comprises interpolating the first group of values using the filter, a length of the filter is 10-taps, the set of 6, 8, 10, or 12 coefficient values is a set of 10 coefficient values, the set of 10 coefficient values is selected from first groups of coefficient values ±2, and the first groups of coefficient values comprise:

{−2, −14, 10, 76, 116, 76, 10, −14, −2, 0}, {−2, −14, 7, 73, 115, 81, 13, −14, −3, 0}, {−2, −13, 4, 68, 115, 85, 17, −14, −4, 0}, {−1, −13, 1, 64, 114, 89, 20, −14, −4, 0}, {−1, −13, −1, 59, 114, 93, 24, −13, −6, 0}, {0, −12, −3, 54, 111, 96, 28, −12, −6, 0}, {0, −10, −7, 51, 109, 99, 32, −11, −8, 1}, {1, −12, −6, 45, 107, 103, 36, −10, −8, 0}, {1, −9, −9, 41, 104, 104, 41, −9, −9, 1}, {0, −8, −10, 36, 103, 107, 45, −6, −12, 1}, {1, −8, −11, 32, 99, 109, 51, −7, −10, 0}, {0, −6, −12, 28, 96, 111, 54, −3, −12, 0}, {0, −6, −13, 24, 93, 114, 59, −1, −13, −1}, {0, −4, −14, 20, 89, 114, 64, 1, −13, −1}, {0, −4, −14, 17, 85, 115, 68, 4, −13, −2}.

$A21_{f2}$. The method of embodiment $A21_{f1}$, the method comprising:

determining whether to perform the down-sampling based on a ratio between the first picture and the second picture, wherein the ratio between the first picture and the second picture is one of a ratio between a resolution of the first picture and a resolution of the second picture, a ratio between a width of the first picture and a width of the second picture, or a ratio between a height of the first picture and a height of the second picture.

$A21_{f3}$. The method of embodiment $A21_{f2}$, wherein determining whether to perform the down-sampling based on the ratio comprises:

determining whether the ratio is substantially equal to a predefined value (e.g., 2) or is greater than or equal to a threshold value (e.g., 1.75); and determining to perform the down-sampling in case the ratio is substantially equal to the predefined value (e.g., 2) or is greater than or equal to the threshold value.

$A21_{g1}$. The method of any one of embodiments A1-A7a, the method comprising up-sampling the first picture using the first group of values of samples included in the first block, wherein the up-sampling comprises interpolating the first group of values using the filter, a length of the filter is 10-taps, the set of 6, 8, 10, or 12 coefficient values is a set of 10 coefficient values, the set of 10 coefficient values is selected from first groups of coefficient values ±2, and the first groups of coefficient values comprise:

{0, 0, 0, 0, 256, 0, 0, 0, 0, 0}, {3, −6, 9, −16, 253, 19, −11, 6, −2, 1}, {3, −7, 13, −27, 248, 36, −16, 8, −4, 2}, {3, −7, 16, −36, 240, 53, −21, 10, −4, 2}, {3, −8, 19, −44, 231, 72, −26, 12, −5, 2}, {5, −11, 22, −49, 217, 94, −34, 16, −8, 4}, {5, −12, 24, −52, 202, 114, −38, 19, −11, 5}, {6, −14, 26, −52, 182, 136, −43, 22, −13, 6}, {6, −13, 24, −50, 161, 161, −50, 24, −13, 6}, {6, −13, 22, −43, 136, 182, −52, 26, −14, 6}, {5, −11, 19, −38, 114, 202, −52, 24, −12, 5}, {4, −8, 16, −34, 94, 217, −49, 22, −11, 5}, {2, −5, 12, −26, 72, 231, −44, 19, −8, 3}, {2, −4, 10, −21, 53, 240, −36, 16, −7, 3}, {2, −4, 8, −16, 36, 248, −27, 13, −7, 3}, or {1, −2, 6, −11, 19, 253, −16, 9, −6, 3}.

$A21_{g2}$. The method of any one of embodiments A8 or $A21_{g1}$, the method comprising:

determining whether to perform the up-sampling based on a ratio between the first picture and the second picture, wherein the ratio between the first picture and the second picture is one of a ratio between a resolution of the first picture and a resolution of the second picture, a ratio between a width of the first picture and a width of the second picture, or a ratio between a height of the first picture and a height of the second picture.

$A21_{g3}$. The method of embodiment $A21_{g2}$, wherein determining whether to perform the up-sampling based on the ratio comprises:

determining whether the ratio is less than a predefined value (e.g., 1 or 1.25); and determining to perform the up-sampling in case the ratio is less than the predefined value.

A22. The method of any one of embodiments A1-A21, the method comprising:

selecting a length of the filter based on characteristics of reconstructed samples included in the first picture or the second picture; and selecting the set of coefficients based on the selected length of the filter.

A23. The method of embodiment A22, wherein the characteristics of the reconstructed samples are frequency information.

A24. The method of embodiment A23, wherein a first length is selected as the length of the filter in case the frequency information indicates a first degree of frequency, a second length is selected as the length of the filter in case the frequency information indicates a second degree of frequency, the second length is longer than the first length, and the second degree of frequency is higher than the first degree of frequency.

A25. The method of embodiment A22, wherein the characteristics of the reconstructed samples are any one or more of:

i) resolution of the first picture, ii) chroma format of the first picture, iii) quantization parameter, QP, of the first picture, or iv) QP of the first block.

A26. The method of any one of embodiments A1-A25, wherein $$t(x', y') = \left(\sum_{n=0}^{N-1} f_i(n) * r\left(x + n - \frac{N}{2} + 1 + mvXInt,\ y + mvYInt\right)\right), \text{ and}$$

$$r''(x, y) = \left(\sum_{n=0}^{N-1} f_j(n) * t\left(x', y' + n - \frac{N}{2} + 1\right)\right),$$

where t(x', y') is a value of a sample after horizontal filtering, x' is a horizontal coordinate of a sample in a temporal buffer, y' is a vertical coordinate of the sample in the temporal buffer, x is a horizontal coordinate of a sample in the second picture, y is a vertical coordinate of the sample in the second picture, mvXInt and mvYInt are motion vectors, $f_i$ is a subsample filter that corresponds to a particular fractional position of mvX, $f_i(n)$ is a filter coefficient at position n of the filter $f_i$, $f_j$ is a subsample filter that corresponds to a particular fractional position of mvY, $f_j(n)$ is a filter coefficient at position n of the filter $f_j$, r is a value of a sample in the first picture or the second picture at a given horizontal coordinate and a given vertical coordinate, N is a length of the filter, and r''(x, y) is a value of a sample after horizontal and vertical filterings.

B1. A method (1300) for encoding or decoding a video, the video comprising a sequence of pictures which includes a first picture and a second picture, the method comprising:

obtaining (s1302) a first group of values of samples included in a first block, wherein the first block is included in the first picture;

selecting (s1304) a length of a filter based on characteristics of reconstructed samples included in the first picture or the second picture;

selecting (s1306) a filter based at least on the selected length;

interpolating (s1308) the first group of values using the selected filter;

based on a result of interpolating the first group of values, generating (s1310) a second group of values of samples included in a second block, wherein the second block is included in the first picture or the second picture; and based at least on the second group of values, encoding or decoding (s1312) the video.

B2. The method of embodiment B1, wherein the characteristics of the reconstructed samples are frequency information.

B3. The method of embodiment B2, wherein a first length is selected as the length of the filter in case the frequency information indicates a first degree of frequency, a second length is selected as the length of the filter in case the frequency information indicates a second degree of frequency, the second length is longer than the first length, and the second degree of frequency is higher than the first degree of frequency.

B4. The method of any one of embodiments B1-B3, wherein the characteristics of the reconstructed samples are any one or more of:

i) resolution of the first picture, ii) chroma format of the first picture, iii) quantization parameter, QP, of the first picture, or iv) QP of the first block.

B5. The method of any one of embodiments B1-B4, wherein the samples having the first group of values are located at non-fractional sample positions, and the samples having the second group of values are located at fractional sample positions.

B6. The method of any one of embodiments B1-B5, wherein the samples having the first group of values includes a first sample located at a non-fractional sample position, the samples having the second group of values includes a second sample located at a fractional sample position, the fractional sample position is determined based at least on the non-fractional sample position and a fraction value, and the fraction value is associated with one set of 6, 8, 10, or 12 coefficient values selected from a groups of coefficient values ±2.

B7. The method of embodiment B6, wherein the fractional sample position=the non-fractional sample position+(the fraction value×a distance between samples).

B8. The method of embodiment B6 or B7, wherein the fraction value is any of 0/16, 1/16, 2/16, 3/16, . . . , 15/16, 0/32, 1/32, 2/32, 3/32, . . . , and 31/32.

B9. The method of any one of embodiments B1-B8, the method comprising performing one or more of a motion compensated prediction, an inter prediction, and an intra prediction using the first group of values of samples included in the first block, wherein performing one or more of the motion compensated prediction, the inter prediction, and the intra prediction comprises interpolating the first group of values using the filter.

B10. The method of any one of embodiments B1-B9, the method comprising downsampling or upsampling the first picture using the first group of values of samples included in the first block, wherein the downsampling or the upsampling comprises interpolating the first group of values using the filter.

B10a. The method of embodiment B9 or B10, wherein the motion compensated prediction is a motion compensated downsampling.

B11. The method of any one of embodiments B1-B10a, wherein the selected length of the filter is 6-taps, the filter comprises a set of 6 coefficient values, the set of 6 coefficient values is selected from first groups of coefficient values ±2, and the first groups of coefficient values comprise:

{1, −6, 256, 6, −1, 0}, {2, −11, 254, 14, −4, 1}, {4, −18, 252, 23, −6, 1}, {6, −24, 249, 32, −9, 2}, {6, −26, 244, 41, −12, 3}, {7, −30, 239, 53, −18, 5}, {8, −34, 235, 61, −19, 5}, {10, −38, 228, 72, −22, 6}, {10, −39, 220, 84, −26, 7}, {10, −40, 213, 94, −29, 8}, {11, −42, 205, 105, −32, 9}, {11, −42, 196, 116, −35, 10}, {11, −42, 186, 128, −37, 10}{11, −41, 167, 148, −40, 11}, {11, −41, 158, 158, −41, 11}, {11, −40, 148, 167, −41, 11}, {10, −37, 128, 186, −42, 11}, {10, −35, 116, 196, −42, 11}, {9, −32, 105, 205, −42, 11}, {8, −29, 94, 213, −40, 10}, {7, −26, 84, 220, −39, 10}, {6, −22, 72, 228, −38, 10}, {5, −19, 61, 235, −34, 8}, {5, −18, 53, 239, −30, 7}, {3, −12, 41, 244, −26, 6}, {2, −9, 32, 249, −24, 6}, {1, −6, 23, 252, −18, 4}, {1, −4, 14, 254, −11, 2}, {0, −1, 6, 256, −6, 1}, wherein each of the first groups of coefficient values is associated with a particular fraction value, and the second group of values of the second block is generated based on the first group of values of the first block and a particular fraction value associated with any one of the first groups coefficient values.

B12. The method of any one of embodiments B1-B10a, wherein the selected length of the filter is 6-taps, the filter comprises a set of 6 coefficient values, the set of 6 coefficient values is selected from first groups of coefficient values ±2, and the first groups of coefficient values comprise:

{28, 46, 103, 49, 29, 1}, {26, 47, 100, 53, 28, 2}, {25, 46, 99, 55, 28, 3}, {26, 39, 105, 53, 29, 4}, {25, 39, 102, 56, 29, 5}, {23, 40, 99, 60, 28, 6}, {22, 40, 96, 63, 28, 7}, {20, 41, 93, 66, 29, 7}, {19, 40, 92, 68, 29, 8}, {18, 39, 91, 70, 29, 9}, {16, 40, 88, 73, 30, 9}, {16, 38, 87, 74, 31, 10}, {16, 36, 86, 75, 32, 11}, {14, 38, 82, 77, 34, 11}, {12, 38, 81, 79, 35, 11}, {12, 36, 80, 80, 36, 12}, {11, 35, 79, 81, 38, 12}, {11, 34, 77, 82, 38, 14}, {11, 32, 75, 86, 36, 16}, {10, 31, 74, 87, 38, 16}, {9, 30, 73, 88, 40, 16}, {9, 29, 70, 91, 39, 18}, {8, 29, 68, 92, 40, 19}, {7, 29, 66, 93, 41, 20}, {7, 28, 63, 96, 40, 22}, {6, 28, 60, 99, 40, 23}, {5, 29, 56, 102, 39, 25}, {4, 29, 53, 105, 39, 26}, {3, 28, 55, 99, 46, 25}, {2, 28, 53, 100, 47, 26}, {1, 29, 49, 103, 46, 28}, wherein each of the first groups of coefficient values is associated with a particular fraction value, and the second group of values of the second block is generated based on the first group of values of the first block and a particular fraction value associated with any one of the first groups coefficient values.

B13. The method of any one of embodiments B1-B10a, wherein the selected length of the filter is 6-taps, the filter comprises a set of 6 coefficient values, the set of 6 coefficient values is selected from first groups of coefficient values ±2, and the first groups of coefficient values comprise:

{0, 44, 160, 53, −2, 1}, {−2, 42, 160, 59, −4, 1}, {−2, 38, 159, 65, −5, 1}, {−1, 33, 159, 68, −4, 1}, {−2, 33, 154, 74, −4, 1}, {−1, 27, 155, 78, −4, 1}, {−2, 25, 153, 84, −5, 1}, {−2, 22, 151, 89, −5, 1}, {−1, 17, 151, 93, −6, 2}, {−2, 16, 147, 99, −5, 1}, {−1, 14, 142, 103, −3, 1}, {−1, 12, 139, 107, −2, 1}, {−1, 10, 135, 112, 0, 0}, {−1, 8, 132, 116, 1, 0}, {0, 3, 131, 122, −1, 1}, {0, 4, 124, 124, 4, 0}, {1, −1, 122, 131, 3, 0}, {0, 1, 116, 132, 8, −1}, {0, 0, 112, 135, 10, −1}, {1, −2, 107, 139, 12, −1}, {1, −3, 103, 142, 14, −1}, {1, −5, 99, 147, 16, −2}, {2, −6, 93, 151, 17, −1}, {1, −5, 89, 151, 22, −2}, {1, −5, 84, 153, 25, −2}, {1, −4, 78, 155, 27, −1}, {1, −4, 74, 154, 33, −2}, {1, −4, 68, 159, 33, −1}, {1, −5, 65, 159, 38, −2}, {1, −4, 59, 160, 42, −2}, {1, −2, 53, 160, 44, 0}, wherein each of the first groups of coefficient values is associated with a particular fraction value, and the second group of values of the second block is generated based on the first group of values of the first block and a particular fraction value associated with any one of the first groups coefficient values.

B14. The method of any one of embodiments B1-B10a, wherein the selected length of the filter is 6-taps, the filter comprises a set of 6 coefficient values, the set of 6 coefficient values is selected from first groups of coefficient values ±2, and the first groups of coefficient values comprise:

{−14, 64, 156, 64, −14, 0}, {−13, 59, 155, 68, −12, −1}, {−13, 56, 154, 71, −11, −1}, {−13, 52, 153, 76, −10, −2}, {−12, 47, 153, 79, −9, −2}, {−13, 45, 151, 84, −8, −3}, {−13, 39, 154, 88, −9, −3}, {−14, 34, 156, 94, −10, −4}, {−15, 33, 152, 99, −7, −6}, {−15, 30, 150, 103, −5, −7}, {−14, 26, 148, 107, −4, −7}, {−12, 23, 143, 110, −1, −7}, {−13, 18, 145, 116, −2, −8}, {−10, 15, 139, 118, 1, −7}, {−15, 19, 134, 122, 9, −13}, {−14, 18, 129, 123, 13, −13}, {−14, 18, 124, 124, 18, −14}, {−13, 13, 123, 129, 18, −14}, {−13, 9, 122, 134, 19, −15}, {−7, 1, 118, 139, 15, −10}, {−8, −2, 116, 145, 18, −13}, {−7, −1, 110, 143, 23, −12}, {−7, −4, 107, 148, 26, −14}, {−7, −5, 103, 150, 30, −15}, {−6, −7, 99, 152, 33, −15}, {−4, −10, 94, 156, 34, −14}, {−3, −9, 88, 154, 39, −13}, {−3, −8, 84, 151, 45, −13}, {−2, −9, 79, 153, 47, −12}, {−2, −10, 76, 153, 52, −13}, {−1, −11, 71, 154, 56, −13}, {−1, −12, 68, 155, 59, −13}, wherein each of the first groups of coefficient values is associated with a particular fraction value, and the second group of values of the second block is generated based on the first group of values of the first block and a particular fraction value associated with any one of the first groups coefficient values.

B15. The method of any one of embodiments B1-B10a, wherein the selected length of the filter is 6-taps, the filter comprises a set of 6 coefficient values, the set of 6 coefficient values is selected from first groups of coefficient values ±2, and the first groups of coefficient values comprise:

{−5, 64, 138, 64, −5, 0}, {−8, 66, 132, 73, −6, −1}, {−9, 62, 134, 76, −5, −2}, {−10, 59, 134, 80, −4, −3}, {−10, 57, 132, 82, −2, −3}, {−10, 53, 132, 85, 0, −4}, {−11, 50, 132, 89, 1, −5}, {−12, 47, 132, 93, 2, −6}, {−13, 45, 131, 96, 4, −7}, {−12, 40, 131, 99, 5, −7}, {−12, 39, 127, 101, 9, −8}, {−13, 36, 127, 105, 10, −9}, {−12, 33, 124, 107, 14, −10}, {−13, 30, 124, 111, 15, −11}, {−13, 29, 121, 112, 18, −11}, {−12, 25, 119, 115, 21, −12}, {−13, 24, 117, 117, 24, −13}, {−12, 21, 115, 119, 25, −12}, {−11, 18, 112, 121, 29, −13}, {−11, 15, 111, 124, 30, −13}, {−10, 14, 107, 124, 33, −12}, {−9, 10, 105, 127, 36, −13}, {−8, 9, 101, 127, 39, −12}, {−7, 5, 99, 131, 40, −12}, {−7, 4, 96, 131, 45, −13}, {−6, 2, 93, 132, 47, −12}, {−5, 1, 89, 132, 50, −11}, {−4, 0, 85, 132, 53, −10}, {−3, −2, 82, 132, 57, −10}, {−3, −4, 80, 134, 59, −10}, {−2, −5, 76, 134, 62, −9}, {−1, −6, 73, 132, 66, −8}, wherein each of the first groups of coefficient values is associated with a particular fraction value, and the second group of values of the second block is generated based on the first group of values of the first block and a particular fraction value associated with any one of the first groups coefficient values.

B16. The method of any one of embodiments B1-B10a, wherein the selected length of the filter is 8-taps, the filter comprises a set of 8 coefficient values, the set of 8 coefficient values is selected from first groups of coefficient values ±2, and the first groups of coefficient values comprise:

{−1, 3, −7, 254, 11, −6, 3, −1}, {−1, 4, −12, 253, 16, −6, 3, −1}, {−2, 7, −18, 249, 28, −12, 6, −2}, {−2, 8, −23, 248, 33, −11, 4, −1}, {−3, 11, −28, 242, 47, −19, 8, −2}, {−3, 12, −33, 241, 51, −16, 5, −1}, {−4, 15, −38, 236, 62, −21, 8, −2}, {−5, 18, −43, 231, 72, −23, 8, −2}, {−6, 19, −44, 223, 84, −28, 12, −4}, {−4, 15, −40, 210, 99, −35, 15, −4}, {−3, 12, −36, 195, 117, −42, 18, −5}, {−4, 15, −40, 190, 124, −42, 18, −5}, {−4, 15, −41, 183, 133, −42, 16, −4}, {−4, 15, −42, 176, 142, −44, 18, −5}, {−5, 17, −42, 165, 153, −45, 18, −5}, {−5, 18, −45, 153, 165, −42, 17, −5}, {−5, 18, −44, 142, 176, −42, 15, −4}, {−4, 16, −42, 133, 183, −41, 15, −4}, {−5, 18, −42, 124, 190, −40, 15, −4}, {−5, 18, −42, 117, 195, −36, 12, −3}, {−4, 15, −35, 99, 210, −40, 15, −4}, {−4, 12, −28, 84, 223, −44, 19, −6}, {−2, 8, −23, 72, 231, −43, 18, −5}, {−2, 8, −21, 62, 236, −38, 15, −4}, {−1, 5, −16, 51, 241, −33, 12, −3}, {−2, 8, −19, 47, 242, −28, 11, −3}, {−1, 4, −11, 33, 248, −23, 8, −2}, {−2, 6, −12, 28, 249, −18, 7, −2}, {−1, 3, −6, 16, 253, −12, 4, −1}, {−1, 3, −6, 11, 254, −7, 3, −1}, wherein each of the first groups of coefficient values is associated with a particular fraction value, and the second group of values of the second block is generated based on the first group of values of the first block and a particular fraction value associated with any one of the first groups coefficient values.

B17. The method of any one of embodiments B1-B10a, wherein the selected length of the filter is 8-taps, the filter comprises a set of 8 coefficient values, the set of 8 coefficient values is selected from first groups of coefficient values ±2, and the first groups of coefficient values comprise:

{0, 29, 44, 105, 47, 30, 1, 0}, {1, 25, 49, 96, 55, 27, 3, 0}, {1, 24, 47, 96, 57, 27, 5, −1}, {0, 24, 45, 97, 58, 28, 5, −1}, {−1, 25, 42, 98, 58, 30, 5, −1}, {−1, 24, 41, 97, 60, 30, 6, −1}, {−2, 25, 38, 97, 62, 30, 8, −2}, {−2, 24, 37, 96, 64, 30, 9, −2}, {−2, 23, 36, 95, 66, 30, 10, −2}, {−2, 21, 37, 92, 69, 31, 10, −2}, {−2, 20, 36, 91, 71, 31, 11, −2}, {0, 16, 39, 85, 74, 32, 11, −1}, {−1, 17, 36, 86, 75, 32, 12, −1}, {0, 13, 39, 82, 77, 35, 10, 0}, {0, 12, 38, 81, 79, 35, 11, 0}, {0, 12, 36, 80, 80, 36, 12, 0}, {0, 11, 35, 79, 81, 38, 12, 0}, {0, 10, 35, 77, 82, 39, 13, 0}, {−1, 12, 32, 75, 86, 36, 17, −1}, {−1, 11, 32, 74, 85, 39, 16, 0}, {−2, 11, 31, 71, 91, 36, 20, −2}, {−2, 10, 31, 69, 92, 37, 21, −2}, {−2, 10, 30, 66, 95, 36, 23, −2}, {−2, 9, 30, 64, 96, 37, 24, −2}, {−2, 8, 30, 62, 97, 38, 25, −2}, {−1, 6, 30, 60, 97, 41, 24, −1}, {−1, 5, 30, 58, 98, 42, 25, −1}, {−1, 5, 28, 58, 97, 45, 24, 0}, {−1, 5, 27, 57, 96, 47, 24, 1}, {0, 3, 27, 55, 96, 49, 25, 1}, {0, 1, 30, 47, 105, 44, 29, 0}, wherein each of the first groups of coefficient values is associated with a particular fraction value, and the second group of values of the second block is generated based on the first group of values of the first block and a particular fraction value associated with any one of the first groups coefficient values.

B18. The method of any one of embodiments B1-B10a, wherein the selected length of the filter is 8-taps, the filter comprises a set of 8 coefficient values, the set of 8 coefficient values is selected from first groups of coefficient values ±2, and the first groups of coefficient values comprise:

{13, −38, 56, 194, 56, −38, 13, 0,}, {13, −38, 52, 193, 62, −38, 11, 1,}, {13, −36, 44, 193, 69, −37, 8, 2,}, {12, −34, 39, 192, 74, −36, 7, 2,}, {13, −33, 32, 192, 79, −36, 6, 3,}, {12, −30, 26, 190, 86, −36, 4, 4,}, {12, −29, 21, 188, 92, −35, 3, 4,}, {14, −28, 15, 185, 97, −35, 2, 6,}, {13, −26, 11, 182, 103, −34, 1, 6,}, {13, −23, 4, 180, 109, −34, 0, 7,}, {13, −23, 2, 175, 115, −31, −2, 7,}, {12, −20, −3, 172, 121, −30, −4, 8,}, {11, −18, −7, 168, 128, −28, −6, 8,}, {11, −16, −11, 164, 133, −27, −7, 9,}, {11, −15, −14, 159, 139, −25, −8, 9,}, {10, −13, −17, 155, 144, −23, −9, 9,}, {9, −11, −20, 150, 150, −20, −11, 9,}, {9, −9, −23, 144, 155, −17, −13, 10,}, {9, −8, −25, 139, 159, −14, −15, 11,}, {9, −7, −27, 133, 164, −11, −16, 11,}, {8, −6, −28, 128, 168, −7, −18, 11,}, {8, −4, −30, 121, 172, −3, −20, 12,}, {7, −2, −31, 115, 175, 2, −23, 13,}, {7, 0, −34, 109, 180, 4, −23, 13,}, {6, 1, −34, 103, 182, 11, −26, 13,}, {6, 2, −35, 97, 185, 15, −28, 14,}, {4, 3, −35, 92, 188, 21, −29, 12,}, {4, 4, −36, 86, 190, 26, −30, 12,}, {3, 6, −36, 79, 192, 32, −33, 13,}, {2, 7, −36, 74, 192, 39, −34, 12,}, {2, 8, −37, 69, 193, 44, −36, 13,}, {1, 11, −38, 62, 193, 52, −38, 13,}, wherein each of the first groups of coefficient values is associated with a particular fraction value, and the second group of values of the second block is generated based on the first group of values of the first block and a particular fraction value associated with any one of the first groups coefficient values.

B19. The method of any one of embodiments B1-B10a, wherein the selected length of the filter is 8-taps, the filter comprises a set of 8 coefficient values, the set of 8 coefficient values is selected from first groups of coefficient values ±2, and the first groups of coefficient values comprise:

{−21, 7, 74, 136, 74, 7, −21, 0,}, {−20, 5, 69, 140, 75, 8, −20, −1,}, {−19, 3, 66, 140, 78, 9, −19, −2,}, {−17, 1, 62, 141, 80, 8, −17, −2,}, {−16, 1, 59, 138, 82, 10, −15, −3,}, {−16, −1, 57, 138, 86, 11, −15, −4,}, {−11, −6, 57, 131, 91, 10, −13, −3,}, {−9, −8, 53, 131, 94, 10, −12, −3,}, {−8, −9, 49, 131, 97, 11, −12, −3,}, {−13, −8, 50, 130, 100, 18, −15, −6,}, {−10, −9, 46, 128, 102, 17, −14, −4,}, {−11, −10, 44, 127, 106, 21, −15, −6,}, {−9, −12, 41, 126, 109, 21, −15, −5,}, {−10, −12, 40, 123, 111, 26, −15, −7,}, {−9, −13, 38, 120, 113, 29, −14, −8,}, {−8, −14, 35, 120, 115, 29, −14, −7,}, {−7, −13, 32, 116, 116, 32, −13, −7,}, {−7, −14, 29, 115, 120, 35, −14, −8,}, {−8, −14, 29, 113, 120, 38, −13, −9,}, {−7, −15, 26, 111, 123, 40, −12, −10,}, {−5, −15, 21, 109, 126, 41, −12, −9,}, {−6, −15, 21, 106, 127, 44, −10, −11,}, {−4, −14, 17, 102, 128, 46, −9, −10,}, {−6, −15, 18, 100, 130, 50, −8, −13,}, {−3, −12, 11, 97, 131, 49, −9, −8,}, {−3, −12, 10, 94, 131, 53, −8, −9,}, {−3, −13, 10, 91, 131, 57, −6, −11,}, {−4, −15, 11, 86, 138, 57, −1, −16,}, {−3, −15, 10, 82, 138, 59, 1, −16,}, {−2, −17, 8, 80, 141, 62, 1, −17,}, {−2, −19, 9, 78, 140, 66, 3, −19,}, {−1, −20, 8, 75, 140, 69, 5, −20,}, wherein each of the first groups of coefficient values is associated with a particular fraction value, and the second group of values of the second block is generated based on the first group of values of the first block and a particular fraction value associated with any one of the first groups coefficient values.

B20. The method of any one of embodiments B1-B10a, wherein the selected length of the filter is 8-taps, the filter comprises a set of 8 coefficient values, the set of 8 coefficient values is selected from first groups of coefficient values ±2, and the first groups of coefficient values comprise:

{−4, −20, 64, 167, 73, −19, −5, 0}, {−1, −20, 58, 164, 77, −19, −4, 1}, {−1, −20, 53, 165, 81, −18, −5, 1}, {0, −19, 49, 161, 84, −15, −5, 1}, {0, −19, 45, 160, 89, −14, −6, 1}, {1, −20, 42, 157, 95, −13, −8, 2}, {1, −19, 37, 157, 98, −12, −8, 2}, {1, −18, 33, 154, 103, −10, −9, 2}, {1, −18, 31, 151, 107, −8, −11, 3}, {1, −19, 26, 152, 113, −7, −12, 2}, {1, −19, 23, 151, 116, −6, −12, 2}, {3, −17, 18, 145, 120, −4, −13, 4}, {3, −17, 16, 142, 123, −1, −14, 4}, {4, −17, 11, 141, 127, 0, −14, 4}, {4, −17, 9, 137, 131, 4, −16, 4}, {4, −16, 4, 131, 137, 9, −17, 4}, {4, −14, 0, 127, 141, 11, −17, 4}, {4, −14, −1, 123, 142, 16, −17, 3}, {4, −13, −4, 120, 145, 18, −17, 3}, {2, −12, −6, 116, 151, 23, −19, 1}, {2, −12, −7, 113, 152, 26, −19, 1}, {3, −11, −8, 107, 151, 31, −18, 1}, {2, −9, −10, 103, 154, 33, −18, 1}, {2, −8, −12, 98, 157, 37, −19, 1}, {2, −8, −13, 95, 157, 42, −20, 1}, {1, −6, −14, 89, 160, 45, −19, 0}, {1, −5, −15, 84, 161, 49, −19, 0}, {1, −5, −18, 81, 165, 53, −20, −1}, {1, −4, −19, 77, 164, 58, −20, −1}, {0, −5, −19, 73, 167, 64, −20, −4}, wherein each of the first groups of coefficient values is associated with a particular fraction value, and the second group of values of the second block is generated based on the first group of values of the first block and a particular fraction value associated with any one of the first groups coefficient values.

B21. The method of any one of embodiments B1-B10a, wherein the selected length of the filter is 8-taps, the filter comprises a set of 8 coefficient values, the set of 8 coefficient values is selected from first groups of coefficient values ±2, and the first groups of coefficient values comprise:

{−15, 9, 75, 118, 75, 9, −15, 0}, {−14, 7, 70, 123, 75, 9, −13, −1}, {−18, 7, 69, 125, 79, 14, −18, −2}, {−17, 5, 66, 126, 81, 14, −16, −3}, {−16, 3, 63, 127, 83, 15, −16, −3}, {−17, 3, 60, 128, 85, 17, −16, −4}, {−16, 3, 56, 127, 86, 19, −14, −5}, {−15, 0, 56, 124, 90, 21, −15, −5}, {−16, 1, 53, 124, 90, 25, −15, −6}, {−15, 0, 51, 121, 93, 26, −13, −7}, {−16, −2, 52, 118, 97, 29, −13, −9}, {−15, −4, 51, 116, 99, 31, −13, −9}, {−15, −4, 47, 116, 102, 31, −10, −11}, {−15, −4, 45, 114, 103, 34, −9, −12}, {−14, −5, 43, 112, 104, 37, −9, −12}, {−13, −7, 42, 110, 106, 39, −9, −12}, {−13, −9, 41, 109, 109, 41, −9, −13}, {−12, −9, 39, 106, 110, 42, −7, −13}, {−12, −9, 37, 104, 112, 43, −5, −14}, {−12, −9, 34, 103, 114, 45, −4, −15}, {−11, −10, 31, 102, 116, 47, −4, −15}, {−9, −13, 31, 99, 116, 51, −4, −15}, {−9, −13, 29, 97, 118, 52, −2, −16}, {−7, −13, 26, 93, 121, 51, 0, −15}, {−6, −15, 25, 90, 124, 53, 1, −16}, {−5, −15, 21, 90, 124, 56, 0, −15}, {−5, −14, 19, 86, 127, 56, 3, −16}, {−4, −16, 17, 85, 128, 60, 3, −17}, {−3, −16, 15, 83, 127, 63, 3, −16}, {−3, −16, 14, 81, 126, 66, 5, −17}, {−2, −18, 14, 79, 125, 69, 7, −18}, {−1, −13, 9, 75, 123, 70, 7, −14}, wherein each of the first groups of coefficient values is associated with a particular fraction value, and the second group of values of the second block is generated based on the first group of values of the first block and a particular fraction value associated with any one of the first groups coefficient values.

B22. The method of any one of embodiments B1-B10a, wherein the selected length of the filter is 12-taps, the filter comprises a set of 12 coefficient values, the set of 12 coefficient values is selected from first groups of coefficient values ±2, and the first groups of coefficient values comprise:

{0, 1, −2, 3, −7, 255, 8, −3, 2, −1, 0, 0}, {−1, 3, −4, 6, −14, 254, 17, −8, 5, −3, 1, 0}, {−1, 3, −5, 9, −21, 253, 25, −10, 5, −3, 1, 0}, {−1, 4, −8, 13, −26, 249, 34, −14, 8, −4, 1, 0}, {−2, 6, −10, 16, −32, 246, 44, −18, 9, −4, 1, 0}, {−1, 4, −9, 18, −39, 235, 65, −26, 13, −6, 3, −1}, {−2, 6, −12, 22, −44, 230, 75, −28, 14, −7, 3, −1}, {−2, 6, −12, 23, −47, 224, 85, −31, 15, −7, 3, −1}, {−2, 7, −13, 23, −48, 216, 97, −36, 18, −9, 4, −1}, {−2, 6, −12, 23, −49, 209, 106, −37, 19, −10, 4, −1}, {−3, 8, −14, 26, −52, 200, 119, −42, 22, −12, 6, −2}, {−2, 6, −12, 24, −51, 191, 129, −43, 22, −12, 6, −2}, {−2, 7, −14, 25, −50, 180, 141, −46, 23, −12, 6, −2}, {−2, 6, −12, 24, −50, 171, 151, −47, 23, −12, 6, −2}, {−2, 6, −12, 23, −47, 151, 171, −50, 24, −12, 6, −2}, {−2, 6, −12, 23, −46, 141, 180, −50, 25, −14, 7, −2}, {−2, 6, −12, 22, −43, 129, 191, −51, 24, −12, 6, −2}, {−2, 6, −12, 22, −42, 119, 200, −52, 26, −14, 8, −3}, {−1, 4, −10, 19, −37, 106, 209, −49, 23, −12, 6, −2}, {−1, 4, −9, 18, −36, 97, 216, −48, 23, −13, 7, −2}, {−1, 3, −7, 15, −31, 85, 224, −47, 23, −12, 6, −2}, {−1, 3, −7, 14, −28, 75, 230, −44, 22, −12, 6, −2}, {−1, 3, −6, 13, −26, 65, 235, −39, 18, −9, 4, −1}, {0, 1, −4, 9, −18, 44, 246, −32, 16, −10, 6, −2}, {0, 1, −4, 8, −14, 34, 249, −26, 13, −8, 4, −1}, {0, 1, −3, 5, −10, 25, 253, −21, 9, −5, 3, −1}, {0, 1, −3, 5, −8, 17, 254, −14, 6, −4, 3, −1}, {0, 0, −1, 2, −3, 8, 255, −7, 3, −2, 1, 0}, wherein each of the first groups of coefficient values is associated with a particular fraction value, and the second group of values of the second block is generated based on the first group of values of the first block and a particular fraction value associated with any one of the first groups coefficient values.

B23. The method of any one of embodiments B1-B10a, the method comprising downsampling a width and/or a height of the first picture at a factor of 1.5 using the first group of values of samples included in the first block, wherein the downsampling comprises interpolating the first group of values using the filter, the selected length of the filter is 12-taps, the filter comprises a set of 12 coefficient values, the set of 12 coefficient values is selected from first groups of coefficient values ±2, and the first groups of coefficient values comprise:

{0, 10, −12, −19, 70, 158, 70, −19, −12, 10, 0, 0}, {0, 10, −9, −22, 62, 156, 79, −17, −13, 9, 1, 0}, {−1, 10, −8, −22, 54, 155, 87, −13, −16, 9, 2, −1}, {−2, 10, −5, −23, 46, 152, 95, −9, −18, 9, 2, −1}, {−2, 9, −4, −23, 39, 150, 103, −6, −20, 8, 4, −2}, {−2, 8, −1, −24, 33, 144, 111, −2, −20, 6, 5, −2}, {−3, 9, −1, −24, 26, 142, 117, 4, −22, 5, 5, −2}, {−3, 8, 0, −23, 20, 137, 123, 10, −23, 4, 5, −2}, {−2, 6, 3, −25, 16, 130, 130, 16, −25, 3, 6, −2}, {−2, 5, 4, −23, 10, 123, 137, 20, −23, 0, 8, −3}, {−2, 5, 5, −22, 4, 117, 142, 26, −24, −1, 9, −3}, {−2, 5, 6, −20, −2, 111, 144, 33, −24, −1, 8, −2}, {−2, 4, 8, −20, −6, 103, 150, 39, −23, −4, /9, −2}, {−1, 2, 9, −18, −9, 95, 152, 46, −23, −5, 10, −2}, {−1, 2, 9, −16, −13, 87, 155, 54, −22, −8, 10, −1}, {0, 1, 9, −13, −17, 79, 156, 62, −22, −9, 10, 0}, wherein each of the first groups of coefficient values is associated with a particular fraction value, and the second group of values of the second block is generated based on the first group of values of the first block and a particular fraction value associated with any one of the first groups coefficient values.

B24. The method of any one of embodiments B1-B10a, the method comprising downsampling a width and/or a height of the first picture at a factor of 2 using the first group of values of samples included in the first block, wherein the downsampling comprises interpolating the first group of values using the filter, the selected length of the filter is 12-taps, the filter comprises a set of 12 coefficient values, the set of 12 coefficient values is selected from first groups of coefficient values ±2, and the first groups of coefficient values comprise:

{4, −7, −17, 13, 73, 124, 73, 13, −17, −7, 4, 0}, {3, −7, −17, 9, 72, 122, 81, 15, −16, −9, 3, 0}, {3, −5, −16, 6, 66, 120, 85, 18, −15, −10, 3, 1}, {3, −6, −17, 3, 64, 120, 90, 23, −15, −11, 1, 1}, {2, −3, −15, 0, 58, 117, 93, 25, −13, −10, 1, 1}, {4, −4, −16, −2, 54, 116, 96, 31, −14, −12, 0, 3}, {4, −3, −14, −6, 49, 114, 101, 32, −12, −12, 0, 3}, {4, −3, −13, −7, 45, 110, 103, 38, −11, −12, −2, 4}, {2, 0, −14, −9, 42, 107, 107, 42, −9, −14, 0, 2}, {4, −2, −12, −11, 38, 103, 110, 45, −7, −13, −3, 4}, {3, 0, −12, −12, 32, 101, 114, 49, −6, −14, −3, 4}, {3, 0, −12, −14, 31, 96, 116, 54, −2, −16, −4, 4}, {1, 1, −10, −13, 25, 93, 117, 58, 0, −15, −3, 2}, {1, 1, −11, −15, 23, 90, 120, 64, 3, −17, −6, 3}, {1, 3, −10, −15, 18, 85, 120, 66, 6, −16, −5, 3}, {0, 3, −9, −16, 15, 81, 122, 72, 9, −17, −7, 3}, wherein each of the first groups of coefficient values is associated with a particular fraction value, and the second group of values of the second block is generated based on the first group of values of the first block and a particular fraction value associated with any one of the first groups coefficient values.

$B24_{a1}$. The method of any one of embodiments B1-B10a, the method comprising down-sampling the first picture at a factor of 2 using the first group of values of samples included in the first block, wherein the down-sampling comprises interpolating the first group of values using the filter, a length of the filter is 12-taps, the set of 6, 8, 10, or 12 coefficient values is a set of 12 coefficient values, the set of 12 coefficient values is selected from first groups of coefficient values ±2, and the first groups of coefficient values comprise:

{5, −5, −17, 9, 78, 116, 78, 9, −17, −5, 5, 0}, {5, −4, −18, 7, 73, 116, 82, 14, −18, −6, 4, 1}, {5, −4, −17, 4, 69, 115, 86, 17, −17, −7, 4, 1}, {5, −3, −17, 1, 64, 115, 90, 21, −17, −8, 3, 2}, {4, −2, −15, −2, 59, 114, 93, 24, −15, −8, 2, 2}, {4, −1, −15, −5, 55, 113, 96, 29, −15, −10, 3, 2}, {4, 0, −15, −7, 51, 110, 100, 33, −14, −11, 2, 3}, {3, 1, −13, −9, 45, 108, 104, 36, −12, −11, 1, 3}, {3, 1, −13, −10, 42, 105, 105, 42, −10, −13, 1, 3}, {3, 1, −11, −12, 36, 104, 108, 45, −9, −13, 1, 3}, {3, 2, −11, −14, 33, 100, 110, 51, −7, −15, 0, 4}, {2, 3, −10, −15, 29, 96, 113, 55, −5, −15, −1, 4}, {2, 2, −8, −15, 24, 93, 114, 59, −2, −15, −2, 4}, {2, 3, −8, −17, 21, 90, 115, 64, 1, −17, −3, 5}, {1, 4, −7, −17, 17, 86, 115, 69, 4, −17, −4, 5}, {1, 4, −6, −18, 14, 82, 116, 73, 7, −18, −4, 5}.

$B24_{a2}$. The method of any one of embodiments B15, B21, or $B24_{a1}$, the method comprising:

determining whether to perform the down-sampling based on a ratio between the first picture and the second picture, wherein the ratio between the first picture and the second picture is one of a ratio between a resolution of the first picture and a resolution of the second picture, a ratio between a width of the first picture and a width of the second picture, or a ratio between a height of the first picture and a height of the second picture.

$B24_{a3}$. The method of embodiment $B24_{a2}$, wherein determining whether to perform the down-sampling based on the ratio comprises:

determining whether the ratio is substantially equal to a predefined value (e.g., 2) or is greater than or equal to a threshold value (e.g., 1.75); and determining to perform the down-sampling in case the ratio is substantially equal to the predefined value (e.g., 1.5) or greater than or equal to the threshold value.

$B24_{b1}$. The method of any one of embodiments B1-B10a, the method comprising down-sampling the first picture at a factor of 1.5 using the first group of values of samples included in the first block, wherein the down-sampling comprises interpolating the first group of values using the filter, a length of the filter is 12-taps, the set of 6, 8, 10, or 12 coefficient values is a set of 12 coefficient values, the set of 12 coefficient values is selected from first groups of coefficient values ±2, and the first groups of coefficient values comprise:

{−1, 9, −10, −21, 74, 154, 74, −21, −10, 9, −1, 0}, {−2, 9, −8, −22, 65, 155, 81, −18, −12, 9, 0, −1}, {−2, 8, −5, −24, 57, 153, 90, −15, −14, 9, 0, −1}, {−1, 8, −5, −25, 52, 148, 97, −10, −17, 8, 2, −1}, {−2, 8, −5, −23, 45, 144, 104, −3, −20, 6, 4, −2}, {−2, 6, 0, −25, 35, 144, 112, −2, −20, 7, 3, −2}, {−2, 6, 1, −25, 28, 140, 119, 3, −22, 6, 4, −2}, {−1, 3, 4, −23, 18, 137, 126, 6, −21, 6, 2, −1}, {−1, 2, 6, −22, 10, 133, 133, 10, −22, 6, 2, −1}, {−1, 2, 6, −21, 6, 126, 137, 18, −23, 4, 3, −1}, {−2, 4,

6, −22, 3, 119, 140, 28, −25, 1, 6, −2}, {−2, 3, 7, −20, −2, 112, 144, 35, −25, 0, 6, −2}, {−2, 4, 6, −20, −3, 104, 144, 45, −23, −5, 8, −2}, {−1, 2, 8, −17, −10, 97, 148, 52, −25, −5, 8, −1}, {−1, 0, 9, −14, −15, 90, 153, 57, −24, −5, 8, −2}, {−1, 0, 9, −12, −18, 81, 155, 65, −22, −8, 9, −2}.

$B24_{b2}$. The method of any one of embodiments B14, B23, or $B24_{b1}$, the method comprising:

determining whether to perform the down-sampling based on a ratio between the first picture and the second picture, wherein the ratio between the first picture and the second picture is one of a ratio between a resolution of the first picture and a resolution of the second picture, a ratio between a width of the first picture and a width of the second picture, or a ratio between a height of the first picture and a height of the second picture.

$B24_{b3}$. The method of embodiment $B24_{b2}$, wherein determining whether to perform the down-sampling based on the ratio comprises:

determining whether the ratio is substantially equal to a predefined value (e.g., 1.5) or is within a predefined range of values (e.g., between 1.25 and 1.75); and determining to perform the down-sampling in case the ratio is substantially equal to the predefined value (e.g., 1.5) or within the predefined range of values.

$B24_{c1}$. The method of any one of embodiments B1-B10a, the method comprising down-sampling the first picture at a factor of 2 using the first group of values of samples included in the first block, wherein the down-sampling comprises interpolating the first group of values using the filter, a length of the filter is 10-taps, the set of 6, 8, 10, or 12 coefficient values is a set of 10 coefficient values, the set of 10 coefficient values is selected from first groups of coefficient values ±2, and the first groups of coefficient values comprise:

{−3, −14, 10, 77, 116, 77, 10, −14, −3, 0}, {−4, −15, 8, 73, 116, 82, 14, −15, −5, 2}, {−3, −15, 5, 69, 115, 86, 18, −15, −6, 2}, {−2, −15, 2, 65, 114, 89, 22, −14, −7, 2}, {−1, −14, −1, 60, 113, 93, 26, −14, −8, 2}, {−1, −14, −3, 56, 112, 96, 30, −13, −9, 2}, {0, −13, −5, 51, 110, 100, 34, −12, −10, 1}, {0, −13, −7, 47, 108, 103, 38, −10, −11, 1}, {1, −12, −9, 43, 105, 105, 43, −9, −12, 1}, {1, −11, −10, 38, 103, 108, 47, −7, −13, 0}, {1, −10, −12, 34, 100, 110, 51, −5, −13, 0}, {2, −9, −13, 30, 96, 112, 56, −3, −14, −1}, {2, −8, −14, 26, 93, 113, 60, −1, −14, −1}, {2, −7, −14, 22, 89, 114, 65, 2, −15, −2}, {2, −6, −15, 18, 86, 115, 69, 5, −15, −3}, {2, −5, −15, 14, 82, 116, 73, 8, −15, −4}.

$B24_{c2}$. The method of embodiment $B24_{c1}$, the method comprising:

determining whether to perform the down-sampling based on a ratio between the first picture and the second picture, wherein the ratio between the first picture and the second picture is one of a ratio between a resolution of the first picture and a resolution of the second picture, a ratio between a width of the first picture and a width of the second picture, or a ratio between a height of the first picture and a height of the second picture.

$B24_{c3}$. The method of embodiment $B24_{c2}$, wherein determining whether to perform the down-sampling based on the ratio comprises:

determining whether the ratio is substantially equal to a predefined value (e.g., 2) or is greater than or equal to a threshold value (e.g., 1.75); and determining to perform the down-sampling in case the ratio is substantially equal to the predefined value (e.g., 2) or is greater than or equal to the threshold value.

$B24_{d1}$. The method of any one of embodiments B1-B10a, the method comprising down-sampling the first picture at a factor of 1.5 using the first group of values of samples included in the first block, wherein the down-sampling comprises interpolating the first group of values using the filter, a length of the filter is 10-taps, the set of 6, 8, 10, or 12 coefficient values is a set of 10 coefficient values, the set of 10 coefficient values is selected from first groups of coefficient values ±2, and the first groups of coefficient values comprise:

{6, −10, −19, 74, 154, 74, −19, −10, 6, 0}, {8, −8, −22, 66, 153, 82, −18, −13, 8, 0}, {7, −6, −24, 58, 152, 90, −14, −15, 8, 0}, {7, −5, −25, 51, 150, 97, −11, −17, 8, 1}, {6, −2, −26, 43, 147, 105, −7, −19, 7, 2}, {6, −1, −26, 35, 144, 112, −2, −21, 7, 2}, {5, 1, −26, 28, 140, 118, 3, −22, 6, 3}, {5, 2, −26, 22, 135, 125, 9, −24, 5, 3}, {4, 4, −25, 15, 130, 130, 15, −25, 4, 4}, {3, 5, −24, 9, 125, 135, 22, −26, 2, 5}, {3, 6, −22, 3, 118, 140, 28, −26, 1, 5}, {2, 7, −21, −2, 112, 144, 35, −26, −1, 6}, {2, 7, −19, −7, 105, 147, 43, −26, −2, 6}, {1, 8, −17, −11, 97, 150, 51, −25, −5, 7}, {0, 8, −15, −14, 90, 152, 58, −24, −6, 7}, {0, 8, −13, −18, 82, 153, 66, −22, −8, 8}.

$B24_{d2}$. The method of embodiment $B24_{d1}$, the method comprising:

determining whether to perform the down-sampling based on a ratio between the first picture and the second picture, wherein the ratio between the first picture and the second picture is one of a ratio between a resolution of the first picture and a resolution of the second picture, a ratio between a width of the first picture and a width of the second picture, or a ratio between a height of the first picture and a height of the second picture.

$B24_{d3}$. The method of embodiment $B24_{d2}$, wherein determining whether to perform the down-sampling based on the ratio comprises:

determining whether the ratio is substantially equal to a predefined value (e.g., 1.5) or is within a predefined range of values (e.g., between 1.25 and 1.75); and determining to perform the down-sampling in case the ratio is substantially equal to the predefined value (e.g., 1.5) or within the predefined range of values.

$B24_{e1}$. The method of any one of embodiments B1-B10a, the method comprising up-sampling the first picture using the first group of values of samples included in the first block, wherein the up-sampling comprises interpolating the first group of values using the filter, a length of the filter is 10-taps, the set of 6, 8, 10, or 12 coefficient values is a set of 10 coefficient values, the set of 10 coefficient values is selected from first groups of coefficient values ±2, and the first groups of coefficient values comprise:

{0, 0, 0, 0, 256, 0, 0, 0, 0, 0}, {2, −3, 6, −14, 254, 16, −7, 4, −2, 0}, {3, −6, 12, −26, 249, 34, −14, 7, −4, 1}, {4, −9, 17, −36, 241, 54, −22, 11, −6, 2}, {5, −11, 20, −43, 230, 75, −29, 15, −8, 2}, {5, −12, 23, −48, 216, 96, −36, 18, −9, 3}, {5, −13, 25, −51, 200, 118, −42, 21, −11, 4}, {5, −13, 25, −51, 181, 140, −46, 23, −12, 4}, {5, −13,

25, −50, 161, 161, −50, 25, −13, 5}, {4, −12, 23, −46, 140, 181, −51, 25, −13, 5}, {4, −11, 21, −42, 118, 200, −51, 25, −13, 5}, {3, −9, 18, −36, 96, 216, −48, 23, −12, 5}, {2, −8, 15, −29, 75, 230, −43, 20, −11, 5}, {2, −6, 11, −22, 54, 241, −36, 17, −9, 4}, {1, −4, 7, −14, 34, 249, −26, 12, −6, 3}, {0, −2, 4, −7, 16, 254, −14, 6, −3, 2}.

$B24_{e2}$. The method of embodiment $B24_{e1}$, the method comprising:

determining whether to perform the up-sampling based on a ratio between the first picture and the second picture, wherein the ratio between the first picture and the second picture is one of a ratio between a resolution of the first picture and a resolution of the second picture, a ratio between a width of the first picture and a width of the second picture, or a ratio between a height of the first picture and a height of the second picture.

$B24_{e3}$. The method of embodiment $B24_{e2}$, wherein determining whether to perform the up-sampling based on the ratio comprises:

determining whether the ratio is less than a predefined value (e.g., 1 or 1.25); and determining to perform the up-sampling in case the ratio is less than the predefined value.

$B24_{f1}$. The method of any one of embodiments B1-B10a, the method comprising down-sampling the first picture at a factor of 2 using the first group of values of samples included in the first block, wherein the down-sampling comprises interpolating the first group of values using the filter, a length of the filter is 10-taps, the set of 6, 8, 10, or 12 coefficient values is a set of 10 coefficient values, the set of 10 coefficient values is selected from first groups of coefficient values ±2, and the first groups of coefficient values comprise:

{−2, −14, 10, 76, 116, 76, 10, −14, −2, 0}, {−2, −14, 7, 73, 115, 81, 13, −14, −3, 0}, {−2, −13, 4, 68, 115, 85, 17, −14, −4, 0}, {−1, −13, 1, 64, 114, 89, 20, −14, −4, 0}, {−1, −13, −1, 59, 114, 93, 24, −13, −6, 0}, {0, −12, −3, 54, 111, 96, 28, −12, −6, 0}, {0, −10, −7, 51, 109, 99, 32, −11, −8, 1}, {1, −12, −6, 45, 107, 103, 36, −10, −8, 0}, {1, −9, −9, 41, 104, 104, 41, −9, −9, 1}, {0, −8, −10, 36, 103, 107, 45, −6, −12, 1}, {1, −8, −11, 32, 99, 109, 51, −7, −10, 0}, {0, −6, −12, 28, 96, 111, 54, −3, −12, 0}, {0, −6, −13, 24, 93, 114, 59, −1, −13, −1}, {0, −4, −14, 20, 89, 114, 64, 1, −13, −1}, {0, −4, −14, 17, 85, 115, 68, 4, −13, −2}.

$B24_{f2}$. The method of embodiment $B24_{f1}$, the method comprising:

determining whether to perform the down-sampling based on a ratio between the first picture and the second picture, wherein the ratio between the first picture and the second picture is one of a ratio between a resolution of the first picture and a resolution of the second picture, a ratio between a width of the first picture and a width of the second picture, or a ratio between a height of the first picture and a height of the second picture.

$B24_{f3}$. The method of embodiment $B24_{f2}$, wherein determining whether to perform the down-sampling based on the ratio comprises:

determining whether the ratio is substantially equal to a predefined value (e.g., 2) or is greater than or equal to a threshold value (e.g., 1.75); and determining to perform the down-sampling in case the ratio is substantially equal to the predefined value (e.g., 2) or is greater than or equal to the threshold value.

$B24_{g1}$. The method of any one of embodiments B1-B10a, the method comprising up-sampling the first picture using the first group of values of samples included in the first block, wherein the up-sampling comprises interpolating the first group of values using the filter, a length of the filter is 10-taps, the set of 6, 8, 10, or 12 coefficient values is a set of 10 coefficient values, the set of 10 coefficient values is selected from first groups of coefficient values ±2, and the first groups of coefficient values comprise:

{0, 0, 0, 0, 256, 0, 0, 0, 0, 0,}, {3, −6, 9, −16, 253, 19, −11, 6, −2, 1}, {3, −7, 13, −27, 248, 36, −16, 8, −4, 2}, {3, −7, 16, −36, 240, 53, −21, 10, −4, 2}, {3, −8, 19, −44, 231, 72, −26, 12, −5, 2}, {5, −11, 22, −49, 217, 94, −34, 16, −8, 4}, {5, −12, 24, −52, 202, 114, −38, 19, −11, 5}, {6, −14, 26, −52, 182, 136, −43, 22, −13, 6}, {6, −13, 24, −50, 161, 161, −50, 24, −13, 6}, {6, −13, 22, −43, 136, 182, −52, 26, −14, 6}, {5, −11, 19, −38, 114, 202, −52, 24, −12, 5}, {4, −8, 16, −34, 94, 217, −49, 22, −11, 5}, {2, −5, 12, −26, 72, 231, −44, 19, −8, 3}, {2, −4, 10, −21, 53, 240, −36, 16, −7, 3}, {2, −4, 8, −16, 36, 248, −27, 13, −7, 3}, or {1, −2, 6, −11, 19, 253, −16, 9, −6, 3}.

$B24_{g2}$. The method of embodiment $B24_{g1}$, the method comprising:

determining whether to perform the up-sampling based on a ratio between the first picture and the second picture, wherein the ratio between the first picture and the second picture is one of a ratio between a resolution of the first picture and a resolution of the second picture, a ratio between a width of the first picture and a width of the second picture, or a ratio between a height of the first picture and a height of the second picture.

$B24_{g3}$. The method of embodiment $B24_{g2}$, wherein determining whether to perform the up-sampling based on the ratio comprises:

determining whether the ratio is less than a predefined value (e.g., 1 or 1.25); and determining to perform the up-sampling in case the ratio is less than the predefined value.

B25. The method of any one of embodiments B1-B24, the method comprising:

selecting a length of the filter based on characteristics of reconstructed samples included in the first picture or the second picture; and selecting the set of coefficients based on the selected length of the filter.

B26. The method of any one of embodiments B1-B25, wherein $$t(x', y') = \left(\sum_{n=0}^{N-1} f_i(n) * r\left(x + n - \frac{N}{2} + 1 + mvXInt,\ y + mvYInt\right)\right), \text{ and}$$

$$r''(x, y) = \left(\sum_{n=0}^{N-1} f_j(n) * t\left(x',\ y' + n - \frac{N}{2} + 1\right)\right),$$

where t(x', y') is a value of a sample after horizontal filtering, x' is a horizontal coordinate of a sample in a temporal buffer, y' is a vertical coordinate of the sample in the temporal buffer, x is a horizontal coordinate of a sample in the second picture, y is a vertical coordinate of the sample in the second picture, mvXInt and mvYInt are motion vectors, $f_i$ is a subsample filter that corresponds to a particular fractional position of mvX, $f_i(n)$ is a filter coefficient at position n of the filter $f_i$, $f_j$ is a subsample filter that corresponds to a particular fractional position of mvY, $f_j(n)$ is a filter coefficient at position n of the filter $f_j$, r is a value of a sample in the first picture or the second picture at a given horizontal coordinate and a given vertical coordinate, N is a length of the filter, and r"(x, y) is a value of a sample after horizontal and vertical filterings.

C1. A computer program (1443) comprising instructions (1444) which when executed by processing circuitry (1402) cause the processing circuitry to perform the method of any one of embodiments A1-B26.

C2. A carrier containing the computer program of embodiment C1, wherein the carrier is one of an electronic signal, an optical signal, a radio signal, and a computer readable storage medium.

D1. An apparatus (1400) for encoding or decoding a video, the video comprising a sequence of pictures which includes a first picture and a second picture, the apparatus being configured to:

obtain (s1202) a first group of values of samples included in a first block, wherein the first block is included in the first picture;

select (s1204) from a set of filters a filter to use for generating a second group of values included in a second block, wherein the second block is included in the first picture or the second picture; and using the selected filter and the first group of values, generate (s1206) the second group of values, wherein the filter comprises a set of 6, 8, 10, or 12 coefficient values, and the set of coefficient values is selected from groups of coefficient values disclosed in embodiment A1 above ±2.

D2. The apparatus of embodiment D1, wherein the apparatus is further configured to perform the method of any one of embodiments A2-A26.

E1. An apparatus (1400) for encoding or decoding a video, the video comprising a sequence of pictures which includes a first picture and a second picture, the apparatus being configured to:

obtain (s1302) a first group of values of samples included in a first block, wherein the first block is included in the first picture;

select (s1304) a length of a filter based on characteristics of reconstructed samples included in the first picture or the second picture;

select (s1306) a filter based at least on the selected length;

interpolate (s1308) the first group of values using the selected filter;

based on a result of interpolating the first group of values, generate (s1310) a second group of values of samples included in a second block, wherein the second block is included in the first picture or the second picture; and based at least on the second group of values, encode or decode (s1312) the video.

E2. The apparatus of embodiment E1, wherein the apparatus is further configured to perform the method of any one of embodiments B2-B26.

F1. An apparatus (1400), the apparatus comprising:

a memory (1441); and processing circuitry (1402) coupled to the memory, wherein the apparatus is configured to perform the method of any one of embodiments A1-B26.

CONCLUSION

While various embodiments are described herein, it should be understood that they have been presented by way of example only, and not limitation. Thus, the breadth and scope of this disclosure should not be limited by any of the above described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for encoding or decoding a video, the video comprising a sequence of pictures which includes a first picture and a second picture, the method comprising:

obtaining a first group of values of samples included in a first block, wherein the first block is included in the first picture;

selecting, from a set of filters, a filter to use for generating a second group of values included in a second block, wherein the second block is included in the first picture or the second picture; and using the selected filter and the first group of values, generating the second group of values, wherein a length of the filter is 6-taps, the filter comprises a set of 6 coefficient values, the set of 6 coefficient values is selected from first groups of coefficient values, the first groups of coefficient values comprise:

{1, −6, 256, 6, −1, 0}, {2, −11, 254, 14, −4, 1}, {4, −18, 252, 23, −6, 1}, {6, −24, 249, 32, −9, 2}, {6, −26, 244, 41, −12, 3}, {7, −30, 239, 53, −18, 5}, {8, −34, 235, 61, −19, 5}, {10, −38, 228, 72, −22, 6}, {10, −39, 220, 84, −26, 7}, {10, −40, 213, 94, −29, 8}, {11, −42, 205, 105, −32, 9}, {11, −42, 196, 116, −35, 10}, {11, −42, 186, 128, −37, 10} {11, −41, 167, 148, −40, 11}, {11, −41, 158, 158, −41, 11}, {11, −40, 148, 167, −41, 11}, {10, −37, 128, 186, −42, 11}, {10, −35, 116, 196, −42, 11}, {9, −32, 105, 205, −42, 11}, {8, −29, 94, 213, −40, 10}, {7, −26, 84, 220, −39, 10}, {6, −22, 72, 228, −38, 10}, {5, −19, 61, 235, −34, 8}, {5, −18, 53, 239, −30, 7}, {3, −12, 41, 244, −26, 6}, {2, −9, 32, 249, −24, 6}, {1, −6, 23, 252, −18, 4}, {1, −4, 14, 254, −11, 2}, {0, −1, 6, 256, −6, 1}, or

{0, 44, 160, 53, −2, 1}, {−2, 42, 160, 59, −4, 1}, {−2, 38, 159, 65, −5, 1}, {−1, 33, 159, 68, −4, 1}, {−2, 33, 154, 74, −4, 1}, {−1, 27, 155, 78, −4, 1}, {−2, 25, 153, 84, −5, 1}, {−2, 22, 151, 89, −5, 1}, {−1, 17, 151, 93, −6, 2}, {−2, 16, 147, 99, −5, 1}, {−1, 14, 142, 103, −3, 1}, {−1, 12, 139, 107, −2, 1}, {−1, 10, 135, 112, 0, 0}, {−1, 8, 132, 116, 1, 0}, {0, 3, 131, 122, −1, 1}, {0, 4, 124, 124, 4, 0}, {1, −1, 122, 131, 3, 0}, {0, 1, 116, 132, 8, −1}, {0, 0, 112, 135, 10, −1}, {1, −2, 107, 139, 12, −1}, {1, −3, 103, 142, 14, −1}, {1, −5, 99, 147, 16, −2}, {2, −6, 93, 151, 17,

−1}, {1, −5, 89, 151, 22, −2}, {1, −5, 84, 153, 25, −2}, {1, −4, 78, 155, 27, −1}, {1, −4, 74, 154, 33, −2}, {1, −4, 68, 159, 33, −1}, {1, −5, 65, 159, 38, −2}, {1, −4, 59, 160, 42, −2}, {1, −2, 53, 160, 44, 0}, or

{−14, 64, 156, 64, −14, 0}, {−13, 59, 155, 68, −12, −1}, {−13, 56, 154, 71, −11, −1}, {−13, 52, 153, 76, −10, −2}, {−12, 47, 153, 79, −9, −2}, {−13, 45, 151, 84, −8, −3}, {−13, 39, 154, 88, −9, −3}, {−14, 34, 156, 94, −10, −4}, {−15, 33, 152, 99, −7, −6}, {−15, 30, 150, 103,−5, −7}, {−14, 26, 148, 107, −4, −7}, {−12, 23, 143, 110, −1, −7}, {−13, 18, 145, 116, −2,−8}, {−10, 15, 139, 118, 1, −7}, {−15, 19, 134, 122, 9, −13}, {−14, 18, 129, 123, 13, −13}, {−14, 18, 124, 124, 18, −14}, {−13, 13, 123, 129, 18, −14}, {−13, 9, 122, 134, 19, −15}, {−7, 1, 118, 139, 15, −10}, {−8, −2, 116, 145, 18, −13}, {−7, −1, 110, 143, 23, −12}, {−7,−4, 107, 148, 26, −14}, {−7, −5, 103, 150, 30, −15}, {−6, −7, 99, 152, 33, −15}, {−4, −10, 94, 156, 34, −14}, {−3, −9, 88, 154, 39, −13}, {−3, −8, 84, 151, 45, −13}, {−2, −9, 79, 153, 47, −12}, {−2, −10, 76, 153, 52, −13}, {−1, −11, 71, 154, 56, −13}, {−1, −12, 68, 155, 59, −13}, or

{−5, 64, 138, 64, −5, 0}, {−8, 66, 132, 73, −6, −1}, {−9, 62, 134, 76, −5, −2}, {−10, 59, 134, 80, −4, −3}, {−10, 57, 132, 82, −2, −3}, {−10, 53, 132, 85, 0, −4}, {−11, 50, 132, 89, 1,−5}, {−12, 47, 132, 93, 2, −6}, {−13, 45, 131, 96, 4, −7}, {−12, 40, 131, 99, 5, −7}, {−12, 39, 127, 101, 9, −8}, {−13, 36, 127, 105, 10, −9}, {−12, 33, 124, 107, 14, −10}, {−13, 30, 124, 111, 15, −11}, {−13, 29, 121, 112, 18, −11}, {−12, 25, 119, 115, 21, −12}, {−13, 24, 117, 117, 24, −13}, {−12, 21, 115, 119, 25, −12}, {−11, 18, 112, 121, 29, −13}, {−11, 15, 111, 124, 30, −13}, {−10, 14, 107, 124, 33, −12}, {−9, 10, 105, 127, 36, −13}, {−8, 9, 101, 127, 39, −12}, {−7, 5, 99, 131, 40, −12}, {−7, 4, 96, 131, 45, −13}, {−6, 2, 93, 132, 47,−12}, {−5, 1, 89, 132, 50, −11}, {−4, 0, 85, 132, 53, −10}, {−3, −2, 82, 132, 57, −10}, {−3, −4, 80, 134, 59, −10}, {−2, −5, 76, 134, 62, −9}, {−1, −6, 73, 132, 66, −8}, each of the first groups of coefficient values is associated with a particular fraction value, and the second group of values of the second block is generated based on the first group of values of the first block and a particular fraction value associated with any one of the first groups of coefficient values.

2. The method of claim 1, wherein the samples having the first group of values are located at non-fractional sample positions, and the samples having the second group of values are located at fractional sample positions.

3. The method of claim 1, wherein the samples having the first group of values include a first sample located at a non-fractional sample position, the samples having the second group of values include a second sample located at a fractional sample position, the fractional sample position is determined based at least on the non-fractional sample position and a fraction value, and the fraction value is associated with one set of 6, 8, 10, or 12 coefficient values selected from the first groups of coefficient values.

4. The method of claim 3, wherein the fractional sample position=the non-fractional sample position+(the fraction value×a distance between samples).

5. The method of claim 3, wherein the fraction value is any of 0/16, 1/16, 2/16, 3/16, . . . , 15/16, 0/32, 1/32, 2/32, 3/32, . . . , and 31/32.

6. The method of claim 1, wherein the method further comprises performing one or more of a motion compensated prediction, an inter prediction, and an intra prediction using the first group of values of samples included in the first block, and performing one or more of the motion compensated prediction, the inter prediction, and the intra prediction comprises interpolating the first group of values using the filter.

7. The method of claim 1, wherein the method further comprises down-sampling or up-sampling the first picture using the first group of values of samples included in the first block, and the down-sampling or the up-sampling comprises interpolating the first group of values using the filter.

8. The method of claim 7, wherein the motion compensated prediction is a motion compensated down-sampling.

9. The method of claim 1, wherein the first groups of coefficient values comprise:

{1, −6, 256, 6, −1, 0}, {2, −11, 254, 14, −4, 1}, {4, −18, 252, 23, −6, 1}, {6, −24, 249, 32, −9, 2}, {6, −26, 244, 41, −12, 3}, {7, −30, 239, 53, −18, 5}, {8, −34, 235, 61, −19, 5}, {10, −38, 228, 72, −22, 6}, {10, −39, 220, 84, −26, 7}, {10, −40, 213, 94, −29, 8}, {11, −42, 205, 105, −32, 9}, {11, −42, 196, 116, −35, 10}, {11, −42, 186, 128, −37, 10} {11, −41, 167, 148, −40, 11}, {11, −41, 158, 158, −41, 11}, {11, −40, 148, 167, −41, 11}, {10, −37, 128, 186, −42, 11}, {10, −35, 116, 196, −42, 11}, {9, −32, 105, 205, −42, 11}, {8, −29, 94, 213, −40, 10}, {7, −26, 84, 220, −39, 10}, {6, −22, 72, 228, −38, 10}, {5, −19, 61, 235, −34, 8}, {5, −18, 53, 239, −30, 7}, {3, −12, 41, 244, −26, 6}, {2, −9, 32, 249, −24, 6}, {1, −6, 23, 252, −18, 4}, {1, −4, 14, 254, −11, 2}, {0, −1, 6, 256, −6, 1}.

10. The method of claim 1, wherein the first groups of coefficient values comprise:

{0, 44, 160, 53, −2, 1}, {−2, 42, 160, 59, −4, 1}, {−2, 38, 159, 65, −5, 1}, {−1, 33, 159, 68, −4, 1}, {−2, 33, 154, 74, −4, 1}, {−1, 27, 155, 78, −4, 1}, {−2, 25, 153, 84, −5, 1}, {−2, 22, 151, 89, −5, 1}, {−1, 17, 151, 93, −6, 2}, {−2, 16, 147, 99, −5, 1}, {−1, 14, 142, 103, −3, 1}, {−1, 12, 139, 107, −2, 1}, {−1, 10, 135, 112, 0, 0}, {−1, 8, 132, 116, 1, 0}, {0, 3, 131, 122, −1, 1}, {0, 4, 124, 124, 4, 0}, {1, −1, 122, 131, 3, 0}, {0, 1, 116, 132, 8, −1}, {0, 0, 112, 135, 10, −1}, {1, −2, 107, 139, 12, −1}, {1, −3, 103, 142, 14, −1}, {1, −5, 99, 147, 16, −2}, {2, −6, 93, 151, 17, −1}, {1, −5, 89, 151, 22, −2}, {1, −5, 84, 153, 25, −2}, {1, −4, 78, 155, 27, −1}, {1, −4, 74, 154, 33, −2}, {1, −4, 68, 159, 33, −1}, {1, −5, 65, 159, 38, −2}, {1, −4, 59, 160, 42, −2}, {1, −2, 53, 160, 44, 0}.

11. The method of claim 1, wherein the first groups of coefficient values comprise:

{−14, 64, 156, 64, −14, 0}, {−13, 59, 155, 68, −12, −1}, {−13, 56, 154, 71, −11, −1}, {−13, 52, 153, 76, −10, −2}, {−12, 47, 153, 79, −9, −2}, {−13, 45, 151, 84, −8, −3}, {−13, 39, 154, 88, −9, −3}, {−14, 34, 156, 94, −10, −4}, {−15, 33, 152, 99, −7, −6}, {−15, 30, 150, 103, −5, −7}, {−14, 26, 148, 107, −4, −7}, {−12, 23, 143, 110, −1, −7}, {−13, 18, 145, 116, −2, −8}, {−10, 15, 139, 118, 1, −7}, {−15, 19, 134, 122, 9, −13}, {−14, 18, 129, 123, 13, −13}, {−14, 18, 124, 124, 18, −14}, {−13, 13, 123, 129, 18, −14}, {−13, 9, 122, 134, 19, −15}, {−7, 1, 118, 139, 15, −10}, {−8, −2, 116, 145, 18, −13}, {−7, −1, 110, 143, 23, −12}, {−7, −4, 107, 148, 26, −14}, {−7, −5, 103, 150, 30, −15}, {−6, −7, 99, 152, 33, −15}, {−4, −10, 94, 156, 34, −14}, {−3, −9, 88, 154, 39, −13}, {−3, −8, 84, 151, 45, −13}, {−2, −9, 79, 153, 47, −12}, {−2, −10, 76, 153, 52, −13}, {−1, −11, 71, 154, 56, −13}, {−1, −12, 68, 155, 59, −13}.

12. The method of claim 1, wherein the first groups of coefficient values comprise:

{−5, 64, 138, 64, −5, 0}, {−8, 66, 132, 73, −6, −1}, {−9, 62, 134, 76, −5, −2}, {−10, 59, 134, 80, −4, −3}, {−10, 57, 132, 82, −2, −3}, {−10, 53, 132, 85, 0, −4}, {−11, 50, 132, 89, 1, −5}, {−12, 47, 132, 93, 2, −6}, {−13, 45, 131, 96, 4, −7}, {−12, 40, 131, 99, 5, −7}, {−12, 39, 127, 101, 9, −8}, {−13, 36, 127, 105, 10, −9}, {−12, 33, 124, 107, 14, −10}, {−13, 30, 124, 111, 15, −11}, {−13, 29, 121, 112, 18, −11}, {−12, 25, 119, 115, 21, −12}, {−13, 24, 117, 117, 24, −13}, {−12, 21, 115, 119, 25, −12}, {−11, 18, 112, 121, 29, −13}, {−11, 15, 111, 124, 30, −13}, {−10, 14, 107, 124, 33, −12}, {−9, 10, 105, 127, 36, −13}, {−8, 9, 101, 127, 39, −12}, {−7, 5, 99, 131, 40, −12}, {−7, 4, 96, 131, 45, −13}, {−6, 2, 93, 132, 47, −12}, {−5, 1, 89, 132, 50, −11}, {−4, 0, 85, 132, 53, −10}, {−3, −2, 82, 132, 57, −10}, {−3, −4, 80, 134, 59, −10}, {−2, −5, 76, 134, 62, −9}, {−1, −6, 73, 132, 66, −8}.

13. A non-transitory computer readable storage medium storing a computer program comprising instructions which when executed by processing circuitry of an apparatus configures the apparatus to perform the method of claim 1.

14. An apparatus, the apparatus comprising:

a memory; and processing circuitry coupled to the memory, wherein the apparatus is configured to perform the method of claim 1.

* * * * *